(12) United States Patent
Tochio

(10) Patent No.: US 10,917,350 B2
(45) Date of Patent: Feb. 9, 2021

(54) TRANSMISSION DEVICE AND NETWORK SYSTEM

(71) Applicant: FUJITSU LIMITED, Kawasaki (JP)

(72) Inventor: Yuji Tochio, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/439,307

(22) Filed: Jun. 12, 2019

(65) Prior Publication Data
US 2020/0028784 A1    Jan. 23, 2020

(30) Foreign Application Priority Data

Jul. 20, 2018    (JP) ................. 2018-137152

(51) Int. Cl.
*H04L 12/26*    (2006.01)
*H04L 12/801*   (2013.01)
*H04L 12/24*    (2006.01)

(52) U.S. Cl.
CPC .......... *H04L 47/12* (2013.01); *H04L 41/0654* (2013.01)

(58) Field of Classification Search
CPC .... H04L 41/0654; H04L 47/12; H04L 47/826
See application file for complete search history.

(56) References Cited

U.S. PATENT DOCUMENTS

| | | | | |
|---|---|---|---|---|
| 5,537,393 A | * | 7/1996 | Shioda | H04J 3/085 370/223 |
| 2014/0064061 A1 | * | 3/2014 | Kulambi | H04L 12/437 370/223 |

FOREIGN PATENT DOCUMENTS

| | | |
|---|---|---|
| JP | 2002-330146 | 11/2002 |
| JP | 2003-333059 | 11/2003 |

* cited by examiner

*Primary Examiner* — Minh Trang T Nguyen
(74) *Attorney, Agent, or Firm* — Fujitsu Patent Center

(57) ABSTRACT

A transmission device includes at least one port, first and second transceivers, and a processor. The first transceiver transmits or receives a frame signal to or from one adjacent node within a ring network including a plurality of nodes. The frame signal includes an overhead and a plurality of slots. The second transceiver transmits or receives a frame signal to or from another adjacent node within the ring network. The processor sets port information to the overhead of a frame signal to be transmitted from the first transceiver. The processor acquires slot information from the overhead of a frame signal received by the first transceiver or the second transceiver based on the port information. The processor sets a received data signal in a slot allocated based on the slot information, among the plurality of slots of a frame signal to be transmitted from the first transceiver or the second transceiver.

19 Claims, 40 Drawing Sheets

FIG. 6

COLLECTION MESSAGE

| DA | | | | SA | |
|---|---|---|---|---|---|
| Ethernet Type | | | | | |
| State=COLLECTION MODE | | | | | |
| PORT INFOR-MATION | NODE A | PORT ID | BAND | TRANSMISSION /RECEPTION | COLLECTION FLAG |
| | NODE B | PORT ID | BAND | TRANSMISSION /RECEPTION | COLLECTION FLAG |
| | ...... | | | | ... |
| | NODE E | PORT ID | BAND | TRANSMISSION /RECEPTION | COLLECTION FLAG |

← Gc

SETTING MESSAGE

| DA | | | | SA | |
|---|---|---|---|---|---|
| Ethernet Type | | | | | |
| State=SETTING MODE | | | | | |
| TRANSMISSION SIDE SLOT INFORMATION | NODE A | PORT ID | SLOT ID | CLOCKWISE LINE ID | COUNTERCLOCK-WISE LINE ID |
| | NODE B | PORT ID | SLOT ID | CLOCKWISE LINE ID | COUNTERCLOCK-WISE LINE ID |
| | ...... | | | | |
| | NODE E | PORT ID | SLOT ID | CLOCKWISE LINE ID | COUNTERCLOCK-WISE LINE ID |
| RECEPTION SIDE SLOT INFORMATION | NODE A | PORT ID | SLOT ID | CLOCKWISE LINE ID | COUNTERCLOCK-WISE LINE ID |
| | NODE B | PORT ID | SLOT ID | CLOCKWISE LINE ID | COUNTERCLOCK-WISE LINE ID |
| | ...... | | | | |
| | NODE E | PORT ID | SLOT ID | CLOCKWISE LINE ID | COUNTERCLOCK-WISE LINE ID |

ADDITION REQUEST MESSAGE      Ge

| DA | SA |
|---|---|
| Ethernet Type ||
| State=ADDITION REQUEST MODE ||

| PORT INFORMATION | NODE A | PORT ID | BAND | TRANSMISSION /RECEPTION | COLLECTION FLAG |
|---|---|---|---|---|---|
| | NODE B | PORT ID | BAND | TRANSMISSION /RECEPTION | COLLECTION FLAG |
| | ..... ||||...|
| | NODE E | PORT ID | BAND | TRANSMISSION /RECEPTION | COLLECTION FLAG |

ADDITION SETTING MESSAGE      Gf

| DA | SA |
|---|---|
| Ethernet Type ||
| State=ADDITION SETTING MODE ||

| | NODE | PORT ID | SLOT ID | CLOCKWISE LINE ID | COUNTERCLOCK-WISE LINE ID |
|---|---|---|---|---|---|
| TRANSMISSION SIDE SLOT INFORMATION | NODE A | PORT ID | SLOT ID | CLOCKWISE LINE ID | COUNTERCLOCK-WISE LINE ID |
| | NODE B | PORT ID | SLOT ID | CLOCKWISE LINE ID | COUNTERCLOCK-WISE LINE ID |
| | ..... |||||
| | NODE E | PORT ID | SLOT ID | CLOCKWISE LINE ID | COUNTERCLOCK-WISE LINE ID |
| RECEPTION SIDE SLOT INFORMATION | NODE A | PORT ID | SLOT ID | CLOCKWISE LINE ID | COUNTERCLOCK-WISE LINE ID |
| | NODE B | PORT ID | SLOT ID | CLOCKWISE LINE ID | COUNTERCLOCK-WISE LINE ID |
| | ..... |||||
| | NODE E | PORT ID | SLOT ID | CLOCKWISE LINE ID | COUNTERCLOCK-WISE LINE ID |

FIG. 19

PORT INFORMATION DATABASE 231

| NODE | PORT ID | BAND(Gbps) | TRANSMISSION/RECEPTION |
|---|---|---|---|
| A | #1 | 10 | TRANSMISSION |
| A | #2 | 40 | TRANSMISSION |
| A | ..... | ..... | ..... |
| B | #1 | 40 | TRANSMISSION |
| B | #2 | 25 | RECEPTION |
| B | ..... | ..... | ..... |
| ..... | ..... | ..... | ..... |
| E | #1 | 25 | TRANSMISSION |
| E | #2 | 25 | RECEPTION |
| E | ..... | ..... | ..... |

SLOT INFORMATION DATABASE 232

| | NODE ID | PORT ID | CLOCKWISE LINE ID | COUNTERCLOCK-WISE LINE ID | SLOT ID |
|---|---|---|---|---|---|
| TRANSMISSION SIDE SLOT INFORMATION | A | #1 | #1 | #11 | #0 |
| TRANSMISSION SIDE SLOT INFORMATION | A | #2 | #1 | #11 | #1 |
| TRANSMISSION SIDE SLOT INFORMATION | A | ..... | ..... | ..... | ..... |
| TRANSMISSION SIDE SLOT INFORMATION | ..... | ..... | ..... | ..... | ..... |
| TRANSMISSION SIDE SLOT INFORMATION | E | | ..... | | |
| RECEPTION SIDE SLOT INFORMATION | A | #11 | #2 | #12 | #0 |
| RECEPTION SIDE SLOT INFORMATION | A | #12 | #2 | #12 | #1 |
| RECEPTION SIDE SLOT INFORMATION | A | ..... | ..... | ..... | ..... |
| RECEPTION SIDE SLOT INFORMATION | ..... | ..... | ..... | ..... | ..... |
| RECEPTION SIDE SLOT INFORMATION | E | | ..... | | |

FIG. 20

MULTIPLEX SETTING TABLE 233

| TRANSMISS-ION LINE ID | CLOCKWISE LINE ID | CLOCKWISE RECEPTION SLOT ID | COUNTERCL-OCKWISE LINE ID | CLOCKWISE RECEPTION SLOT ID |
|---|---|---|---|---|
| #1 | #1 | #1-#10 | #11 | #11-#20 |
| #2 | #3 | #12-#20 | #13 | #1-#10 |
| ... | | | | |
| #m | ... | | | |

DEMULTIPLEX SETTING TABLE 234

| RECEPTION LINE ID | CLOCKWISE LINE ID | CLOCKWISE TRANSMISSION SLOT ID | COUNTERCL-OCKWISE LINE ID | COUNTER-CLOCKWISE TRANSMISSION SLOT ID |
|---|---|---|---|---|
| #1 | #2 | #1-#10 | #12 | #11-#20 |
| #2 | #4 | #11-#20 | #14 | #1-#10 |
| ... | | | | |
| #m | ... | | | |

FIG. 33

INTER-PORT COMMUNICATION DATABASE 235

| TRANSMISSION PORT INFORMATION | | | RECEPTION PORT INFORMATION | | |
|---|---|---|---|---|---|
| NODE ID | PORT ID | BAND (Gbps) | NODE ID | PORT ID | BAND (Gbps) |
| D | #1 | 10 | B | #2 | 10 |
| D | #2 | 40 | A | #2 | 25 |

SWITCH SETTING TABLE 236

| SWITCH ID | INPUT SIDE | | OUTPUT SIDE | | DELAY TIME |
|---|---|---|---|---|---|
| | LINE ID | SLOT ID | LINE ID | SLOT ID | |
| #1 | #1 | #1 | #2 | #1 | ... |
| | | #2 | #2 | #2 | ... |
| | | ... | | | |
| | | #20 | #2 | #2 | - |
| | #2 | ... | | | |
| | | #i | #1 | #j | ... |
| | | ... | | | |
| | | #20 | #5 | #5 | - |
| #2 | ... | | | | |

TRANSMISSION DEVICE AND NETWORK SYSTEM

CROSS-REFERENCE TO RELATED APPLICATION

This application is based upon and claims the benefit of priority of the prior Japanese Patent Application No. 2018-137152, filed on Jul. 20, 2018, the entire contents of which are incorporated herein by reference.

FIELD

The embodiments discussed herein are related to a transmission device and a network system.

BACKGROUND

With the distribution of data centers, an application of the "Flex Ethernet" technology defined by the optical internetworking group forum (OIF) has been considered as one of the means for transmitting large-capacity Ethernet (registered trademark) signals between data centers. According to the "Flex Ethernet" technology, the client signal having a transmission rate undefined as an international standard Ethernet data rate may be multiplexed into a frame signal of 100 GbE (Gigabit Ethernet (registered trademark)). Examples of such a client signal may include Ethernet signals of 10 Gbps, 40 Gbps, or 25 Gbps.

When client signals are individually collected from a large number of data centers present in a wide area into one node (hereinafter, referred to as a "parent node") and then multiplexed into a common frame signal, a long distance transmission path (e.g., optical fiber) connecting each data center to the parent node is required. In this regard, when a ring network is configured by connecting data centers located close to each other to a common node (hereinafter, referred to as a "child node") and connecting each child node to the parent node in a ring shape, it is possible to shorten the length of the transmission path.

Related techniques are disclosed in, for example, Japanese Laid-open Patent Publication No. 2002-330146.

In a case where a ring network is used, each child node is connected to a common transmission path, and thus, client signals transmitted from each child node are code-multiplexed (byte-multiplexed) and transmitted. Here, since the processing of individually controlling a transmission timing of the client signals in each child node becomes complicated, there is a concern that the load of the processing may increase, thereby increasing the transmission delay.

SUMMARY

According to an aspect of the present invention, provide is a transmission device including at least one port, a first transceiver, a second transceiver, and a processor. The at least one port is each configured to transmit or receive a data signal. The first transceiver is configured to transmit or receive a frame signal to or from one adjacent node within a ring network including a plurality of nodes. The transmission device is one of the plurality of nodes. The frame signal includes an overhead and a plurality of slots. The second transceiver is configured to transmit or receive a frame signal to or from another adjacent node within the ring network. The processor is configured to set port information to the overhead of a frame signal to be transmitted from the first transceiver. The port information indicates an allocation of a data signal to the at least one port. The processor is configured to acquire slot information from the overhead of a frame signal received by the first transceiver or the second transceiver based on the port information. The slot information indicates an allocation of a data signal to the plurality of slots. The processor is configured to set a received data signal in a slot allocated based on the slot information, among the plurality of slots of a frame signal to be transmitted from the first transceiver or the second transceiver.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 6 is a view illustrating an example of a collection message and a setting message;

FIG. 9 is a view illustrating an example of an addition request message and an addition setting message;

FIG. 19 is a view illustrating an example of a port information database and a slot information database;

FIG. 20 is a view illustrating an example of a multiplex setting table and a demultiplex setting table;

FIG. 33 is a view illustrating an example of an inter-port communication database and a switch setting table;

DESCRIPTION OF EMBODIMENTS

Figure 1:
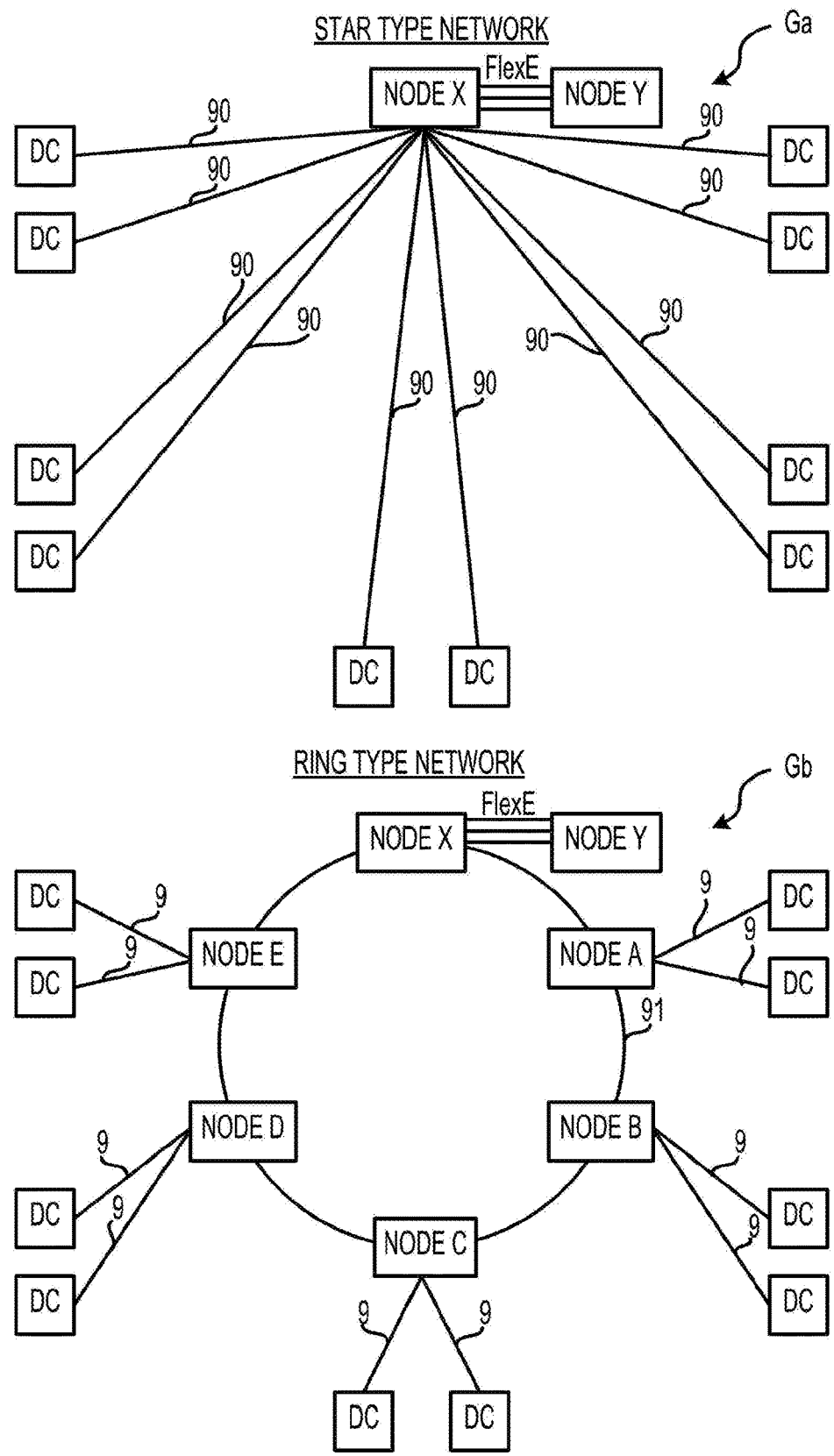
FIG. 1 is a view illustrating an example of a star type network and a ring type network.

FIG. 1 is a view illustrating an example of a star-type network Ga and a ring-type network Gb. Each of the star-type network Ga and the ring-type network Gb includes a plurality of data centers DC and nodes X and Y. The node X is a parent node, and multiplexes Ethernet signals accommodating data of each data center DC into a frame signal by the "Flex Ethernet" technology of the OIF, and transmits the frame signal to the node Y.

In the star-type network Ga, the node X is connected to each data center DC through an individual transmission path 90. In the ring-type network Gb, the node X is connected to nodes A to E as child nodes through a common transmission path 91. Each of the nodes A to E is connected to each of data centers DC located close to each other, through an individual transmission path 9.

Since each data center DC is disposed in a wide area, the distance of the transmission paths 9 and 91 in the ring-type network Gb is shorter than the distance of the transmission paths 90 in the star-type network Ga. For example, assuming that the average distance of the transmission path 90 in the star-type network Ga is 0.5 km and the number of data centers DC is 100, the sum of the distances of the transmission paths 90 becomes 50 km (=0.5×100).

Meanwhile, in the ring-type network Gb, assuming that the distance of the transmission path 91 connecting the nodes A to E, and X to each other is 3 km, and the average distance of the transmission path 9 of each data center DC is 0.25 km, the sum of distances of the transmission paths 9 and 91 becomes 28 km (=3+0.25×100).

Thus, in a case where the ring-type network Gb is used, a facility cost of optical fiber is reduced as compared to that in a case where the star-type network Ga is used. In the following description, the ring-type network Gb will be referred to as a "ring network."

Figure 2:
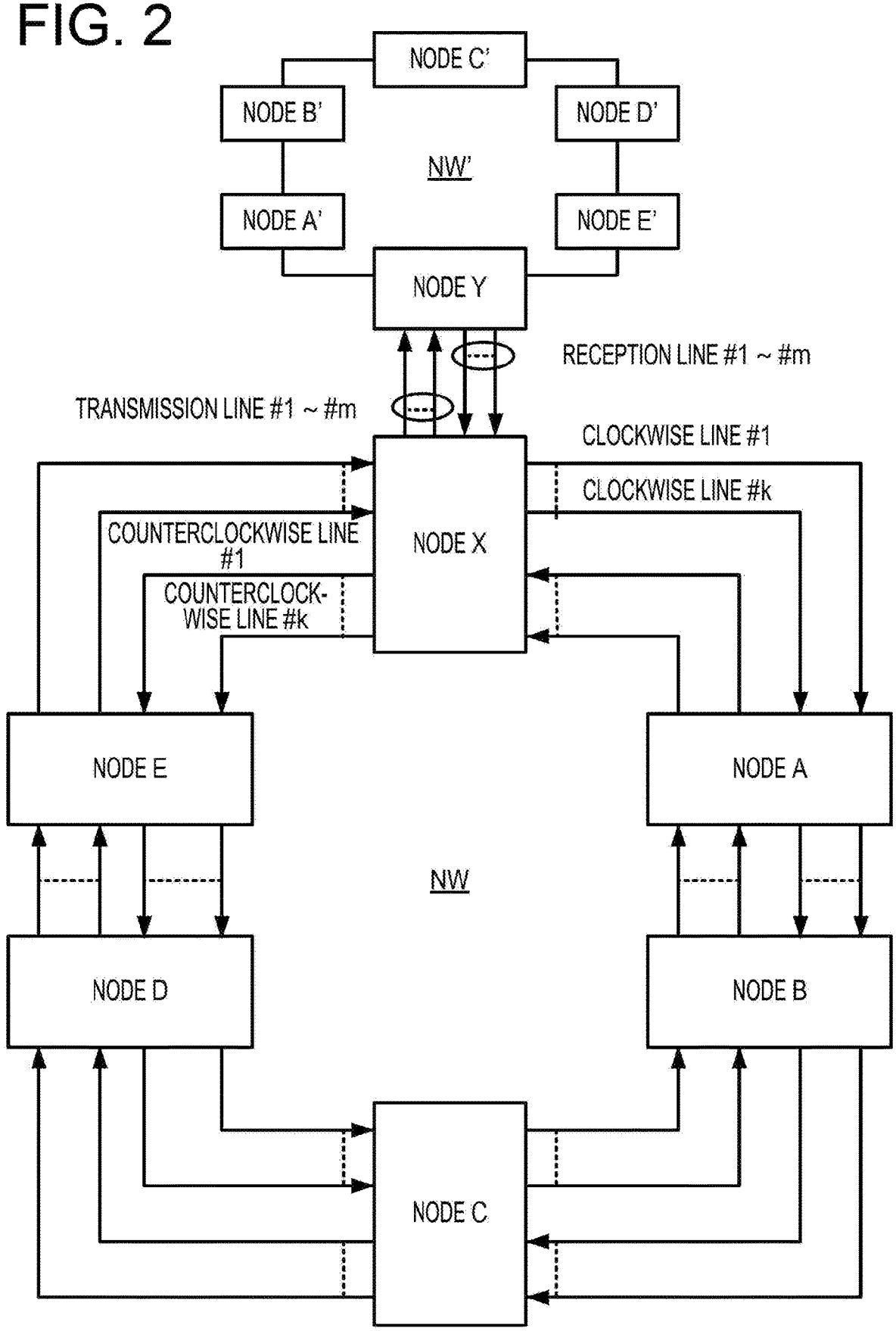
FIG. 2 is a configuration diagram illustrating an example of two ring networks connected to each other.

FIG. 2 is a configuration diagram illustrating an example of two ring networks NW and NW' connected to each other. In the ring network NW, a node X as a parent node and nodes A to E as child nodes are connected to each other, and the nodes A to E, and X are adjacent to each other. In the ring network NW', a node Y as a parent node and nodes A' to E' as child nodes are connected to each other, and the nodes A' to E', and Y are adjacent to each other.

The ring networks NW and NW' are connected to each other at the nodes X and Y. In the following description, the operation of the ring network NW will be described, and the operation of the ring network NW' is similar to the operation of the ring network NW.

The node X communicates with the node Y via transmission lines #1 to # m and reception lines #1 to # m (m: a positive integer). The node X transmits frame signals to the node Y via the transmission lines #1 to # m, and receives frame signals from the node Y via the reception lines #1 to # m according to the "Flex Ethernet" technology of the OIF. The transmission lines #1 to # m and the reception lines #1 to # m are accommodated in individual transmission paths.

The node X communicates with the nodes A to E via clockwise lines #1 to # k and counterclockwise lines #1 to # k (k: a positive integer). When the sheet of FIG. 2 is viewed from the front side, the clockwise lines #1 to # k transmit frame signals in the right direction, and the counterclockwise lines #1 to # k transmit frame signals in the left direction. The clockwise lines #1 to # k and the counterclockwise lines #1 to # k are accommodated in individual transmission paths among the nodes A to E, and X, respectively.

The nodes A to E, and X transmit/receive frame signals with their respective adjacent nodes A to E, and X via the clockwise lines #1 to # k and the counterclockwise lines #1 to # k. For example, the node D receives a frame signal from one adjacent node C via the clockwise lines #1 to # k and transmits the frame signal to the adjacent node E. The node D receives a frame signal from one adjacent node E via the counterclockwise lines #1 to # k and transmits the frame signal to the adjacent node C.

A frame signal transmitted from the node X to the node Y accommodates data signals transmitted from at least a part of the nodes A to E. To the node X, frame signals accommodating data signals from the nodes A to E are transmitted via the clockwise lines #1 to # k and the counterclockwise lines #1 to # k. The node X accommodates the data signals from the nodes A to E, in one frame signal, and transmits the frame signal to the node Y. Accordingly, the data signals from the nodes A to E are transmitted to the nodes A' to E'.

The node X receives a frame signal accommodating data signals from the nodes A' to E', from the node Y via the reception line #1 to # m. The node X separates the data signals from the frame signal received from the node Y, and accommodates the data signals in a frame signal on the clockwise lines #1 to # k or the counterclockwise lines #1 to # k according to the nodes A to E as reception destinations. Each of the nodes A to E separates data signals as reception targets from the frame signal on the clockwise lines #1 to # k or the counterclockwise lines #1 to # k. Accordingly, the data signals from the nodes A' to E' are transmitted to the nodes A to E.

Hereinafter, an example where data signals are transmitted from the nodes A to E to the node Y will be described.

Figure 3:
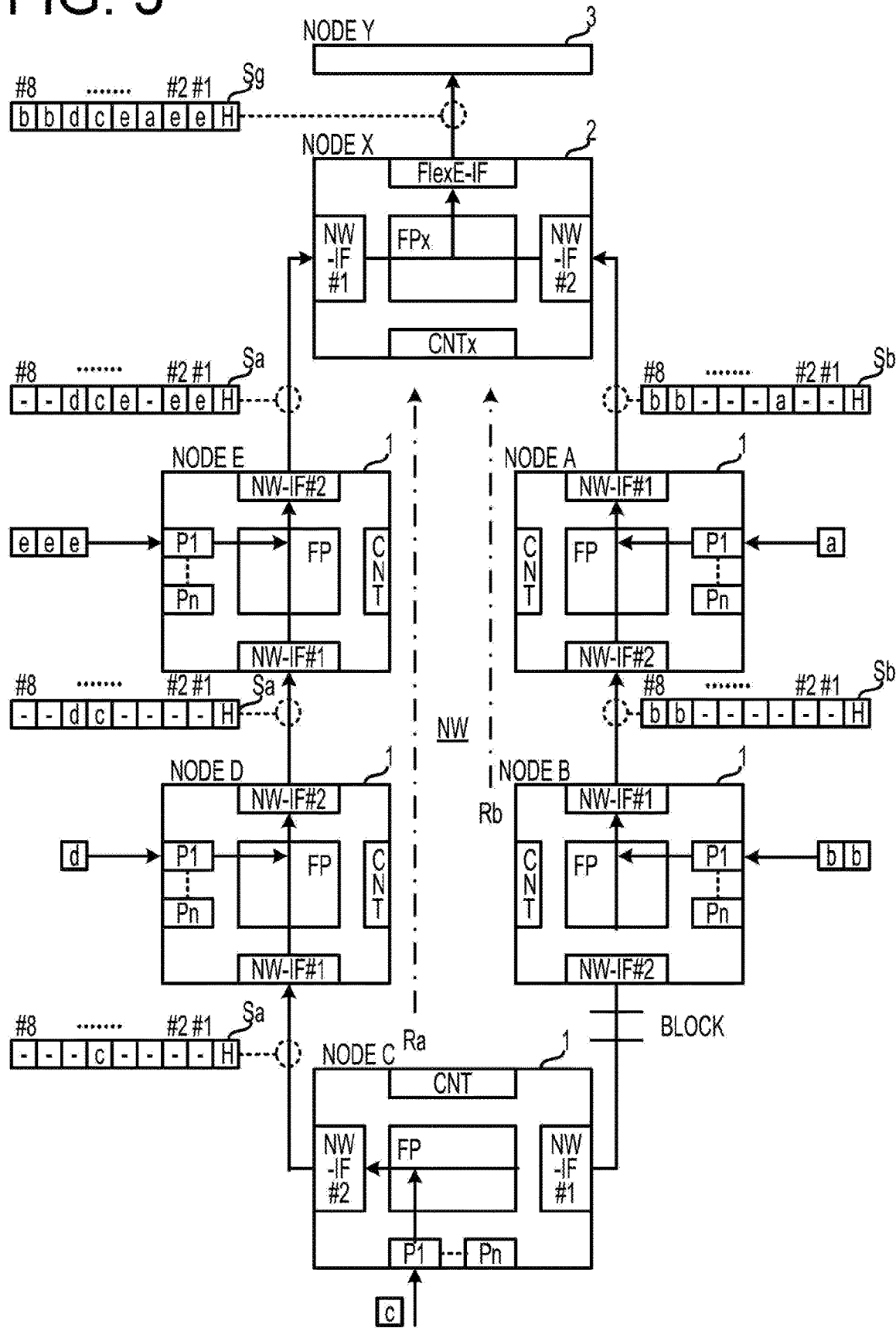
FIG. 3 is a view illustrating an example of a code-multiplex transmission in a ring network.

FIG. 3 is a view illustrating an example of a code-multiplex transmission in the ring network NW. FIG. 3 illustrates a state where frame signals Sa, Sb, and Sg are transmitted from each of the nodes A to E to the node Y through the node X, by arrows. The frame signals Sa, Sb, and Sg taken out of the arrows connecting the nodes A to E, X, and Y to each other, by dotted lines, are transmitted in the sections of the arrows.

In each of the nodes A to E, a transmission device 1 that performs a code-multiplex transmission (byte-multiplex transmission) is provided. In the nodes X and Y, transmission devices 2 and 3 that perform the code-multiplex transmission are provided, respectively. Between the transmission devices 2 and 3, a code-multiplex transmission is performed according to the "Flex Ethernet" technology of the OIF. The ring network NW is an example of a network system, the transmission device 1 of each of the nodes A to E is an example of a plurality of first transmission devices, and the transmission device 2 of the node X is an example of a second transmission device.

A transmission controller CNT, network interfaces NW-IF #1 and #2, a frame processor FP, and ports P1 to Pn (n: a positive integer) are provided in the transmission device 1 of each of the nodes A to E. A transmission controller CNTx, a frame processor FPx, network interfaces NW-IF #1 and #2, and a Flex Ethernet interface FlexE-IF are provided in the transmission device 2 of the node X.

In the transmission device 1 of each of the nodes A to E, the ports P1 to Pn transmit/receive Ethernet signals as an example of data signals on the basis of the "Flex Ethernet" technology. The ports P1 to Pn include a transmission port that transmits Ethernet signals to data centers DC, and a reception port that receives Ethernet signals from data centers DC. In this example, it is assumed that at least the port P1 is a reception port.

Ethernet signals "a" to "e" are transmitted as client signals from each data center DC to the port P1. In each transmission device 1, the number of ports P1 to Pn is not limited. In this example, a case where the Ethernet signals "a" to "e" are input to only the port P1 is described, but the present disclosure is not limited thereto. The Ethernet signals "a" to "e" may be input to other ports P2 to Pn.

The network interfaces NW-IF #1 and #2 transmit/receive each of the frame signals Sa and Sb to/from the other adjacent nodes A to E, and X in the ring network NW. One of the network interfaces NW-IF #1 and #2 of each of the nodes A to E is an example of a first transceiver, and the other is an example of a second transceiver. One of the network interfaces NW-IF #1 and #2 of the node X is an example of a third transceiver, and the other is an example of a fourth transceiver.

The frame processor FP accommodates the Ethernet signals "a" to "e," in the frame signal Sa or Sb transmitted from one of the network interfaces NW-IF #1 and #2. The frame processor FPx separates the Ethernet signals "a" to "e" from the frame signals Sa and Sb received by the network interfaces NW-IF #1 and #2, and accommodates the Ethernet signals "a" to "e," in one frame signal Sg. The frame signal Sg accommodating the Ethernet signals "a" to "e" is transmitted from the Flex Ethernet interface FlexE-IF to the node Y. The transmission controllers CNT and CNTx control a transmission processing of the frame signals Sa, Sb, and Sg.

Each of the frame signals Sa, Sb, and Sg includes an overhead H that functions as a control channel and slots #1 to #8 in which the Ethernet signals "a" to "e" are to be accommodated. The slots #1 to #8 are part of all slots of each of the frame signals Sa, Sb, and Sg.

Figure 4:
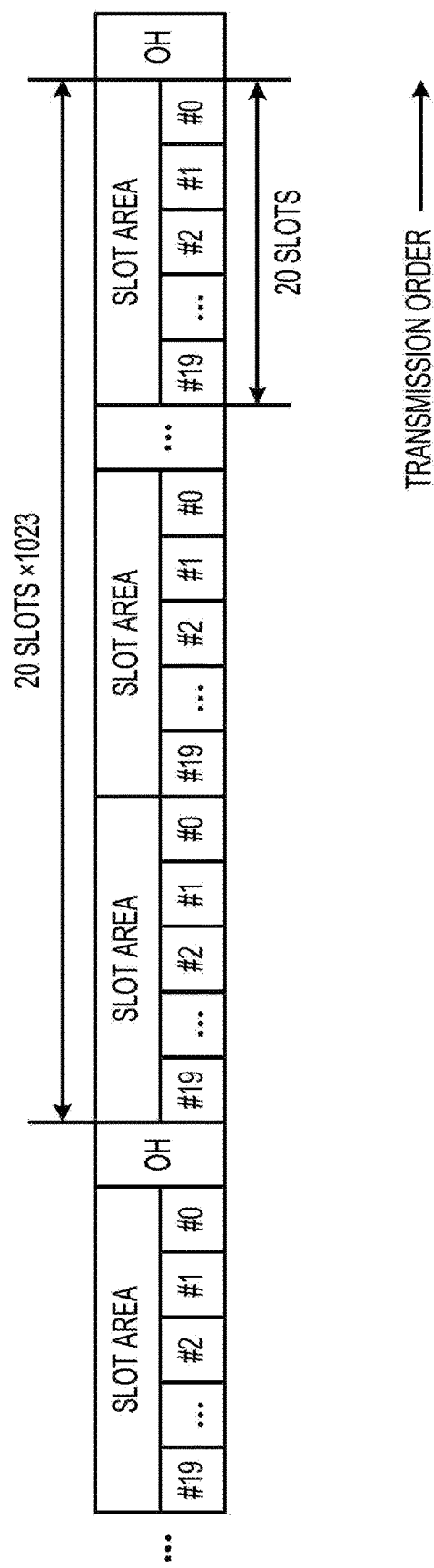
FIG. 4 is a view illustrating an example of a frame signal.

FIG. 4 is a view illustrating an example of each of the frame signals Sa, Sb, and Sg. Each of the frame signals Sa, Sb, and Sg, as an example, includes a slot area having 20 slots (#0, #1, . . . , #19), and an overhead OH (H described above) interposed between 1023 slot areas and 1023 slot areas. The overhead OH includes various control messages. The frame signals Sa, Sb, and Sg are sequentially transmitted in the right direction on the sheet of FIG. 2 (see "transmission order").

Each slot accommodates one of Ethernet signals "a" to "e" which is equivalent to, for example, 5 Gbps. For this reason, one multiplexed frame is capable of accommodating client signals of 100 Gbps (=5×20). The data format within each slot may be, as an example, a 66B block, but the present disclosure is not limited thereto.

The overhead OH accommodates a calendar indicating a port number of an output destination port of each of the Ethernet signals "a" to "e" within slots. For this reason, a device (not illustrated) that has received each of the frame signals Sa, Sb, and Sg may acquire the calendar from the overhead OH, separate the Ethernet signals from slots according to the calendar, and output the Ethernet signals to the output destination port.

Referring back to FIG. 3, the node B functions as a master node of the ring network NW to block the node B and the adjacent node C from each other. For this reason, as routes of the frame signals Sa and Sb reaching the node X, there are a route Ra reaching the node X from the node C through the node D and the node E, and a route Rb reaching the node X from the node B through the node A. The frame signal Sa is transmitted along the route Ra by any one of the clockwise lines #1 to # k, and the frame signal Sb is transmitted along the route Rb by any one of the counterclockwise lines #1 to # k.

In the transmission device 1 of the node B, the Ethernet signal "b" of 10 Gbps is input to the port P1. In FIG. 3, each square indicating one of the Ethernet signals "a" to "e" indicates a band of 5 Gbps. For this reason, two squares of the Ethernet signal "b" indicate 10 Gbps.

The frame processor FP of the node B accommodates the Ethernet signal "b," in the slots #7 and #8 of the frame signal Sb to be transmitted from the network interface NW-IF #1. The frame signal Sb transmitted from the network interface NW-IF #1 of the node B is received by the network interface NW-IF #2 of the node A.

In the transmission device 1 of the node A, the Ethernet signal "a" of 5 Gbps is input to the port P1. The frame processor FP of the node A accommodates the Ethernet signal "a" in the slot #3 of the frame signal Sb that is received by the network interface NW-IF #2 and is to be transmitted from the network interface NW-IF #1. The frame signal Sb transmitted from the network interface NW-IF #1 of the node A is received by the network interface NW-IF #2 of the node X.

In this manner, the Ethernet signals "a" and "b" of the nodes A and B are accommodated in the frame signal Sb on the route Rb. Meanwhile, in the frame signal Sa on the route Ra as well, the Ethernet signals "c," "d," and "e" of the nodes C to E are multiplexed by the same operation as that in the nodes A and B. The frame signal Sa transmitted from the network interface NW-IF #2 of the node E is received by the network interface NW-IF #1 of the node X.

The hyphen "-" within the frame signals Sa, Sb, and Sg indicates an empty slot where none of the Ethernet signals "a" to "e" are accommodated, and corresponds to an "unavailable" slot in the "Flex Ethernet" technology. Positions of empty slots in the frame signals Sa and Sb input to the node X from the routes Ra and Rb have an alternating relationship.

More specifically, while the slots #1, #2, and #4 to #6 of the frame signal Sb on the route Rb are empty slots, the slots #1, #2, and #4 to #6 of the frame signal Sa on the route Ra accommodate the Ethernet signals "e," "c," and "d." Meanwhile, while the slots #3, #7, and #8 of the frame signal Sa on the route Ra are empty slots, the slots #3, #7, and #8 of the frame signal Sb on the route Rb accommodate the Ethernet signals "a" and "b."

The transmission device 2 of the node X combines the frame signals Sa and Sb input from the routes Ra and Rb, respectively, into one frame signal Sg, and transmits the frame signal Sg from the Flex Ethernet interface FlexE-IF to the transmission device 3 of the node Y. Here, the frame processor FPx separates the Ethernet signals "e," "c," and "d" from the frame signal Sa on the route Ra, separates the Ethernet signals "a" and "b" from the frame signal Sb on the route Rb, and accommodates the Ethernet signals "a" to "e," in the same slots of the common frame signal Sg.

Accordingly, the two frame signals Sa and Sb received from the different routes are combined into one frame signal Sg. The frame processor FPx outputs the combined frame signal Sg to the Flex Ethernet interface FlexE-IF.

In this manner, the frame processor FPx of the node X generates the frame signal Sg accommodating the Ethernet signals "a" to "e," from the frame signals Sa and Sb received by the network interfaces NW-IF #1 and #2, respectively. The frame processor FPx is an example of a frame generator.

More specifically, the frame processor FPx acquires the Ethernet signals "e," "c," and "d" from the slots #1, #2, and #4 to #6 of the frame signal Sa, and accommodates the Ethernet signals "e," "c," and "d" in the slots #1, #2, and #4 to #6 of the frame signal Sg. The frame processor FPx acquires the Ethernet signals "a" and "b" from the slots #3, #7, and #8 of the frame signal Sb, and accommodates the Ethernet signals "a" and "b" in the slots #3, #7, and #8 of the frame signal Sg.

For this reason, although the transmission device 2 of the node X receives the frame signals Sa and Sb from the different routes Ra and Rb, respectively, within the ring network NW, the transmission device 2 may combine the frame signals Sa and Sb into one frame signal Sg and transmit the frame signal Sg to the node Y.

In order to perform the code-multiplex transmission as described above, each of the transmission devices 1 and 2 allocates the Ethernet signals "a" to "e" to the slots #1 to #8 by the processing to be described below.

Figure 5:
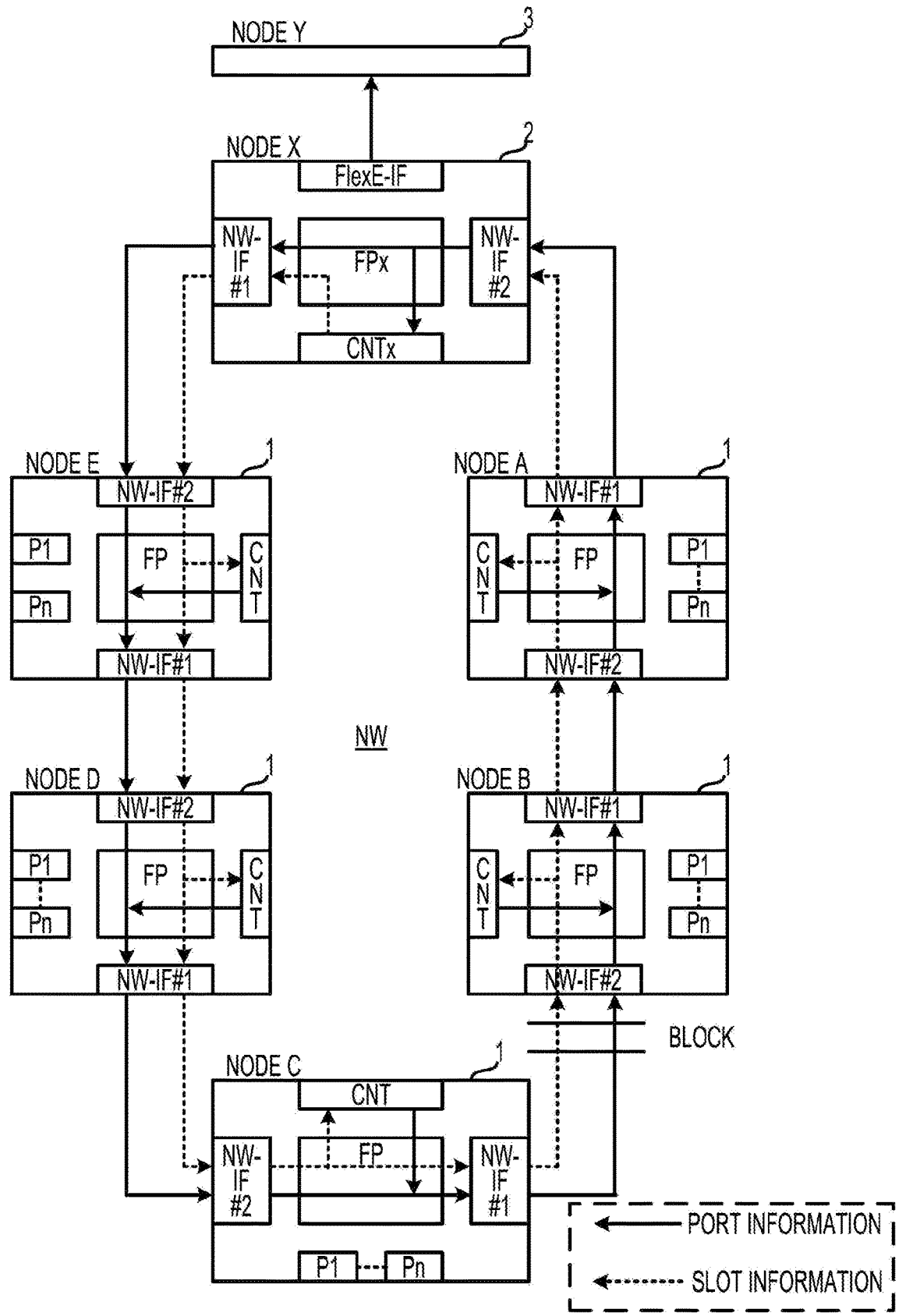
FIG. 5 is a view illustrating an example of an allocation processing of Ethernet signals.

FIG. 5 is a view illustrating an example of an allocation processing of the Ethernet signals "a" to "e." In FIG. 5, the same components as those in FIG. 3 will be denoted by the same reference numerals as used in FIG. 3, and descriptions thereof will be omitted.

The allocation processing of the Ethernet signals "a" to "e" includes, first, a step of collecting port information of each of the nodes A to E, and a step of setting slot information from the node X to each of the nodes A to E. In FIG. 5, solid-line arrows indicate a transmission direction of port information, and dotted-line arrows indicate a transmission direction of slot information.

The port information indicates an allocation of the Ethernet signals "a" to "e" to the ports P1 to Pn, in each of the nodes A to E. The transmission controller CNT of each of the nodes A to E gives the port information to the overhead H (OH) of the frame signal to be transmitted from the network interface NW-IF #1. The frame signal including the port information is transmitted through any one of the clockwise lines #1 to # k and the counterclockwise lines #1 to # k.

In each of the nodes A to E, the frame signal including the port information is transmitted from the network interface NW-IF #1 to one of the adjacent nodes A to E, and X. For this reason, the port information pieces are sequentially given to the common overhead H in the nodes A to E, respectively. Accordingly, respective port information pieces of the nodes A to E are collected in one frame signal. The port information may be generated in advance by the transmission controller CNT, or may be set to each transmission device 1 from a network management device (e.g., OpS) (not illustrated).

The frame signal accommodating the port information is generated by, as an example, the transmission controller CNT of the node B as the master node, passes through the nodes A, X, E, D, C, B, and A in this order within the ring network NW, and then, is received by the node X. The node that generates the frame signal is not limited to the node B, and may be the node X.

The transmission controller CNTx of the node X acquires the port information of all the child nodes A to E from the frame signal received by the network interface NW-IF #2, and generates slot information of each of the nodes A to E on the basis of each port information piece. The slot information indicates an allocation of the Ethernet signals "a" to "e" at each of the ports P1 to Pn, to the slots of the frame signals Sa, Sb, and Sg, on the basis of the port information.

The transmission controller CNTx gives the slot information to the overhead H of the frame signal to be transmitted from the network interface NW-IF #1. The frame signal accommodating the slot information is transmitted to one adjacent node E from the network interface NW-IF #1. The frame signal Sg is transmitted to the nodes E, D, C, B, and A in this order in the ring network NW, and is returned to and discarded in the node X.

In the transmission device 1 of each of the nodes A to E, the transmission controller CNT acquires the slot information from the overhead H of the frame signal received by the network interface NW-IF #2, and allocates the Ethernet signals "a" to "e" to the slots, on the basis of the slot information. The frame processor FP accommodates the Ethernet signals "a" to "e" in the slots of the frame signals Sa and Sb according to the allocation. As a result, the transmission processing illustrated in FIG. 3 is performed.

The port information is included in a collection message accommodated in the overhead H. The slot information is included in a setting message accommodated in the overhead H.

FIG. 6 is a view illustrating an example of a collection message (see reference numeral Gc) and a setting message (see reference numeral Gd). Each of the collection message and the setting message includes a destination address (DA) indicating a reception destination, a source address (SA) indicating a transmission source, an "Ethernet Type" as a fixed value, and a "State" indicating an operation state. Each of the transmission devices 1 and 2 identifies the type of message by the "State."

The collection message indicates a collection mode in the "State" and includes the port information of each of the nodes A to E. The transmission controllers CNT of the nodes A to E give the port information of their own nodes A to E, to the collection message. The port information includes an identifier of each of the nodes A to E, a port ID as an identifier of each of the ports P1 to Pn, bands of the Ethernet signals "a" to "e," and information distinguishing a transmission port and a reception port from each other (hereinafter, referred to as "transmission/reception" information).

As described above, the port information indicates an allocation of the Ethernet signals "a" to "e" to the ports P1 to Pn. The port information includes an allocation of the bands of the Ethernet signals "a" to "e" to the ports P1 to Pn, and thus, the transmission controller CNTx of the node X may allocate the number of slots to the Ethernet signals "a" to "e" according to the bands. The band for each of the ports P1 to Pn may not be included in the port information, and may be set from, for example, the network management device to the transmission controller CNTx.

In the collection message, a collection flag is given to each of the nodes A to E. The collection flag indicates whether each of the nodes A to E has given the port information. The collection flag indicates completion ("1") or incompletion ("0") of the provision of the port information in each of the nodes A to E.

The transmission controller CNTx of the node X may determine whether the collection of the port information in each of the nodes A to E is completed, from the collection flag. When the collection of the port information is completed, the transmission controller CNTx generates slot information. The slot information includes transmission side slot information indicating an allocation of each slot in a frame signal Sg to be transmitted from the node X to the node Y, and reception side slot information indicating an allocation of each slot in a frame signal that accommodates the Ethernet signals included in a frame signal received from the node Y. The transmission side slot information indicates an allocation of slots to the Ethernet signals "a" to "e" received by the reception port of each of the nodes A to E, and the reception side slot information indicates an allocation of slots to the Ethernet signals transmitted from the transmission port of each of the nodes A to E.

When the transmission side slot information is generated, the transmission controller CNTx specifies a reception port of each of the nodes A to E according to the "transmission/reception" information in the port information. The transmission controller CNTx allocates slots to the reception port of each of the nodes A to E according to the band indicated by the port information. For this reason, as in the example of FIG. 3, three slots are allocated to the Ethernet signal "e" of 15 Gbps, and one slot is allocated to the Ethernet signal "d" of 5 Gbps. Therefore, the transmission device 1 of each of the nodes A to E may secure the number of slots according to the band of each of the Ethernet signals "a" to "e." The transmission controller CNT generates the transmission side slot information on the basis of the allocation result.

When the reception side slot information is generated, the transmission controller CNTx specifies a transmission port of each of the nodes A to E according to the "transmission/reception" information in the port information. The transmission controller CNTx acquires a calendar from an overhead of a frame signal received from, for example, the node Y, and generates the reception side slot information on the basis of the calendar and the port information. The transmission controller CNT generates a setting message including the transmission side slot information and the reception side slot information, and gives the setting message to the overhead H.

The setting message indicates a setting mode in the "State" and includes the transmission side slot information and the reception side slot information of each of the nodes A to E. The transmission side slot information and the reception side slot information include an identifier of each of the nodes A to E, a port ID as an identifier of each of the ports P1 to Pn, and a slot ID. The slot ID indicates a slot number #1 to #20 as a position of a slot within a frame signal.

The transmission side slot information and the reception side slot include a clockwise line ID and a counterclockwise line ID that identify the clockwise line #1 to # k and the counterclockwise line #1 to # k, respectively. The transmission controller CNTx selects unused lines from the clockwise lines #1 to # k and the counterclockwise lines #1 to # k, respectively, and allocates the selected lines to the Ethernet signals transmitted/received by each of the nodes A to E. The transmission controller CNTx allocates one of the clockwise lines #1 to # k and one of the counterclockwise lines #1 to # k to each Ethernet signal. Thus, when a failure has occurred within the ring network NW as described later, each of the nodes A to E may switch a route through which a frame signal is transmitted/received, to continue a transmission processing.

For example, in FIG. 3, the transmission device 1 of the node D transmits the frame signal Sa to the adjacent node E through the clockwise line #1 to # k. However, the transmission device 1 of the node D may switch a transmission route according to a failure so as to transmit the frame signal Sb to the adjacent node C through the counterclockwise line #1 to # k in the same manner as in the nodes A and B. In a case where the Ethernet signals are received from the node Y as well, the transmission device 1 of each of the nodes A to E may switch a reception route according to a failure in the same manner as described above, so as to receive the frame signal from any of the clockwise lines #1 to # k and the counterclockwise lines #1 to # k.

On the basis of the corresponding transmission side slot information, the transmission controller CNT of each of the nodes A to E allocates the Ethernet signals received by the reception port, to slots of the frame signals Sa and Sb to be transmitted on the line #1 to # k indicated by the clockwise line ID or the counterclockwise line ID. According to the allocation, the frame processor FP accommodates the Ethernet signals "a" to "e" in empty slots of the frame signals Sa and Sb to be transmitted to the adjacent nodes A to E, and X.

In this manner, the frame processor FP accommodates the Ethernet signals "a" to "e" in slots allocated on the basis of the transmission side slot information, among respective slots of the frame signals Sa and Sb that are received by one of the network interfaces NW-IF #1 and #2 and are to be transmitted from the other.

On the basis of the corresponding reception side slot information, the transmission controller CNT of each of the nodes A to E allocates the Ethernet signals to be transmitted from the transmission port, to slots of the frame signal as a reception target on the line #1 to # k indicated by the clockwise line ID or the counterclockwise line ID. According to the allocation, the frame processor FP separates the Ethernet signals from the allocated slots among respective slots of the frame signal received from the adjacent nodes A to E, and X.

Figure 7:
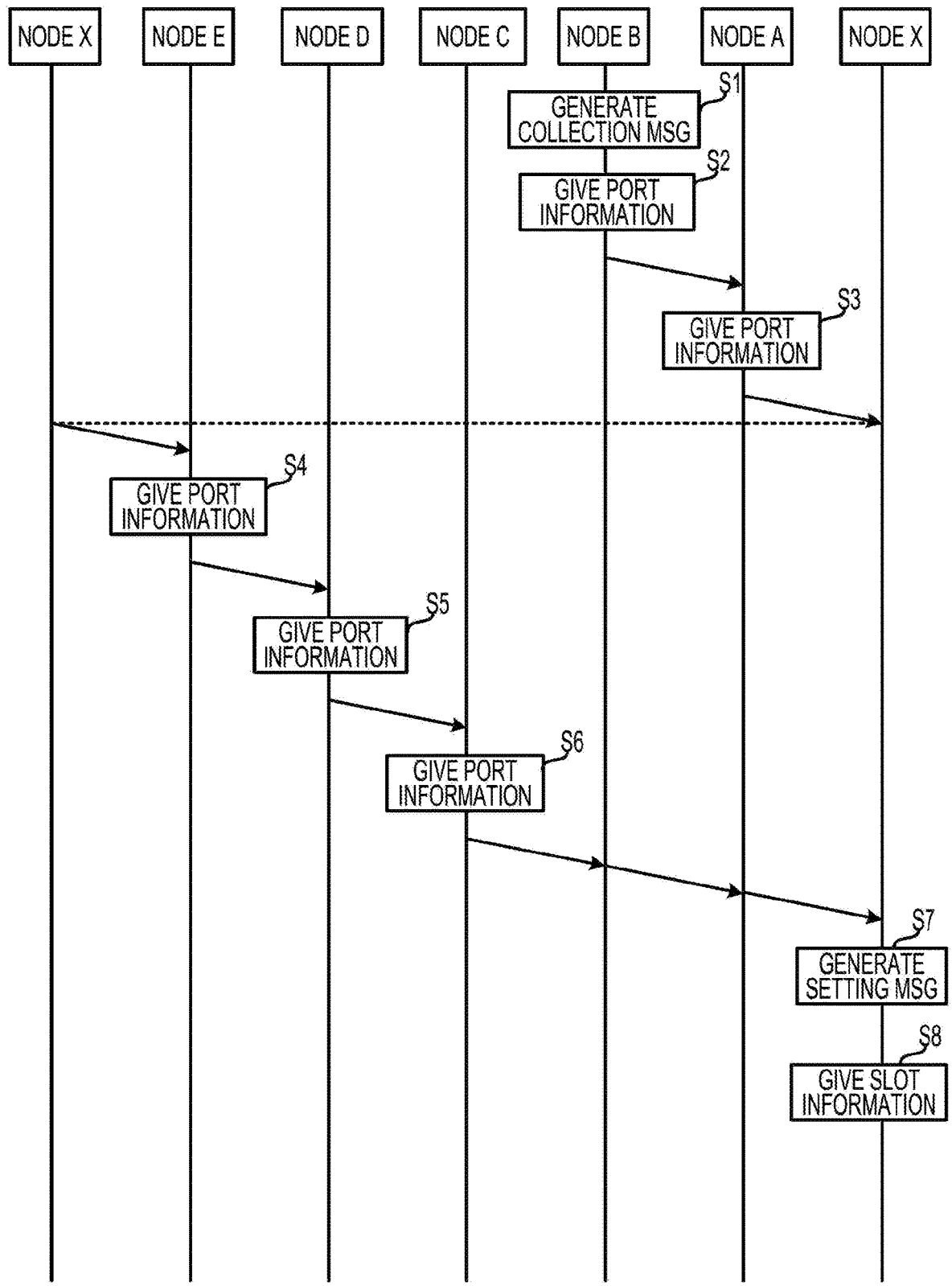
FIG. 7 is a sequence diagram (part 1) illustrating an example of a port information collection processing and a slot information distribution processing.
Figure 8:
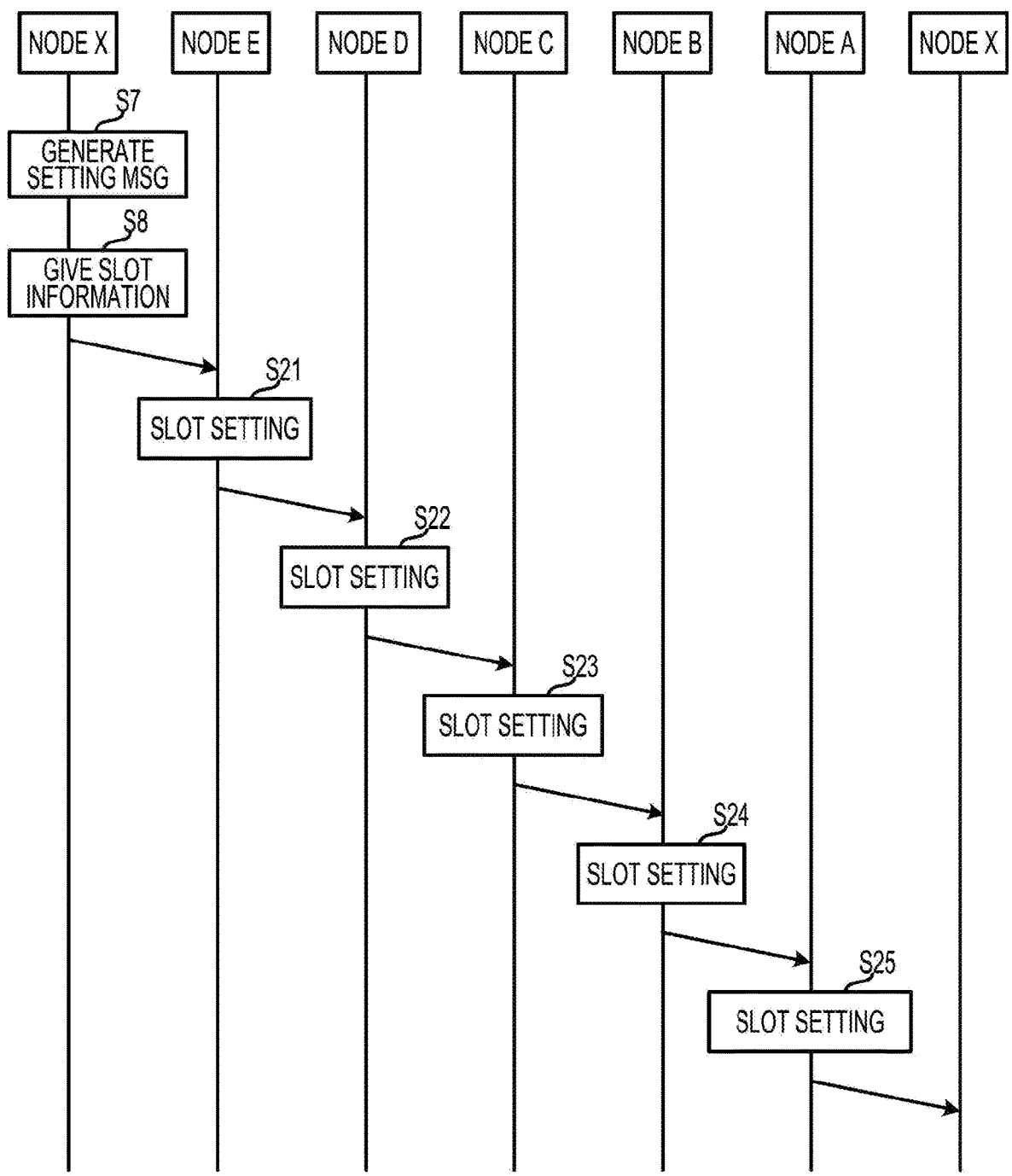
FIG. 8 is a sequence diagram (part 2) illustrating an example of the port information collection processing and the slot information distribution processing.

FIGS. 7 and 8 are sequence diagrams illustrating an example of a port information collection processing and a slot information distribution processing. First, descriptions will be made with reference to FIG. 7.

In the node B as the master node, the transmission controller CNT generates a collection message MSG (S1), and gives port information to the collection message (S2). The transmission controller CNT gives the collection message to an overhead H of a frame signal to be transmitted from the network interface NW-IF #1. The network interface NW-IF #1 transmits the frame signal including the collection message to the adjacent node A.

In the node A, the frame signal is received by the network interface NW-IF #2. The transmission controller CNT acquires the collection message from the frame signal, and gives port information to the collection message (S3). The transmission controller CNT gives the collection message to the overhead H of the frame signal to be transmitted from the network interface NW-IF #1. The network interface NW-IF #1 transmits the frame signal including the collection message to the adjacent node X. The transmission controller CNT of each of the nodes E, D, and C also gives port information to the collection message (S4 to S6).

In the node X, the frame signal is received by one network interface NW-IF #2 and is transmitted from the other network interface NW-IF #1 to the adjacent node E. Then, in the nodes E, D, and C, the same processings as that in the node A are executed, so that the frame signal is returned to the node B. The transmission controllers CNT of the node B and the node A have already given the port information, and thus, transmit the frame signal to the node X.

In the node X, the transmission controller CNTx acquires the collection message from the overhead of the frame signal received by the network interface NW-IF #2, and acquires the port information of each of the nodes A to E from the collection message. Here, since the collection flag of each of the nodes A to E is "1," the transmission controller CNTx determines that the collection of the port information of all the nodes A to E is completed.

When it is determined that the collection of the port information is completed, the transmission controller CNTx generates transmission side slot information and reception side slot information on the basis of the port information. The transmission controller CNTx generates a setting message MSG (S7), and gives transmission side slot information and reception side slot information to the setting message (S8).

Next, referring to FIG. 8, the transmission controller CNTx of the node X gives the setting message to an overhead of a frame signal to be transmitted from the network interface NW-IF #1 to the adjacent node E.

The transmission controller CNT of the node E acquires the setting message from the overhead of the frame signal received by the network interface NW-IF #2. The transmission controller CNT acquires the transmission side slot information and the reception side slot information of the node E from the setting message, and executes a processing of allocating Ethernet signals to slots on the basis of the transmission side slot information and the reception side slot information (S21). The transmission controller CNT gives the setting message to the overhead H of the frame signal to be transmitted from the network interface NW-IF #1 to the adjacent node D.

Next, in each of the nodes D, C, B, and A as well, the transmission controller CNT performs the same slot setting as that in the node E (S22 to S25). In the node X, the transmission controller CNT discards the frame signal received by the network interface NW-IF #2. In this manner, the port information collection processing and the slot information distribution processing are performed.

As described above, the transmission controller CNT of each of the nodes A to E gives the port information to the overhead H of the frame signal to be transmitted from the network interface NW-IF #1. The transmission controller CNT acquires the transmission side slot information and the reception side slot information from the overhead H of the frame signal received by the network interface NW-IF #2.

The frame processor FP accommodates the Ethernet signals "a" to "e" in slots allocated on the basis of the transmission side slot information, among respective slots of the frame signals Sa and Sb that are received by one of the network interfaces NW-IF #1 and #2 and are to be transmitted from the other. The frame processor FP separates the Ethernet signals from slots allocated on the basis of the reception side slot information, among respective slots of the frame signals Sa and Sb that are received by one of the network interfaces NW-IF #1 and #2 and are to be transmitted from the other. The separated Ethernet signals are transmitted from the transmission port to a data center DC.

The transmission controller CNTx of the node X acquires the port information of each of the nodes A to E from the overhead H of the frame signal received by the network interface NW-IF #2. The transmission controller CNTx generates the transmission side slot information and the reception side slot information of each of the nodes A to E on the basis of the port information. The transmission controller CNTx gives the transmission side slot information and the reception side slot information to the overhead H of the frame signal to be transmitted from the network interface NW-IF #1.

The frame processor FPx of the node X generates the frame signal Sg in which the Ethernet signals "a" to "e" are accommodated in respective slots on the basis of the transmission side slot information, from the frame signals Sa and Sb received by the network interfaces NW-IF #1 and #2, respectively.

According to the above-described configuration, the respective port information pieces of the nodes A to E are sequentially given to the overhead H of the frame signal flowing clockwise or counterclockwise in the ring network NW, and are transmitted to the node X. The transmission controller CNTx of the node X generates the slot information on the basis of the port information of each of the nodes A to E. The slot information pieces are given to the overhead H of the frame signal flowing clockwise or counterclockwise in the ring network NW, and are sequentially transmitted to the nodes A to E, respectively.

Therefore, according to the transmission devices 1 and 2, by using the frame signal circulating within the ring network NW, the port information from each of the nodes A to E may be easily collected and transmitted to the node X, so that the transmission side slot information may be easily transmitted from the node X to each of the nodes A to E. Accordingly, a load of a code-multiplex transmission processing in the ring network NW is reduced.

In this example, the port information and the slot information are transmitted in the same direction within the ring network NW. However, the port information and the slot information may be transmitted in opposite directions. In this case, in the node X, the slot information is given to the overhead H of the frame signal to be transmitted from the network interface NW-IF #2.

When a client signal is added, each of the nodes A to E transmits an addition request message including corresponding port information to the node X. Then, the node X generates slot information related to the added Ethernet signal from the port information, gives the slot information to an addition setting message, and transmits the addition setting message to each of the nodes A to E.

FIG. 9 is a view illustrating an example of an addition request message (see reference numeral Ge) and an addition setting message (see reference numeral Gf). The addition request message and the addition setting message have the same formats as the collection message and the setting message, respectively. In the addition request message, a "State" indicates an addition request mode, and in the addition setting message, a "State" indicates an addition setting mode.

Figure 10:
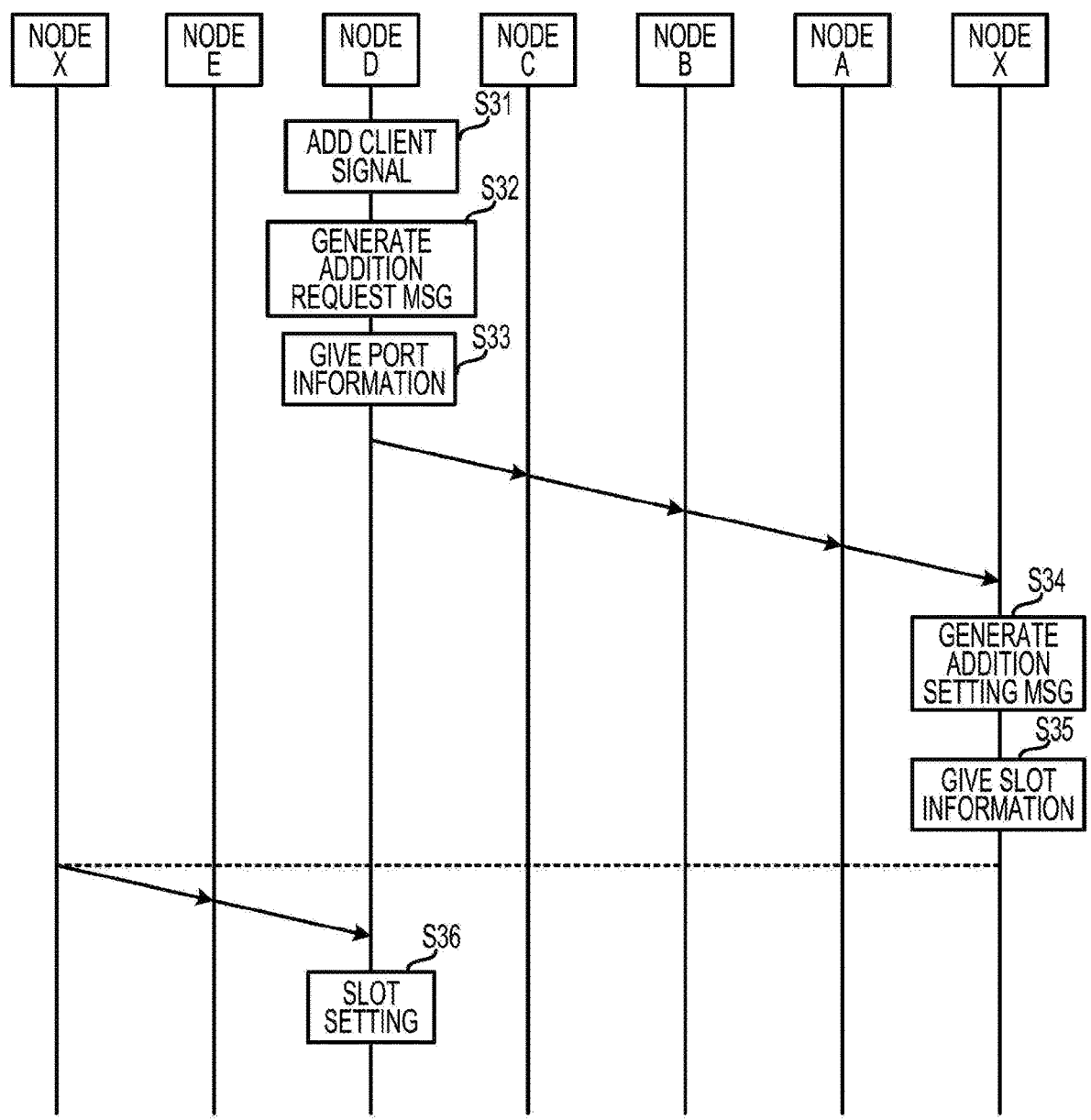
FIG. 10 is a sequence diagram illustrating an example of a client signal addition processing.

FIG. 10 is a sequence diagram illustrating an example of a client signal addition processing. For example, in the node D, when a client signal is added (S31), the transmission controller CNT generates an addition request message MSG (S32). The transmission controller CNT gives port information related to the added client signal to the addition request message (S33), and gives the addition request message to an overhead H of a frame signal to be transmitted from the network interface NW-IF #1. The frame signal is transmitted to the node X via the nodes C, B, and A.

In the node X, the transmission controller CNT acquires the port information from the overhead H of the frame signal Sg received by the network interface NW-IF #2, and generates slot information on the basis of the port information. The transmission controller CNT generates an addition setting message (S34), and gives the slot information to the addition setting message (S35).

The transmission controller CNTx of the node X gives the addition setting message to an overhead H of a frame signal to be transmitted from the network interface NW-IF #1. The frame signal is received by the node D via the node E.

The transmission controller CNT of the node D acquires the slot information from the overhead H of the frame signal received by the network interface NW-IF #2 and performs a setting processing of allocating the client signal to a slot (S36). In this manner, the client signal addition processing is performed.

Next, descriptions will be made on an operation of the transmission device 1 of each of the nodes A to E in a case where a failure has occurred in the ring network NW. The following operation is performed according to, for example, a part of a ring protection function of ITU-T (International Telecommunication Union Telecommunication sector) recommendation G.8032, in which a media access control (MAC) flash processing is not used.

Figure 11:
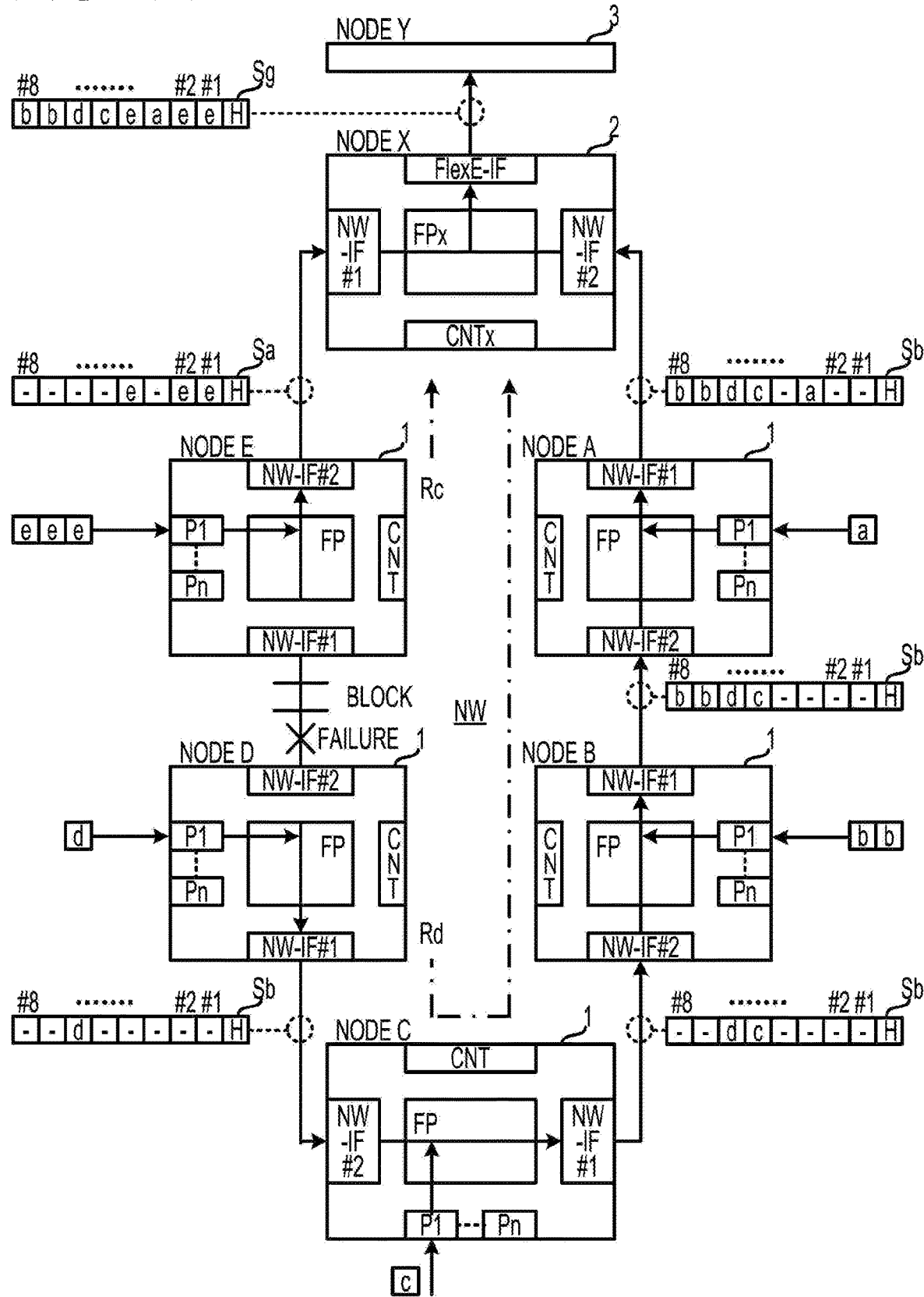
FIG. 11 is a view illustrating an example of a code-multiplex transmission in a ring network in a case where a failure has occurred between nodes.

FIG. 11 is a view illustrating an example of a code-multiplex transmission in the ring network NW in a case where a failure has occurred between the nodes E and D. In FIG. 11, the same components as those in FIG. 3 will be denoted by the same reference numerals as used in FIG. 3, and descriptions thereof will be omitted.

When a failure has occurred between, for example, the nodes E and D in the transmission state illustrated in FIG. 3, the transmission device 1 of each of the nodes E and D detects the failure with a non-reception of a No Request (NR) message, and transmits a Signal Failure (SF) message. Accordingly, the failure is detected in each of the nodes A to E, and X within the ring network NW.

Since an occurrence point of the failure is the section between the nodes E and D, the transmission device 1 of each of the nodes D and C switches a transmission route of the Ethernet signals "d" and "c" to an opposite route. For this reason, the transmission controller CNT of each of the nodes C and D switches a frame signal accommodating the Ethernet signals "d" and "c" from the frame signal Sa on the clockwise line #1 to # k to the frame signal Sb on the counterclockwise line #1 to # k. For this reason, the Ethernet signals "d" and "c" are accommodated in the frame signal Sb accommodating the Ethernet signals "a" and "b."

For this reason, the frame processors FP of the nodes A to D transmit the common frame signal Sb in which the Ethernet signals "a" to "d" are accommodated. Accordingly, the frame signal Sb is transmitted to the node X along a route Rd passing through the nodes D, C, B, and A in this order.

In addition, the transmission controller CNT of the node E accommodates the Ethernet signal "e" in the frame signal Sa to be transmitted from the network interface NW-IF #2, as in the frame signal Sa before the occurrence of the failure. Accordingly, the frame signal Sa is transmitted to the node X along a route Rc. The transmission controller CNTx of the node X combines the frame signals Sa and Sb from the routes Rc and Rd, respectively, and transmits the combined signal to the node Y.

Figure 12:
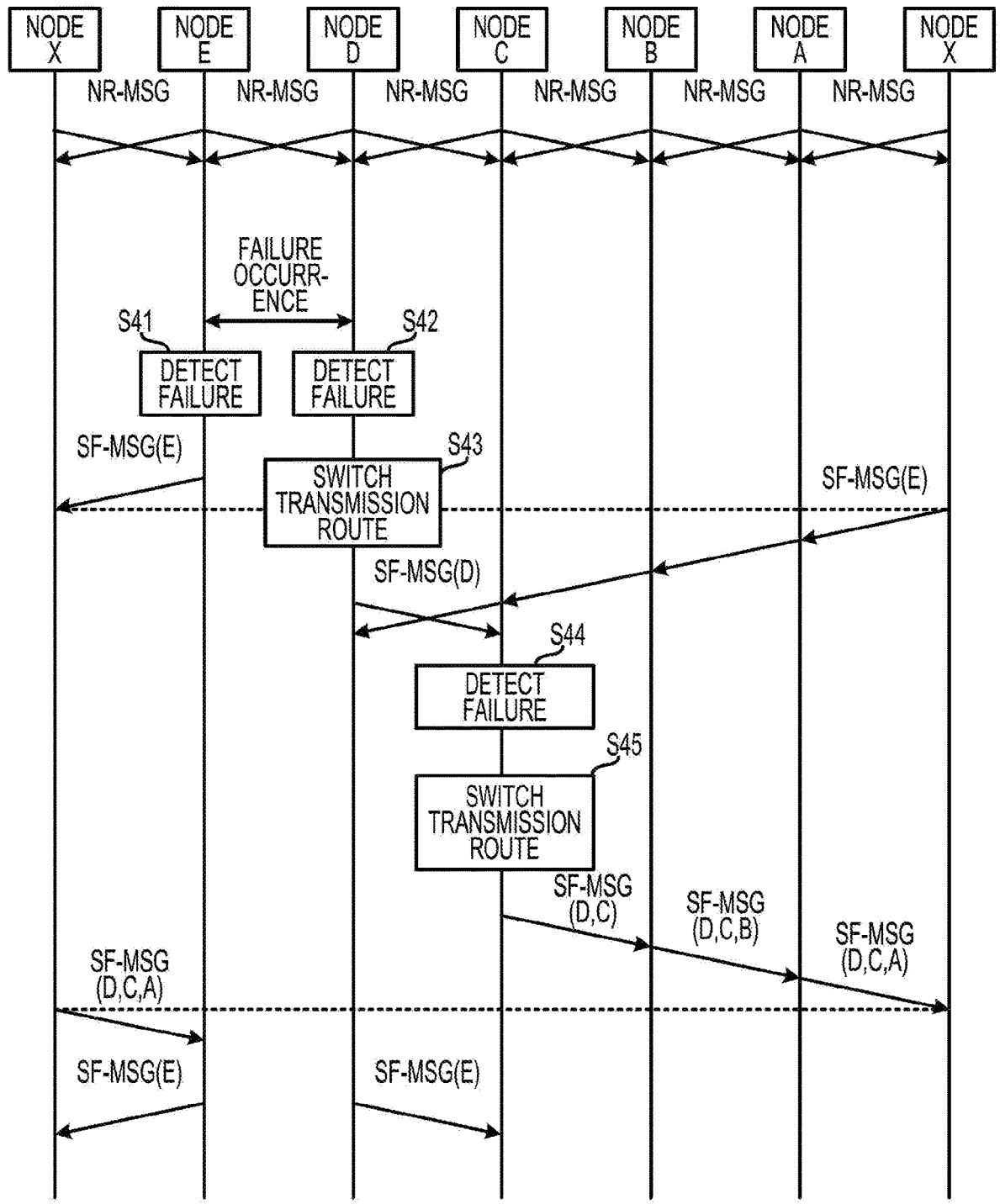
FIG. 12 is a sequence diagram illustrating a transmission route switching processing in the nodes when a failure occurs.

FIG. 12 is a sequence diagram illustrating a transmission route switching processing in the nodes A to E, and X when a failure occurs. The transmission devices 1 and 2 of the nodes A to E, and X monitor failure occurrence by transmitting/receiving NR messages to/from the adjacent nodes A to E, and X.

The transmission controller CNT of the node E detects a failure between the nodes E and D with a non-reception of an NR message (S41), and generates an SF message given a detection flag ("E") of the node E. The SF message is given to an overhead H and is transmitted from the node E to the node X. Then, the SF message is transmitted from the node X to the node D via the nodes A, B, and C.

The transmission controller CNT of the node D detects the failure between the nodes E and D with a non-reception of an NR message (S42), controls the frame processor FP to switch a transmission route of the Ethernet signal "d" (S43), and generates an SF message given a detection flag ("D") of the node D. The transmission controller CNT gives the SF message to an overhead H of a frame signal to be transmitted from the network interface NW-IF #1. The SF message is transmitted from the node D to the node C.

The transmission controller CNT of the node C detects the failure from the SF message (S44), and controls the frame processor FP to switch the transmission route of the Ethernet signal "c" (S45). The transmission controller CNT adds a detection flag ("C") of the node C to the SF message. The transmission controller CNT gives the SF message to the overhead H of the frame signal to be transmitted from the network interface NW-IF #1. The SF message is transmitted from the node C to the node B.

In the node B, the transmission controller CNT adds a detection flag ("B") of the node B to the SF message. The SF message is transmitted to the node A, and is added with a detection flag ("A") in the node A. Then, the SF message is transmitted to the node E via the node X. In each of the nodes E and D, during the failure occurrence, the SF message given with the detection flag ("E") is transmitted. In this manner, the transmission route switching processing is executed.

Next, descriptions will be made on a configuration of the transmission device 1 of each of the nodes A to E.

Figure 13:
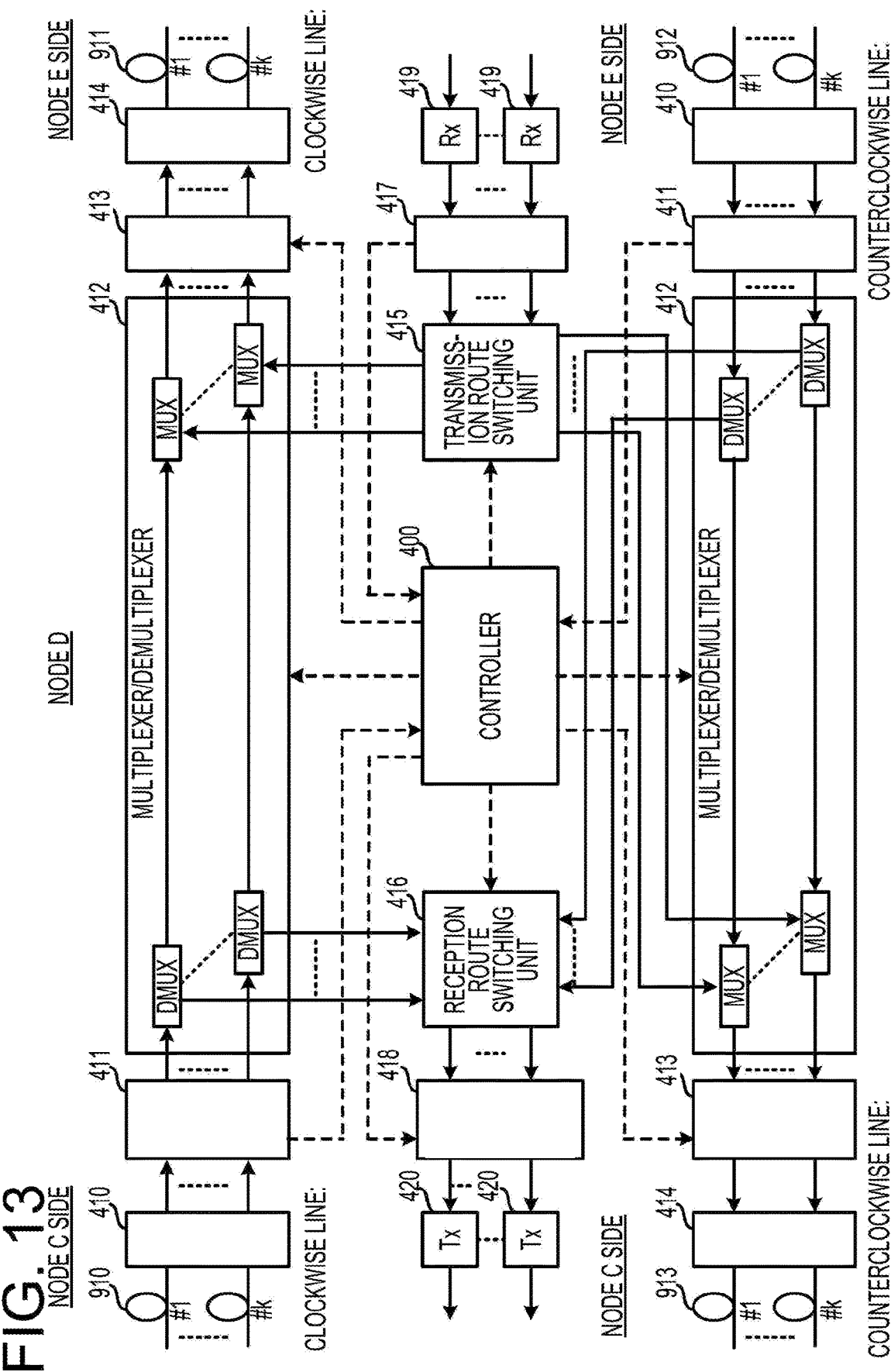
FIG. 13 is a configuration diagram illustrating an example of a transmission device.

FIG. 13 is a configuration diagram illustrating an example of the transmission device 1. The transmission device 1 includes a controller 400, a receiver 410, a transmitter 414, a reception port Rx 419, a transmission port Tx 420, an overhead (OH) detector 411, an overhead (OH) insertion unit 413, a multiplexer/demultiplexer 412, a transmission route switching unit 415, a reception route switching unit 416, an information extractor 417, and an information imparting unit 418.

The controller 400 corresponds to the transmission controller CNT, and the reception port 419 and the transmission port 420 correspond to the ports P1 to Pn. Two receivers 410, two transmitters 414, two multiplexers/demultiplexers 412, two OH detectors 411, and two OH insertion units 413 are provided corresponding to the clockwise lines #1 to # k and the counterclockwise lines #1 to # k, respectively. Two sets of transmitters 414 and receivers 410 correspond to the network interfaces NW-IF #1 and #2. Two sets of multiplexers/demultiplexers 412, OH detectors 411, and OH insertion units 413, and the transmission route switching unit 415 and the reception route switching unit 416 correspond to the frame processor FP.

Each reception port 419 receives Ethernet signals from a data center DC, and outputs the Ethernet signals to the information extractor 417. The reception port 419 includes, for example, a photo detector (PD) that performs an optical-electrical conversion or a demodulator.

The information extractor 417 extracts route information etc. from Ethernet signals and outputs the route information to the controller 400. The route information is used for the communication between the nodes A to E within the ring network NW as described later. The information extractor 417 outputs each Ethernet signal to the transmission route switching unit 415.

To the reception route switching unit 416, Ethernet signals are input from the multiplexers/demultiplexers 412 corresponding to reception source routes (hereinafter, referred to as "reception routes") of frame signals from adjacent two nodes of the nodes A to E, and X, respectively. The reception route switching unit 416 outputs the Ethernet signals to the information imparting unit 418. The information imparting unit 418 gives route information to the Ethernet signals according to an instruction of the controller 400. The information imparting unit 418 outputs the Ethernet signals to the transmission port 420.

Each transmission port 420 transmits Ethernet signals to a data center DC. Each transmission port 420 includes, for example, an LD that performs electro-optical conversion or a modulator.

The receiver 410 of one side is connected to transmission paths 910 on the clockwise lines #1 to # k, and the receiver 410 of the other side is connected to transmission paths 912 on the counterclockwise lines #1 to # k. The transmitter 414 of one side is connected to transmission paths 911 on the clockwise lines #1 to # k, and the transmitter 414 of the other side is connected to transmission paths 913 on the counterclockwise lines #1 to # k. For example, the transmission device 1 of the node D is connected to the node C via the transmission paths 910 and 913, and is connected to the node E via the transmission paths 911 and 912. The transmission paths 910 to 913 are provided corresponding to the number of clockwise lines #1 to # k and the number of counterclockwise lines #1 to # k.

The receiver 410 includes, for example, a PD that performs an optical-electrical conversion. The receiver 410 receives a frame signal from each of the transmission paths 910 and 912 and outputs the frame signal to the OH detector 411.

The OH detector 411 detects an overhead H from a frame signal and outputs the overhead H to the controller 400. Accordingly, the controller 400 executes various controls through a control channel. The OH detector 411 outputs data of a slot area of the frame signal to the multiplexer/demultiplexer 412.

The multiplexer/demultiplexer 412 includes multiplexing circuits MUX and demultiplexing circuits DMUX corresponding to the number of clockwise lines #1 to # k and the number of counterclockwise lines #1 to # k. The multiplexing circuits MUX are provided at the subsequent stage of the demultiplexing circuits DMUX when viewed from the OH detector 411.

The demultiplexing circuit DMUX separates Ethernet signals from data of a slot area input from the OH detector 411. The separated Ethernet signals are output to the transmission port 420, and transmitted from the transmission port 420 to a data center DC. The demultiplexing circuit DMUX performs a separation processing such that the Ethernet signals are taken out of slots at a timing instructed from the controller 400. When the Ethernet signals are separated from the slots of the frame signal received from the node X, the controller 400 sets an accommodation timing in the demultiplexing circuit DMUX on the basis of reception side slot information.

The multiplexing circuit MUX multiplexes Ethernet signals input from the reception port 419 with data of a slot area input from the demultiplexing circuit DMUX. The multiplexing circuit MUX performs a multiplexing processing such that the Ethernet signals are accommodated in slots at a timing instructed from the controller 400. When the Ethernet signals "a" to "e" are accommodated in the slots of the frame signals Sa and Sb to be transmitted to the node X, the controller 400 sets an accommodation timing in the multiplexing circuit MUX on the basis of transmission side slot information.

The transmission route switching unit 415 selects a transmission destination route (hereinafter, referred to as a "transmission route") of a frame signal by selecting an output destination of Ethernet signals from each reception port 419, between the two multiplexers/demultiplexers 412 corresponding to the clockwise lines #1 to # k and the counterclockwise lines #1 to # k, respectively. For example, in the node D, the transmission route switching unit 415 selects one of routes on the node E side and the node C side, as the transmission route. Here, the transmission route switching unit 415 switches multiplexing circuits MUX as the output destinations of the Ethernet signals according to a clockwise line ID and a counterclockwise line ID in the transmission side slot information.

The controller 400 controls the transmission route switching unit 415 according to an SF message when a failure occurs. For this reason, as described above with reference to FIG. 11, the transmission device 1 may switch a transmission route of a frame signal when a failure occurs.

The reception route switching unit 416 selects a reception route of a frame signal by selecting an output source of Ethernet signals to be output to each transmission port 420, between the two multiplexers/demultiplexers 412 corresponding to the clockwise lines #1 to # k and the counterclockwise lines #1 to # k, respectively. For example, in the node D, the reception route switching unit 416 selects one of routes on the node E side and the node C side, as the reception route. Here, the reception route switching unit 416 switches demultiplexing circuits DMUX as the output sources of the Ethernet signals according to a clockwise line ID and a counterclockwise line ID in the reception side slot information.

The controller 400 controls the transmission route switching unit 415 according to an SF message when a failure occurs. For this reason, the transmission device 1 may switch a reception route of a frame signal when a failure occurs. The multiplexer/demultiplexer 412 outputs data of a slot area, as a frame signal, to the OH insertion unit 413.

The OH insertion unit 413 generates an overhead H including various control messages input from the controller 400, and inserts the overhead H into a frame signal. The OH insertion unit 413 outputs the frame signal to the transmitter 414.

The transmitter 414 includes, for example, an LD that performs an electro-optical conversion. The transmitters 414 transmit frame signals to the transmission paths 911 and 913. The OH detector 411, the OH insertion unit 413, the multiplexer/demultiplexer 412, the transmission route switching unit 415, the reception route switching unit 416, the reception port 419, and the transmission port 420 are circuits constituted by, for example, hardware such as field programmable gate arrays (FPGAs) or application specified integrated circuits (ASICs).

Figure 14:
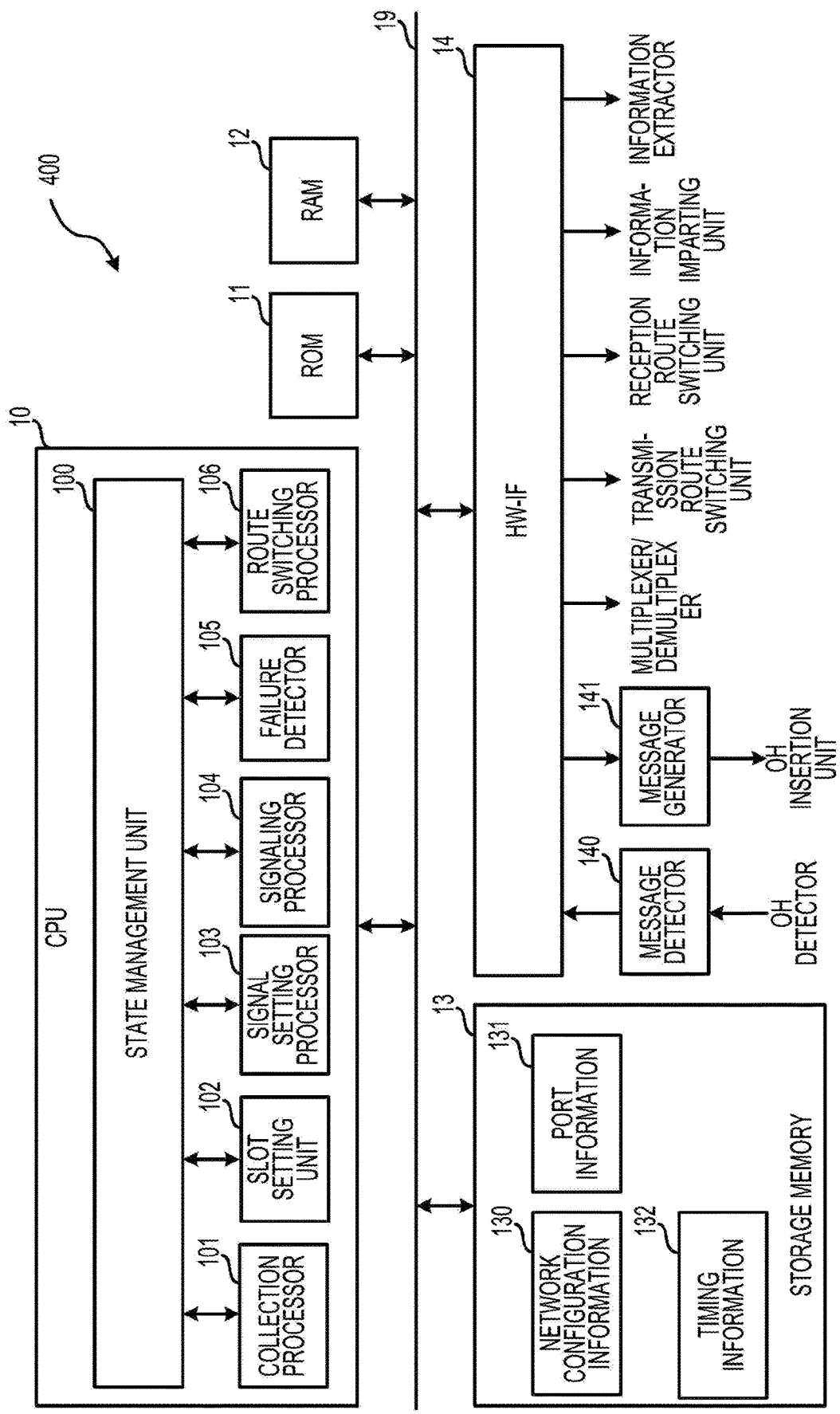
FIG. 14 is a configuration diagram illustrating an example of a controller.

FIG. 14 is a configuration diagram illustrating an example of the controller 400. The controller 400 includes a central processing unit (CPU) 10, a read only memory (ROM) 11, a random access memory (RAM) 12, a storage memory 13, and a hardware interface HW-IF 14. The CPU 10 is connected to the ROM 11, the RAM 12, the storage memory 13, and the HW-IF 14 via a bus 19 such that signals may be input/output to/from each other.

The controller 400 includes a message detector 140 and a message generator 141. The message detector 140 and the message generator 141 are connected to the CPU 10 via the HW-IF 14. The HW-IF 14, the message detector 140, and the message generator 141 are circuits constituted by, for example, hardware such as FPGAs or ASICs. The message detector 140 and the message generator 141 are not limited to hardware, and may be configured as functions of a program that drives the CPU 10.

The ROM 11 stores a program that drives the CPU 10. The RAM 12 functions as a working memory of the CPU 10. The HW-IF 14 relays a communication among the CPU 10, and the message detector 140, the message generator 141, the multiplexer/demultiplexer 412, the transmission route switching unit 415, the reception route switching unit 416, the information extractor 417, and the information imparting unit 418.

When a program is read from the ROM 11, the CPU 10 forms a state management unit 100, a collection processor 101, a slot setting unit 102, a signal setting processor 103, a signaling processor 104, a failure detector 105, and a route switching processor 106, as functions. The state management unit 100, the collection processor 101, the slot setting unit 102, the signal setting processor 103, the signaling processor 104, the failure detector 105, and the route switching processor 106 may be constituted by circuits such as the FPGAs. The storage memory 13 stores network configuration information 130, port information 131, and timing information 132.

The state management unit 100 manages the states of the nodes A to E, and instructs the state management unit 100, the collection processor 101, the slot setting unit 102, the signal setting processor 103, the signaling processor 104, the failure detector 105, and the route switching processor 106 to perform operations according to the states. The state management unit 100 executes a sequence according to received messages, that is, a collection message, a setting message, an addition request message, an addition setting message, an NR message, and an SF message. The message detector 140 detects each message from an overhead H detected by the OH detector 411, and outputs the message to the CPU 10.

The collection processor 101 executes a port information collection processing. The collection processor 101 reads the port information 131 from the storage memory 13 and outputs the port information 131 to the message generator 141. The message generator 141 generates a collection message, and gives the port information to the collection message. The message generator 141 outputs the collection message to the OH insertion unit 413. Accordingly, the message generator 141 gives the port information 131 to an overhead H of a frame signal. The message generator 141 is an example of a port information imparting unit.

When a collection message is detected by the message detector 140, the collection processor 101 adds port information of its own node A to E, to the collection message. Here, port information of other nodes A to E included in the collection message is still included in the collection message. For this reason, port information of each of the nodes A to E is given to one collection message.

When a setting message is detected by the message detector 140, the slot setting unit 102 acquires transmission side slot information and reception side slot information from the setting message. The slot setting unit 102 performs a slot setting by setting the timing information 132 on the basis of the transmission side slot information and the reception side slot information. The slot setting unit 102 is an example of a slot information acquisition unit.

The timing information 132 indicates a timing at which Ethernet signals are accommodated in slots, and a timing at which Ethernet signals are separated from slots on each of the clockwise lines #1 to # k and the counterclockwise lines #1 to # k, in the multiplexer/demultiplexer 412. The timing information 132 is, for example, information obtained by replacing a slot ID corresponding to a corresponding node ID in the transmission side slot information and the reception side slot information, with a multiplexing/separation time within the multiplexer/demultiplexer 412 with reference to a detection time of an overhead. For the multiplexer/demultiplexer 412, the signal setting processor 103 performs a control of a multiplexing timing and a separation timing of Ethernet signals on the basis of the timing information 132.

Accordingly, Ethernet signals are allocated to each slot of a frame signal transmitted to the node X and to each slot of a frame signal received from the node X. The collection processor 101 processes an addition request message in the same manner as that for the collection message, and the slot setting unit 102 processes an addition setting message in the same manner as that for the setting message.

The signaling processor 104 acquires route information of Ethernet signals from the information extractor 417. The route information includes, for example, a signaling request or advertisement data related to routing within a data center network. The signaling request includes, for example, virtual routing and forwarding (VRF) information or autonomous system (AS) information.

The signaling processor 104 outputs the route information to the message generator 141. The message generator 141 generates a message including the route information. The OH insertion unit 413 inserts the message including the route information into an overhead H of a frame signal.

Accordingly, route information is collected from each of the nodes A to E to the node X. The node X sets routes of Ethernet signals to be transmitted/received between the transmission ports 420 and the reception ports 419 of the nodes A to E within the ring network NW on the basis of the route information of each transmission port 420.

The signaling processor 104 generates route information according to route setting from the node X and outputs the route information to the information imparting unit 418. The information imparting unit 418 gives the route information to Ethernet signals to be output to the reception port 419.

The failure detector 105 detects a failure within the ring network NW on the basis of an NR message or an SF message detected by the message detector 140. The failure detector 105 detects the failure, for example, in a case where the NR message is not received in a predetermined period, or the SF message is received.

The route switching processor 106 specifies a failure point within the ring network NW on the basis of the network configuration information 130 and a flag of an NR message or an SF message, and controls the transmission route switching unit 415 and the reception route switching unit 416 according to the failure point. The network configuration information 130 indicates, for example, a connection relationship between the nodes A to E, and X.

For example, as in the example of FIG. 11, the route switching processor 106 switches a transmission route of a frame signal such that a route of the frame signal does not pass through a failure point. Here, according to the timing information 132, the route switching processor 106 controls the transmission route switching unit 415 such that an output destination of Ethernet signals received by the reception port 419 corresponding to a port ID is switched from one side of the clockwise line #1 to # k and the counterclockwise line #1 to # k corresponding to a clockwise line ID and a counterclockwise line ID, respectively, to the other side.

In this manner, the route switching processor 106, as an example of a switching unit, switches the accommodating destination of the Ethernet signal based on the transmission side slot information, from a frame signal to be transmitted from the transmitter 414 of one side to a frame signal to be transmitted from the transmitter 414 of the other side according to a failure occurrence point. For this reason, the transmission device 1 may continue to transmit a frame signal even when a failure occurs.

Next, a processing performed by the transmission device 1 will be described.

Figure 15:
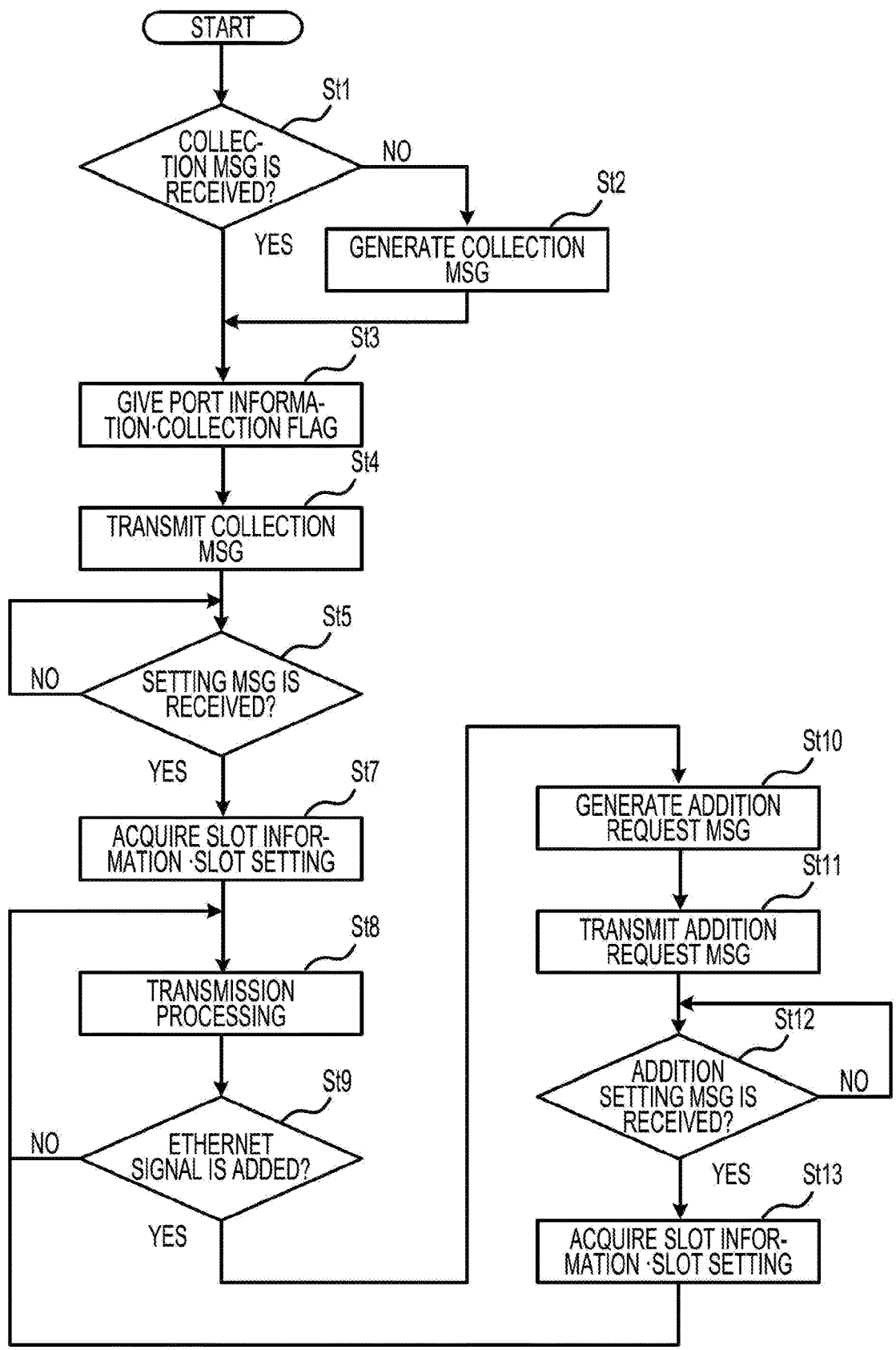
FIG. 15 is a flowchart illustrating an example of a processing of allocating Ethernet signals to slots.

FIG. 15 is a flowchart illustrating an example of a processing of allocating Ethernet signals to slots. The collection processor 101 determines whether a collection message has been received from the adjacent node A to E (step St1).

When it is determined that the collection message has been received ("Yes" in step St1), the message generator 141 gives port information and a collection flag (="1") to the collection message (step St3). More specifically, the message generator 141 gives port information and a collection flag to the received collection message.

In addition, when it is determined that the collection message has not been received within a predetermined time ("No" in step St1), the message generator 141 generates the collection message (step St2). Then, the processing in step St3 is performed. Such a case may be, for example, a case where a node is a master node such as the node B. The message generator 141 outputs the collection message to the OH insertion unit 413 so as to transmit the collection message to the adjacent node A to E, and X (step St4).

Then, the slot setting unit 102 determines whether a setting message has been received by the message detector 140 (step St5). When it is determined that the setting message has not been received ("No" in step St5), the slot setting unit 102 performs the processing in step St5 again. In addition, when it is determined that the setting message has been received ("Yes" in step St5), the slot setting unit 102 acquires transmission side slot information and reception side slot information from the setting message, and performs a slot setting on the basis of the transmission side slot information and the reception side slot information (step St7). Accordingly, the timing information 132 is generated.

Next, on the multiplexer/demultiplexer 412, the signal setting processor 103 performs a control of a multiplexing timing and a separation timing of Ethernet signals on the basis of the timing information 132, so as to perform a frame signal transmission processing (step St8). Then, the state management unit 100 determines whether a new Ethernet signal is added in the transmission port 420 or the reception port 419 (step St9). The addition of the Ethernet signal is notified to the state management unit 100 by, for example, the network management device (not illustrated).

When it is determined that no Ethernet signal is added ("No" in step St9), the processing in step St8 is performed again. When it is determined that an Ethernet signal is added ("Yes" in step St9), the message generator 141 generates an addition request message including port information of the added Ethernet signal (step St10). The collection processor 101 outputs the addition request message to the OH insertion unit 413 so as to transmit the addition request message to the adjacent node A to E, and X (step St11).

Next, the slot setting unit 102 determines whether an addition setting message has been received by the message detector 140 (step St12). When it is determined that the addition setting message has not been received ("No" in step St12), the slot setting unit 102 performs the processing in step St12 again.

When it is determined that the addition setting message has been received ("Yes" in step St12), the slot setting unit 102 acquires slot information from the addition setting message, and performs a slot setting on the basis of the slot information (step St13). Then, each processing subsequent to step St8 is executed. In this manner, the allocation processing of Ethernet signals is performed.

Figure 16:
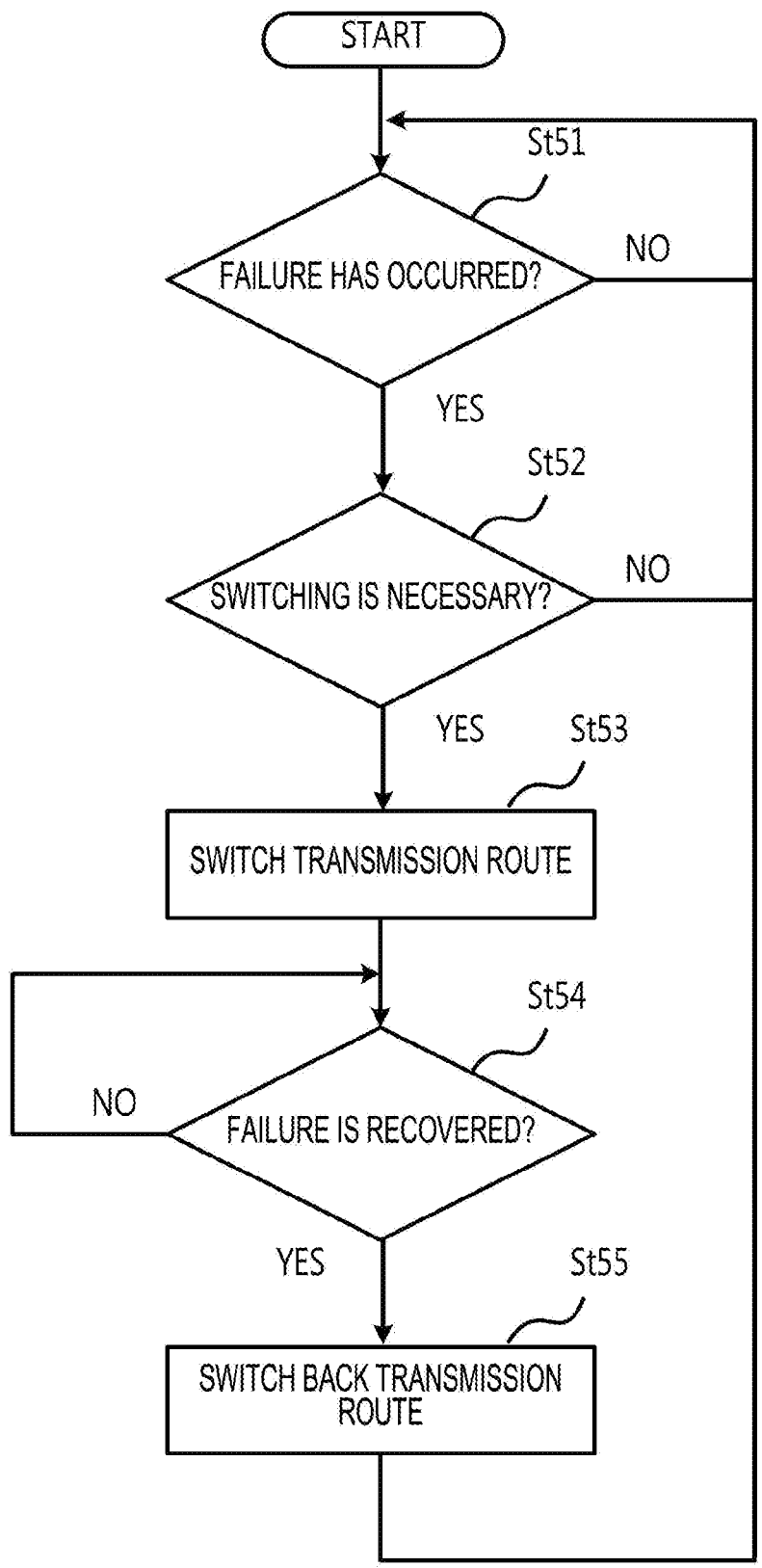
FIG. 16 is a flowchart illustrating an example of a failure processing.

FIG. 16 is a flowchart illustrating an example of a failure processing. This processing is performed in parallel to, for example, a frame signal transmission processing.

The failure detector 105 determines whether a failure has occurred within the ring network NW, on the basis of an NR message or an SF message (step St51). When it is determined that no failure has not occurred ("No" in step St51), the processing in step St51 is executed again.

When it is determined that the failure has occurred ("Yes" in step St51), the route switching processor 106 determines whether switching a route of a frame signal is necessary, on the basis of the network configuration information 130 and a flag of the NR message or the SF message (step St52). When it is determined that switching a route is unnecessary ("No" in step St52), the processing in step St51 is executed again.

When it is determined that switching a route is necessary ("Yes" in step St52), the route switching processor 106 controls the transmission route switching unit 415 to switch a transmission route (step St53). For this reason, the route of the frame signal is switched to a route which does not pass through an occurrence point of the failure.

The failure detector 105 determines whether the failure within the ring network NW has been recovered, on the basis of the NR message or the SF message (step St54). When it is determined that the failure has not been recovered ("No" in step St54), the processing in step St54 is executed again.

When it is determined that the failure has been recovered ("Yes" in step St54), the route switching processor 106 performs a control to switch back the transmission route, on the transmission route switching unit 415 (step St55). Accordingly, the route of the frame signal is switched back to the route before the occurrence of the failure. Then, each processing subsequent to step St51 is executed. In this manner, the failure processing is performed. The route switching processor 106 also switches a reception route in the same manner as described above.

Next, a configuration of the transmission device 2 of the node X will be described.

Figure 17:
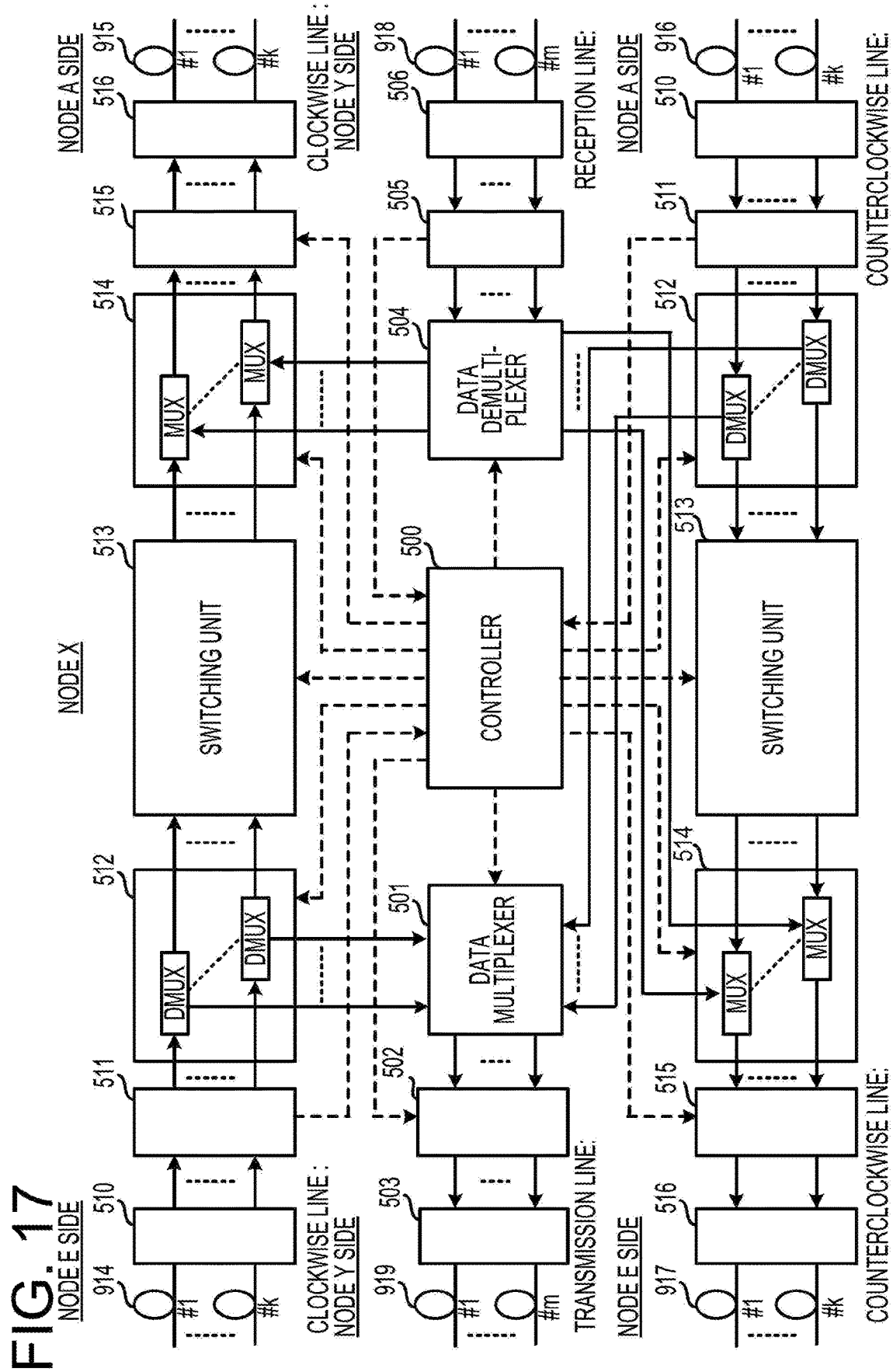
FIG. 17 is a configuration diagram illustrating an example of a transmission device.

FIG. 17 is a configuration diagram illustrating an example of the transmission device 2. The transmission device 2 includes a controller 500, a data multiplexer 501, a data demultiplexer 504, receivers 506 and 510, transmitters 503 and 516, OH detectors 505 and 511, and OH insertion units 502 and 515. The transmission device 2 includes a switching unit 513, a demultiplexing processor 512, and a multiplexing processor 514.

The controller 500 corresponds to the transmission controller CNTx. Two receivers 510, two transmitters 516, two multiplexing processors 514, two demultiplexing processors 512, two OH detectors 511, and two OH insertion units 515 are provided corresponding to the clockwise lines #1 to # k and the counterclockwise lines #1 to # k, respectively. Two sets of transmitters 516 and receivers 510 correspond to the network interfaces NW-IF #1 and #2.

The transmitter 503 and the receiver 506 correspond to the Flex Ethernet interface FlexE-IF. The OH detectors 505 and 511, the OH insertion units 502 and 515, the switching unit 513, the demultiplexing processor 512, and the multiplexing processor 514 correspond to the frame processor FPx. The transmitter 503 is connected to transmission paths 919 on the transmission lines #1 to # m to transmit a frame signal to the node Y. The receiver 506 is connected to transmission paths 918 on the reception lines #1 to # m to receive a frame signal from the node Y.

The receiver 510 of one side is connected to transmission paths 914 on the clockwise lines #1 to # k to receive a frame signal from the adjacent node E. The receiver 510 of the other side is connected to transmission paths 916 on the counterclockwise lines #1 to # k to receive a frame signal from the adjacent node A. The transmitter 516 of one side is connected to transmission paths 915 on the clockwise lines #1 to # k to transmit a frame signal to the adjacent node A. The transmitter 516 of the other side is connected to transmission paths 917 on the counterclockwise lines #1 to # k to transmit a frame signal to the adjacent node E.

The receiver 510 includes, for example, a PD that performs an optical-electrical conversion. The receiver 510 receives a frame signal and outputs the frame signal to the OH detector 511.

The OH detector 511 detects an overhead H from a frame signal and outputs the overhead H to the controller 500. Accordingly, the controller 500 executes various controls through a control channel. The OH detector 511 outputs data of a slot area of the frame signal to the demultiplexing processor 512.

The demultiplexing processor 512 separates Ethernet signals from data of a slot area input from the OH detector 511 at a timing instructed from the controller 500. The demultiplexing processor 512 includes demultiplexing circuits DMUX corresponding to the number of clockwise lines #1 to # k and the number of counterclockwise lines #1 to # k. The demultiplexing circuits DMUX are the same as described above. The Ethernet signals separated by the demultiplexing circuits DMUX are input to the data multiplexer 501.

The data multiplexer 501 outputs Ethernet signals input from the demultiplexing processors 512 corresponding to two routes, respectively, at a timing according to each slot of a frame signal Sg to be transmitted to one of the transmission lines #1 to # m, according to an instruction from the controller 500. Accordingly, the Ethernet signals are accommodated in the frame signal Sg according to transmission side slot information.

Therefore, the transmission device 2 may combine the frame signals Sa and Sb transmitted from the clockwise line #1 to # k and the counterclockwise line #1 to # k, respectively, into one frame signal Sg. The data multiplexer 501 outputs data of a slot area of the frame signal to the OH insertion unit 502.

The OH insertion unit 502 generates an overhead H including various control messages input from the controller 500, and inserts the overhead H into a frame signal. The OH insertion unit 502 outputs the frame signal to the transmitter 503. The transmitter 503 transmits the frame signal via the transmission line #1 to # m.

In this manner, the data multiplexer 501 generates the frame signal Sg in which the Ethernet signal is accommodated in each slot, from the frame signals Sa and Sb received by the receivers 510 of the routes, respectively, on the basis of the transmission side slot information. For this reason, the transmission device 2 may combine the frame signals Sa and Sb received at the clockwise line #1 to # k and the counterclockwise line #1 to # k, respectively, into one frame signal Sg and transmit the frame signal Sg to the node Y. The data multiplexer 501 is an example of a generator.

For the data multiplexer 501, the controller 500 performs a control of a timing at which Ethernet signals on the clockwise line #1 to # k and the counterclockwise line #1 to # k are multiplexed into a frame signal Sg, for each of the transmission lines #1 to # m, on the basis of a slot ID. For this reason, the Ethernet signals "a" to "e" are accommodated in the allocated slots among the respective slots of the frame signal Sg on the basis of the transmission side slot information.

The receiver 506 includes, for example, a PD that performs an optical-electrical conversion. The receiver 506 receives a frame signal via the reception line #1 to # m of the transmission path 918, and outputs the frame signal to the OH detector 505.

The OH detector 505 detects an overhead from a frame signal and outputs the overhead to the controller 500. Accordingly, the controller 500 executes various controls through a control channel. The OH detector 505 outputs data of a slot area of the frame signal to the data demultiplexer 504.

At a timing instructed from the controller 500, the data demultiplexer 504 separates Ethernet signals to be transmitted to the transmission path 915 on the node A side, from a frame signal, and outputs the Ethernet signals to the multiplexing processor 514 of one side, and separates Ethernet signals to be transmitted to the transmission path 917 on the node E side and outputs the Ethernet signals to the multiplexing processor 514 of the other side. The data demultiplexer 504 separates Ethernet signals on the basis of a calendar set by the node Y.

The multiplexing processor 514 includes multiplexing circuits MUX corresponding to the number of clockwise lines #1 to # k and the number of counterclockwise lines #1 to # k. The multiplexing circuits MUX are the same as described above. The multiplexing processors 514 accommodate Ethernet signals in respective slots of frame signals on the clockwise line #1 to # k and the counterclockwise line #1 to # k, at a timing instructed from the controller 500. The multiplexing processor 514 outputs data of a slot area of a frame signal to the OH insertion unit 515.

The OH insertion unit 515 generates an overhead including various control messages input from the controller 500, and inserts the overhead into a frame signal. The OH insertion unit 515 outputs the frame signal to each transmitter 516.

The transmitter 516 includes, for example, an LD that performs an electro-optical conversion. The transmitter 516 of one side transmits a frame signal to the transmission path 915 on the node A side via the clockwise line #1 to # k. The transmitter 516 of the other side transmits a frame signal to the transmission path 917 on the node E side via the counterclockwise line #1 to # k.

The switching unit 513 is connected between the demultiplexing processor 512 and the multiplexing processor 514. On the basis of a setting from the controller 500, the switching unit 513 separates Ethernet signals from a frame signal input from the demultiplexing processor 512, and accommodates the Ethernet signals in the slots of a frame signal to be output to the multiplexing processor 514.

The switching unit 513 performs a switching between an input side port and an output side port on the basis of a setting. Accordingly, the switching unit 513 of one side may output Ethernet signals to a counterclockwise line #1 to # k other than the counterclockwise line #1 to # k on the input side, and the switching unit 513 of the other side may output Ethernet signals to a clockwise line #1 to # k other than the clockwise line #1 to # k on the input side.

For this reason, as described below, Ethernet signals may be transmitted/received between the nodes A to E within the ring network NW. When such communication is not performed between the nodes A to E within the ring network NW, the switching unit 513 is set such that the counterclockwise lines #1 to # k and the clockwise lines #1 to # k on the input side and the output side to become identical.

The OH detectors 505 and 511, the OH insertion units 502 and 515, the demultiplexing processor 512, the multiplexing processor 514, the data multiplexer 501, the data demultiplexer 504, and the switching unit 513 are circuits constituted by, for example, hardware such as FPGAs or ASICs.

Figure 18:
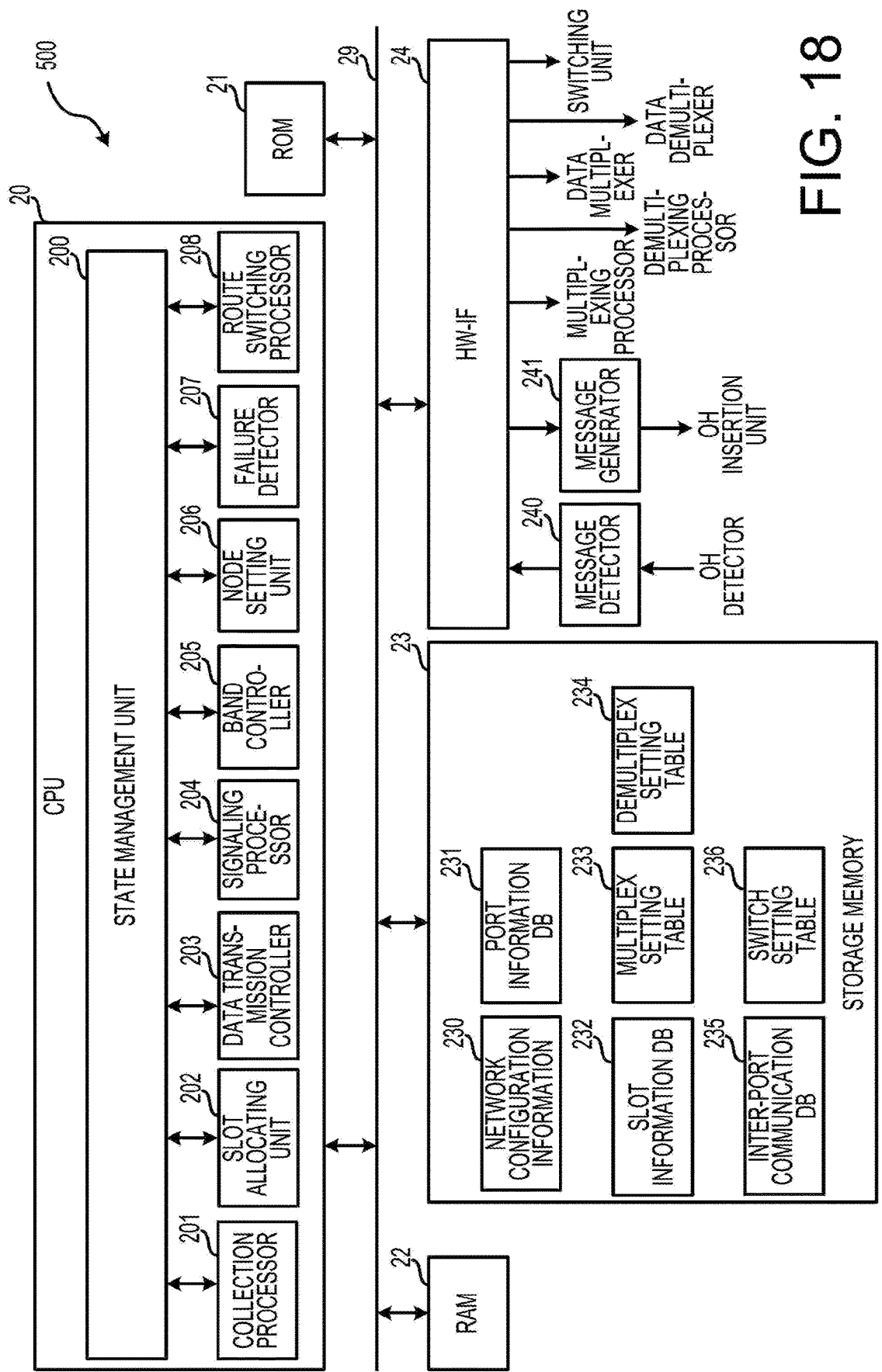
FIG. 18 is a configuration diagram illustrating an example of a controller.

FIG. 18 is a configuration diagram illustrating an example of the controller 500. The controller 500 includes a CPU 20, a ROM 21, a RAM 22, a storage memory 23, and a hardware interface 24. The CPU 20 is connected to the ROM 21, the RAM 22, the storage memory 23, and the HW-IF 24 via a bus 29 such that signals may be input/output to/from each other.

The controller 500 includes a message detector 240 and a message generator 241. The message detector 240 and the message generator 241 are connected to the CPU 20 via the HW-IF 24. The HW-IF 24, the message detector 240, and the message generator 241 are circuits constituted by, for example, hardware such as FPGAs or ASICs. The message detector 240 and the message generator 241 are not limited to hardware, and may be configured as functions of a program that drives the CPU 20.

The ROM 21 stores a program that drives the CPU 20. The RAM 22 functions as a working memory of the CPU 20.

The HW-IF 24 relays a communication among the CPU 20, and the message detector 240, the message generator 241, the multiplexing processor 514, the demultiplexing processor 512, the data multiplexer 501, the data demultiplexer 504, and the switching unit 513.

When a program is read from the ROM 21, the CPU 20 forms a state management unit 200, a collection processor 201, a slot allocating unit 202, a data transmission controller 203, a signaling processor 204, a band controller 205, a node setting unit 206, a failure detector 207, and a route switching processor 208, as functions. The state management unit 200, the collection processor 201, the slot allocating unit 202, the data transmission controller 203, the signaling processor 204, the band controller 205, the node setting unit 206, the failure detector 207, and the route switching processor 208 may be constituted by circuits such as FPGAs.

The storage memory 23 stores network configuration information 230, a port information database 231, a slot information DB 232, a multiplex setting table 233, a demultiplex setting table 234, an inter-port communication database 235, and a switch setting table 236. The network configuration information 230 is the same as the network configuration information 130 of the transmission device 1.

FIG. 19 is a view illustrating an example of the port information DB 231 and the slot information DB 232. The port information DB 231 is generated from port information collected from each of the nodes A to E. In the port information DB 231, a port ID of each of the nodes A to E, bands of Ethernet signals, and "transmission/reception" information are registered.

The slot information DB 232 is generated from the port information DB 231. The slot information DB 232 includes transmission side slot information and reception side slot information. The transmission side slot information and the reception side slot information include a node ID, a port ID, a clockwise line ID, a counterclockwise line ID, and a slot ID as described above.

Referring back to FIG. 18, the state management unit 200 manages the state of the node X, and instructs operations according to the state to the collection processor 201, the slot allocating unit 202, the data transmission controller 203, the signaling processor 204, the band controller 205, the node setting unit 206, the failure detector 207, and the route switching processor 208. The state management unit 200 executes a sequence according to received messages, that is, a collection message, a setting message, an addition request message, an addition setting message, an NR message, and an SF message. The message detector 240 detects each message from an overhead H detected by each of the OH detectors 505 and 511, and outputs the message to the CPU 20.

The collection processor 201 acquires port information from an overhead H of a frame signal received from the nodes A to E. The collection processor 201 executes a port information collection processing. The collection processor 201 generates the port information DB 231 from the port information, and stores the port information DB 231 in the storage memory 23. The collection processor 201 is an example of a port information acquisition unit.

The collection processor 201 acquires route information related to routes of Ethernet signals to be transmitted/received between the transmission ports 420 and the reception ports 419 of the nodes A to E, from an overhead of a frame signal received by any one of the receivers 510. The signaling processor 204 generates the inter-port communication DB 235 from the route information.

On the basis of the port information DB 231, the slot allocating unit 202 allocates slots to a frame signal to be transmitted from the reception port 419 of each of the nodes A to E to the node Y, and to a frame signal to be transmitted to the transmission port 420 of each of the nodes A to E from the node Y. In the slot allocation of the frame signal from the node Y, the slot allocating unit 202 uses a calendar given to an overhead of the frame signal from the node Y. For example, the calendar is extracted by the message detector 240 from the overhead detected by the OH detector 505 and is output to the slot allocating unit 202.

In this manner, on the basis of the port information DB 231, the slot allocating unit 202 generates the transmission side slot information and the reception side slot information indicating an allocation of Ethernet signals to slots of a frame signal at each transmission port 420 and each reception port 419, respectively. For this reason, the slot allocating unit 202 may allocate slots of a frame signal according to a use state of the transmission port 420 and the reception port 419 of each of the nodes A to E. The slot allocating unit 202 is an example of an information generator.

The slot allocating unit 202 registers the transmission side slot information and the reception side slot information in the slot information DB 232. The slot allocating unit 202 outputs the transmission side slot information and the reception side slot information to the message generator 241.

The message generator 241 generates a setting message, and gives the transmission side slot information and the reception side slot information to the setting message. The setting message is output from the message generator 241 to the OH insertion unit 515.

In this manner, the message generator 241 gives the transmission side slot information or the reception side slot information to an overhead of a frame signal to be transmitted from any one of the transmitters 516. The message generator 241 is an example of a slot information imparting unit. The collection processor 201 and the slot allocating unit 202 also process an addition request message and an addition setting message in the same manner as described above.

The data transmission controller 203 controls the multiplexing processor 514 and the demultiplexing processor 512 on the basis of the transmission side slot information and the reception side slot information. The data transmission controller 203 generates the multiplex setting table 233 on the basis of the transmission side slot information, and generates the demultiplex setting table 234 on the basis of a calendar and the reception side slot information. The data transmission controller 203 controls the data multiplexer 501 on the basis of the multiplex setting table 233, and controls the data demultiplexer 504 on the basis of the demultiplex setting table 234.

FIG. 20 is a view illustrating an example of the multiplex setting table 233 and the demultiplex setting table 234. The multiplex setting table 233 includes a transmission line ID (#1 to # m), a clockwise line ID (#1 to # k), a clockwise reception slot ID, a counterclockwise line ID (#1 to # k), and a counterclockwise reception slot ID. Here, the clockwise reception slot ID indicates slot IDs of a frame signal received via the clockwise lines #1 to # k, and the counterclockwise reception slot ID indicates slot IDs of a frame signal received via the counterclockwise lines #1 to # k.

The data multiplexer 501 accommodates Ethernet signals within a frame signal on the clockwise lines #1 to # k according to a clockwise line ID, and Ethernet signals within a frame signal on the counterclockwise line #1 to # k according to a counterclockwise line ID, in a frame signal to be transmitted via the transmission line #1 to # m according to a transmission line ID. The slots serving as an Ethernet signal accommodating destination are determined by a clockwise reception slot ID and a counterclockwise reception slot ID.

The demultiplex setting table 234 includes a reception line ID (#1 to # m), a clockwise line ID (#1 to # k), a clockwise transmission slot ID, a counterclockwise line ID (#1 to # k), and a counterclockwise transmission slot ID. Here, the clockwise transmission slot ID indicates slot IDs as separation sources of Ethernet signals to be accommodated in a frame signal transmitted via the clockwise lines #1 to # k, and the counterclockwise transmission slot ID indicates slot IDs as separation sources of Ethernet signals to be accommodated in a frame signal transmitted via the counterclockwise lines #1 to # k.

The data demultiplexer 504 separates Ethernet signals from a frame signal received via the reception lines #1 to # m according to a reception line ID, and accommodates the Ethernet signals in frame signals on the clockwise lines #1 to # k according to a clockwise line ID, and the counterclockwise lines #1 to # k according to a counterclockwise line ID. The slots serving as an Ethernet signal separation source are determined by a clockwise transmission slot ID and a counterclockwise transmission slot ID.

For the two demultiplexing processors 512, the data transmission controller 203 performs a control of a timing at which Ethernet signals "a" to "e" are separated from frame signals Sa and Sb from the nodes A to E, on the basis of the transmission side slot information. For the data multiplexer 501, the data transmission controller 203 performs a control of a timing at which the Ethernet signals "a" to "e" are accommodated in a frame signal Sg to the node Y, on the basis of the multiplex setting table 233. Accordingly, the Ethernet signals "a" to "e" are transmitted to the node Y from the nodes A to E within the ring network NW.

For the data demultiplexer 504, the data transmission controller 203 performs a control of a timing at which Ethernet signals are separated from a frame signal from the node Y, on the basis of the demultiplex setting table 234. For the two multiplexing processors 514, the data transmission controller 203 performs a control of a timing at which the Ethernet signals are accommodated in frame signals to the nodes A to E, on the basis of the reception side slot information. Accordingly, the Ethernet signals are transmitted from the node Y to the nodes A to E within the ring network NW.

Referring back to FIG. 18, the signaling processor 204 detects the transmission port 420 and the reception port 419 that transmit/receive Ethernet signals to/from each other, from route information of each transmission port 420 and each reception port 419. The signaling processor 204 generates the inter-port communication DB 235 and the switch setting table 236 on the basis of a detection result.

The data transmission controller 203 performs a switching setting on the switching unit 513 on the basis of the switch setting table 236. On the basis of the inter-port communication DB 235, when the bands of the transmission port 420 and the reception port 419 are different from each other, the band controller 205 reduces a band for a port having a larger band. When the inter-port communication between the nodes A to E within the ring network NW is performed without passing through the node X, the node setting unit 206 performs setting for transmitting/receiving Ethernet signals to/from the nodes A to E on the basis of the inter-port communication DB 235.

The failure detector 207 detects a failure within the ring network NW on the basis of an NR message or an SF message detected by the message detector 240. The route switching processor 208 controls the multiplexing processors 514 and the demultiplexing processors 512 on the basis of the slot information DB 232 such that a route of a frame signal is switched according to a state of the node X and a failure occurrence point.

For example, the route switching processor 208 switches a line of Ethernet signals separated by the demultiplexing processor 512, from the clockwise lines #1 to # k indicated by a clockwise line ID to the counterclockwise lines #1 to # k indicated by a counterclockwise line ID. The route switching processor 208 switches a line of Ethernet signals multiplexed by the multiplexing processor 514, from the clockwise lines #1 to # k indicated by a clockwise line ID to the counterclockwise lines #1 to # k indicated by a counterclockwise line ID.

According to the line switching, the route switching processor 208 changes a clockwise reception slot ID and a counterclockwise reception slot ID in the multiplex setting table 233 or a clockwise transmission slot ID and a counterclockwise transmission slot ID in the demultiplex setting table 234.

Hereinafter, descriptions will be made on a processing performed by the transmission device 2.

Figure 21:
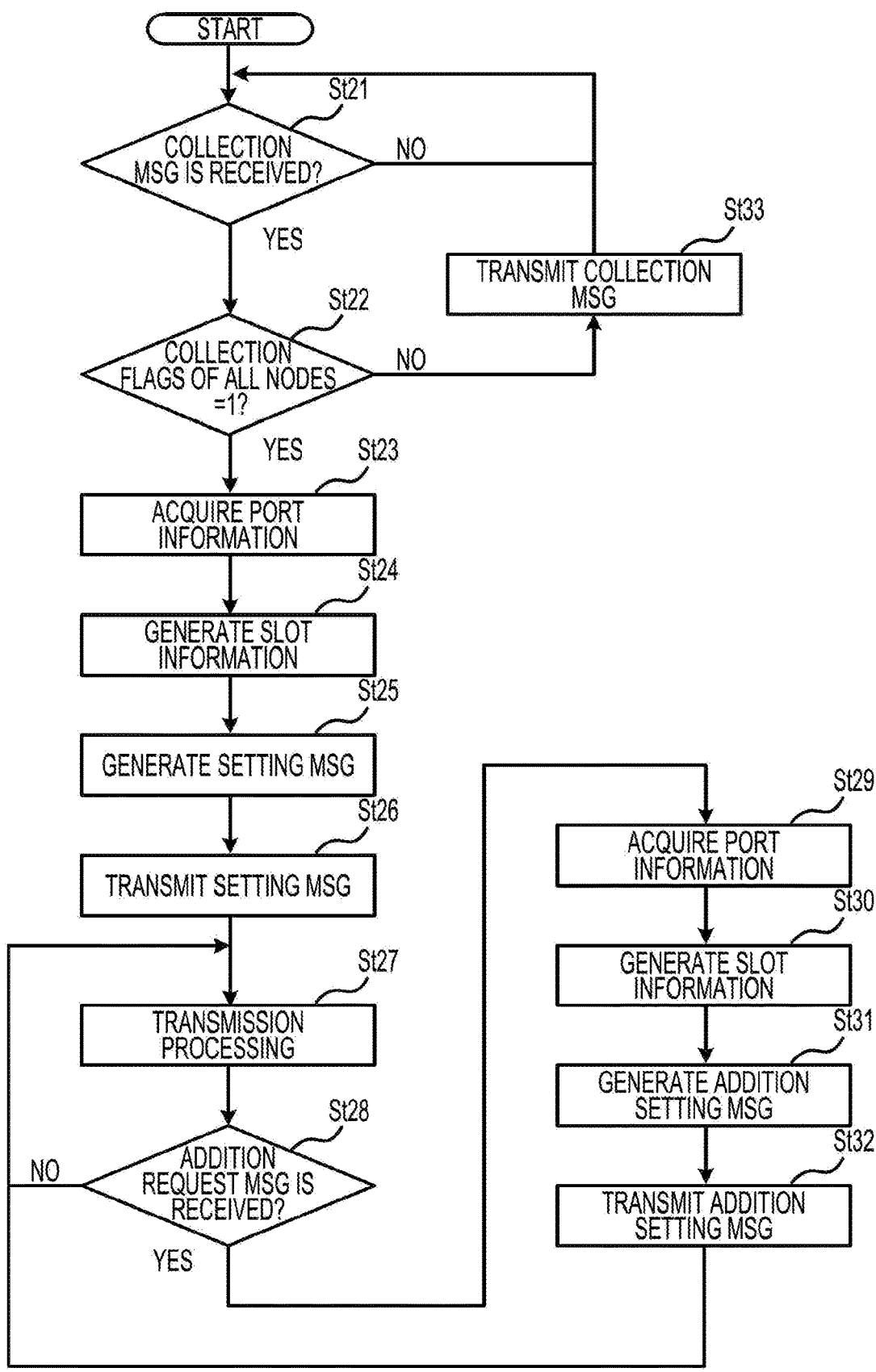
FIG. 21 is a flowchart illustrating an example of a distribution processing of transmission side slot information and reception side slot information.

FIG. 21 is a flowchart illustrating an example of a distribution processing of transmission side slot information and reception side slot information. The collection processor 201 determines whether a collection message has been received from the adjacent node A or E (step St21). When it is determined that the collection message has not been received (No in step St21), the processing in step St21 is performed again.

When it is determined that the collection message has been received ("Yes" in step St21), the collection processor 201 determines whether collection flags of all the nodes A to E in the collection message are "1" (step St22). When it is determined that at least one collection flag is "0" ("No" in step St22), the collection processor 201 transmits the collection message from the message generator 241 to the adjacent node E or the adjacent node A (step St33). Then, the processing in step St21 is performed again.

When it is determined that the collection flags of all the nodes A to E are "1" ("Yes" in step St22), the collection processor 201 acquires port information from the collection message (step St23). Then, the slot allocating unit 202 generates transmission side slot information and reception side slot information on the basis of the port information (step St24). Then, the message generator 241 generates a setting message (step St25), and transmits the setting message from one of the transmitters 516 (step St26).

Next, the data transmission controller 203 performs a frame signal transmission processing by controlling a multiplexing timing and a separation timing of Ethernet signals in the multiplexing processor 514, the demultiplexing processor 512, the data multiplexer 501, and the data demultiplexer 504 (step St27). Then, the collection processor 201 determines whether an addition request message has been received (step St28). When it is determined that the addition request message has not been received ("No" in step St28), the processing in step St27 is performed again.

When it is determined that the addition request message has been received ("Yes" in step St28), the collection processor 201 acquires port information from the addition request message (step St29). Then, the slot allocating unit 202 generates transmission side slot information and reception side slot information on the basis of the port information (step St30). Each slot information piece is registered in the slot information DB 232.

The message generator 241 generates a setting message (step St31), and transmits the setting message to the adjacent node A or the adjacent node E (step St32). Then, each of processings subsequently to step St27 is executed. In this manner, the slot information distribution processing is performed.

Hereinafter, descriptions will be made on a configuration in which Ethernet signals "a" to "e" to be transmitted to the node Y are made redundant among the nodes A to E within the ring network NW.

Figure 22:
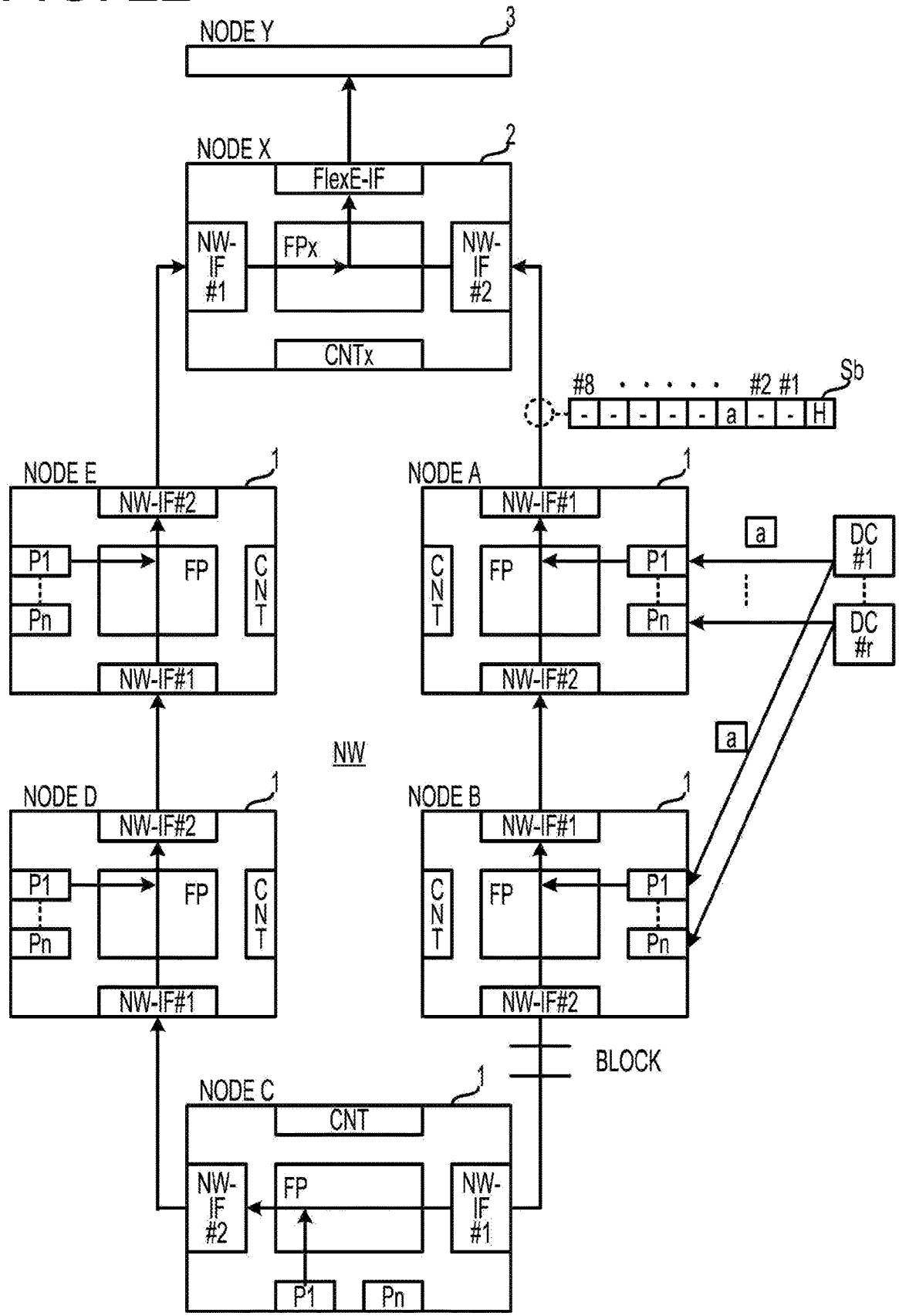
FIG. 22 is a view illustrating an example in which an Ethernet signal is made redundant between nodes.

FIG. 22 is a view illustrating an example in which the Ethernet signal "a" is made redundant between the nodes A and B. In FIG. 22, the same components as those in FIG. 3 will be denoted by the same reference numerals as used in FIG. 3, and descriptions thereof will be omitted. In this example, it is assumed that the ports P1 to Pn in the nodes A and B are the reception ports 419.

Data centers DC #1 to # r (r: a positive integer) are connected to the ports P1 to Pn, respectively, in each of the nodes A and B. The data centers DC #1 to # r transmit the same Ethernet signals "a" to the ports P1 to Pn, in the nodes A and B, respectively. In the nodes A and B, switches are provided such that only one of the nodes A and B accommodates the Ethernet signal "a" in a frame signal Sb.

Figure 23:
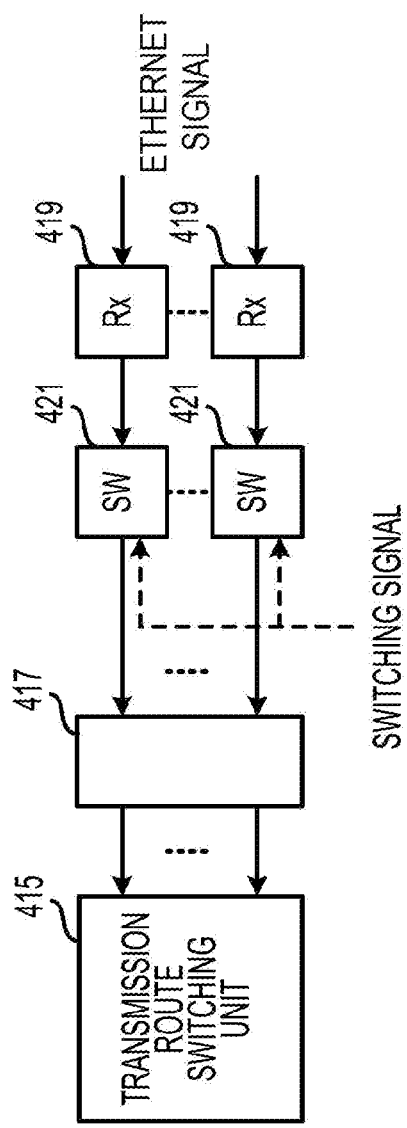
FIG. 23 is a configuration diagram illustrating another example of the transmission device.

FIG. 23 is a configuration diagram illustrating another example of the transmission device 1. In FIG. 23, the same components as those in FIG. 13 will be denoted by the same reference numerals as used in FIG. 13, and descriptions thereof will be omitted. FIG. 23 illustrates only a functional configuration related to redundancy of a frame signal Sb to be transmitted to the node Y.

A switch 421 is connected between each reception port 419 and the information extractor 417. The switch 421 switches whether to output an Ethernet signal received by the reception port 419 to the transmission route switching unit 415 according to a switching signal. The switching signal is output from the CPU 10 on the basis of a control of, for example, the network management device (not illustrated). According to this configuration, an Ethernet signal "a" received by the reception port 419 in only one of the nodes A and B is multiplexed into the frame signal Sb.

The redundant Ethernet signals "a" are accommodated in the same slot of the frame signal Sb. For this reason, at the time of redundancy, one node A notifies the other node B of transmission side slot information of the Ethernet signal "a."

Figure 24:
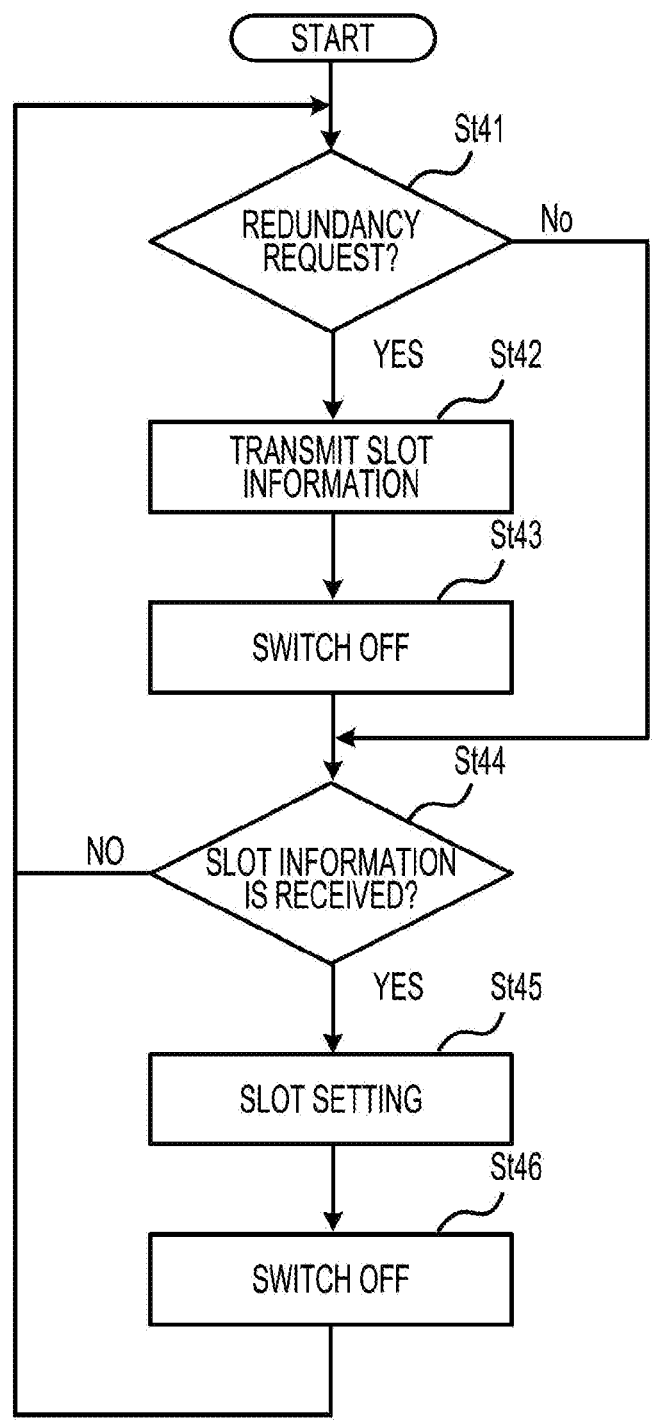
FIG. 24 is a flowchart illustrating an example of a notification processing of transmission side slot information between nodes.

FIG. 24 is a flowchart illustrating an example of a notification processing of transmission side slot information between the nodes A and B. Steps St41 to St43 indicate a processing in the node A in the example of FIG. 22, and steps St44 to St46 indicate a processing in the node B in the example of FIG. 22.

The state management unit 100 determines a presence or absence of a request for redundancy from, for example, the network management device (step St41). When it is determined that there is no request ("No" in step St41), the processings subsequent to step St44 are performed as below.

When it is determined that there is a request ("Yes" in step St41), the state management unit 100 transmits transmission side slot information of an Ethernet signal "a" to be redundant from, for example, the OH insertion unit 413 to the node E (step St42). Here, the slot information is given to, for example, an overhead H of a frame signal Sb.

Next, the state management unit 100 outputs a switching signal so as to turn OFF the switch 421 (step St43).

Accordingly, in the node A, the Ethernet signal "a" is not input to the transmission route switching unit 415.

The state management unit 100 determines whether the transmission side slot information for the redundancy of the Ethernet signal "a" has been received (step St44). When it is determined that the transmission side slot information has not been received ("No" in step St44), each processing subsequent to step St41 is performed again.

When it is determined that the slot information has been received ("Yes" in step St44), the signal setting processor 103 performs a slot setting on the basis of the transmission side slot information (step St45). Then, the state management unit 100 outputs a switching signal so as to turn ON the switch 421 (step St46). Accordingly, in the node B, the Ethernet signal "a" is input to the transmission route switching unit 415. Then, each processing subsequent to step St41 is executed. In this manner, the notification processing of the slot information is performed between the nodes A and E.

In this manner, in the node A, the state management unit 100 notifies the node B of the transmission side slot information such that a slot allocated to the Ethernet signal "a" is shared with the Ethernet signal "a" received by the node B. For this reason, the Ethernet signal "a" may be made redundant between the different nodes A and B. The state management unit 100 is an example of a notification unit.

In this example, the transmission devices 1 and 2 transmit a plurality of frame signals via individual lines, but the present disclosure is not limited thereto.

Figure 25:
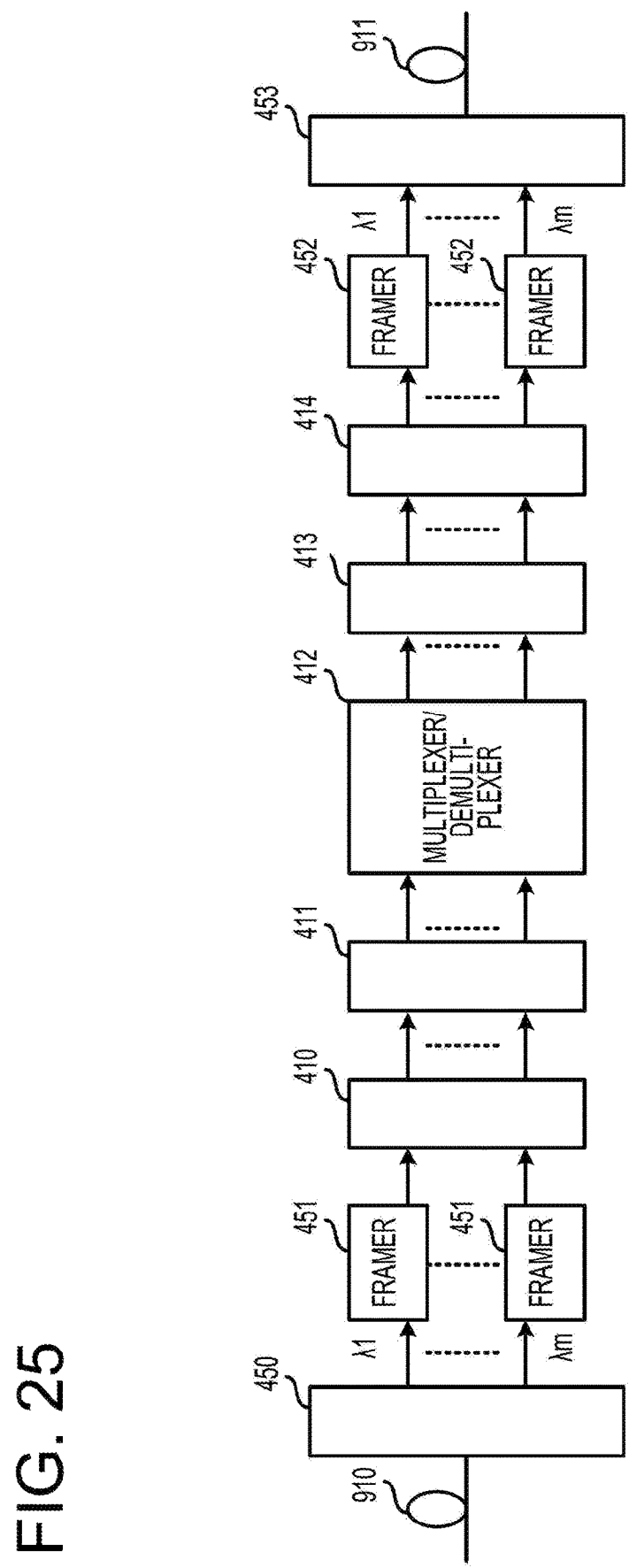
FIG. 25 is a configuration diagram illustrating another example of the transmission device.

FIG. 25 is a configuration diagram illustrating another example of the transmission device 1. In FIG. 25, the same components as those in FIG. 13 will be denoted by the same reference numerals as used in FIG. 13, and descriptions thereof will be omitted. FIG. 25 illustrates only a functional configuration related to a frame signal processing on the clockwise lines #1 to # k, but a functional configuration related to a frame signal processing on the counterclockwise lines #1 to # k is the same as that on the clockwise lines #1 to # k.

In the transmission device 1, a demapping unit 450, a mapping unit 453, and framers 451 and 452 are added. The demapping unit 450, the mapping unit 453, and the framers 451 and 452 are constituted by for example, circuits such as FPGAs, LDs, various optical devices, etc.

The transmission device 1 in this example multiplexes frame signals for a plurality of lines into one OTN frame by using an optical transport network (OTN) technology defined in ITU-T recommendation G.709, and transmits the OTN frame. The framers 452 convert frame signals transmitted from the transmitter 414 into ODU (Optical channel Data Unit) 4 or ODUflex signals, and outputs the converted signals as individual wavelength lights $\lambda i$ (i=1 to m) to the mapping unit 453. The mapping unit 453 multiplexes the wavelength lights $\lambda 1$ to $\lambda m$, generates an OTN frame, and transmits the OTN frame to the transmission path 911.

An OTN frame is input from the transmission path 910 to the demapping unit 450. The demapping unit 450 separates wavelength lights $\lambda 1$ to $\lambda m$ from the OTN frame, and outputs the wavelength lights $\lambda 1$ to $\lambda m$ to the framers 451, respectively. The framers 451 reproduce frame signals from ODU4 or ODUflex signals, and outputs the frame signals to the receiver 410.

In this manner, the number of transmission paths 910 and 911 may be reduced by accommodating respective frame signals for lines, in one OTN frame. When ODUflex is used, as defined in "FlexE aware mapping" of a "Flex Ethernet" technology, it is possible to reduce a transmission band by deleting an "unavailable slot."

Next, descriptions will be made on a ring network NW in which the transmission device 2 of the node X is made redundant.

Figure 26:
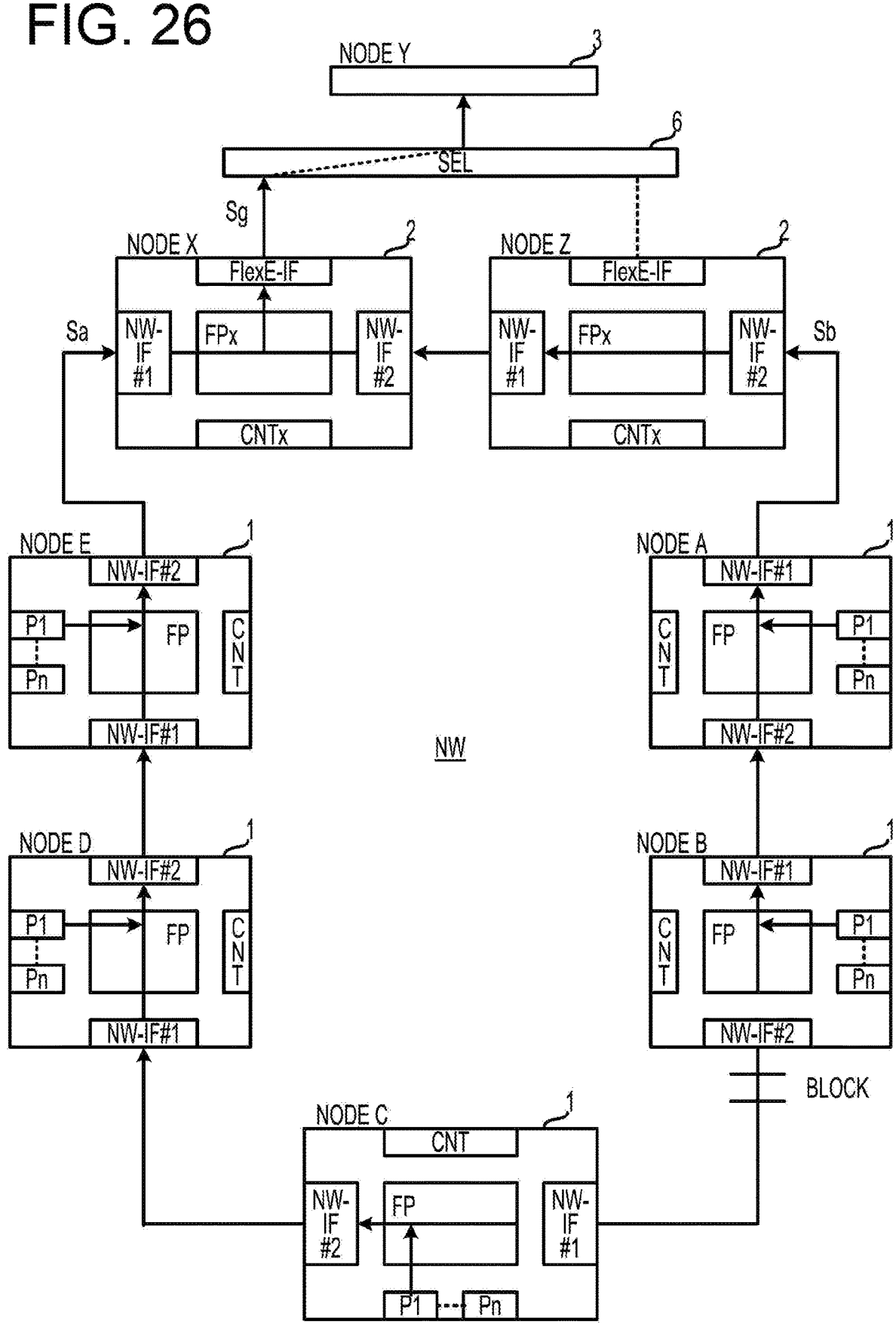
FIG. 26 is a configuration diagram illustrating an example of a ring network in which the transmission device is made redundant.

FIG. 26 is a configuration diagram illustrating an example of a ring network NW in which the transmission device 2 is made redundant. In FIG. 26, the same components as those in FIG. 3 will be denoted by the same reference numerals as used in FIG. 3, and descriptions thereof will be omitted.

A node Z is added between the node X and the node A, and in the node Z, the same transmission device 2 as that in the node X is provided. One of the respective transmission controllers CNTx of the nodes X and Z, which is a control node, controls the above-described frame signal transmission processing, whereas the other, which is a through node, transmits a frame signal from one of the network interfaces NW-IF #1 and #2 to the other.

When a failure occurs, the control node and the through node are determined by, for example, a negotiation processing between the route switching processors 208 via a control channel. When a failure does not occur, as an example, the node X functions as the control node, and the node Z functions as the through node.

The frame processors FP of the nodes C to E accommodate Ethernet signals in a frame signal Sa on the clockwise line #1 to # k. The frame processors FP of the nodes A and B accommodate Ethernet signals in a frame signal Sb on the counterclockwise line #1 to # k.

The frame processor FP of the node Z transmits the frame signal Sb from the network interface NW-IF #2 to the network interface NW-IF #1. For this reason, the frame signal Sb is received by the node X through the node Z. Here, the switching unit 513 of the node Z outputs Ethernet signals from the demultiplexing processor 512 to the multiplexing processor 514 such that the counterclockwise line #1 to # k through which the frame signal Sb is transmitted is not changed.

A selector device SEL 6 is added between the Flex Ethernet interfaces FlexE-IF of the nodes X and Z and the node Y. The selector device 6 outputs a frame signal Sg from the control node to the node Y, according to a control from the control node. When a failure has not occurred, the selector device 6 selects the frame signal Sg from the node X between the nodes X and Z, and outputs the frame signal Sg to the node Y.

Figure 27:
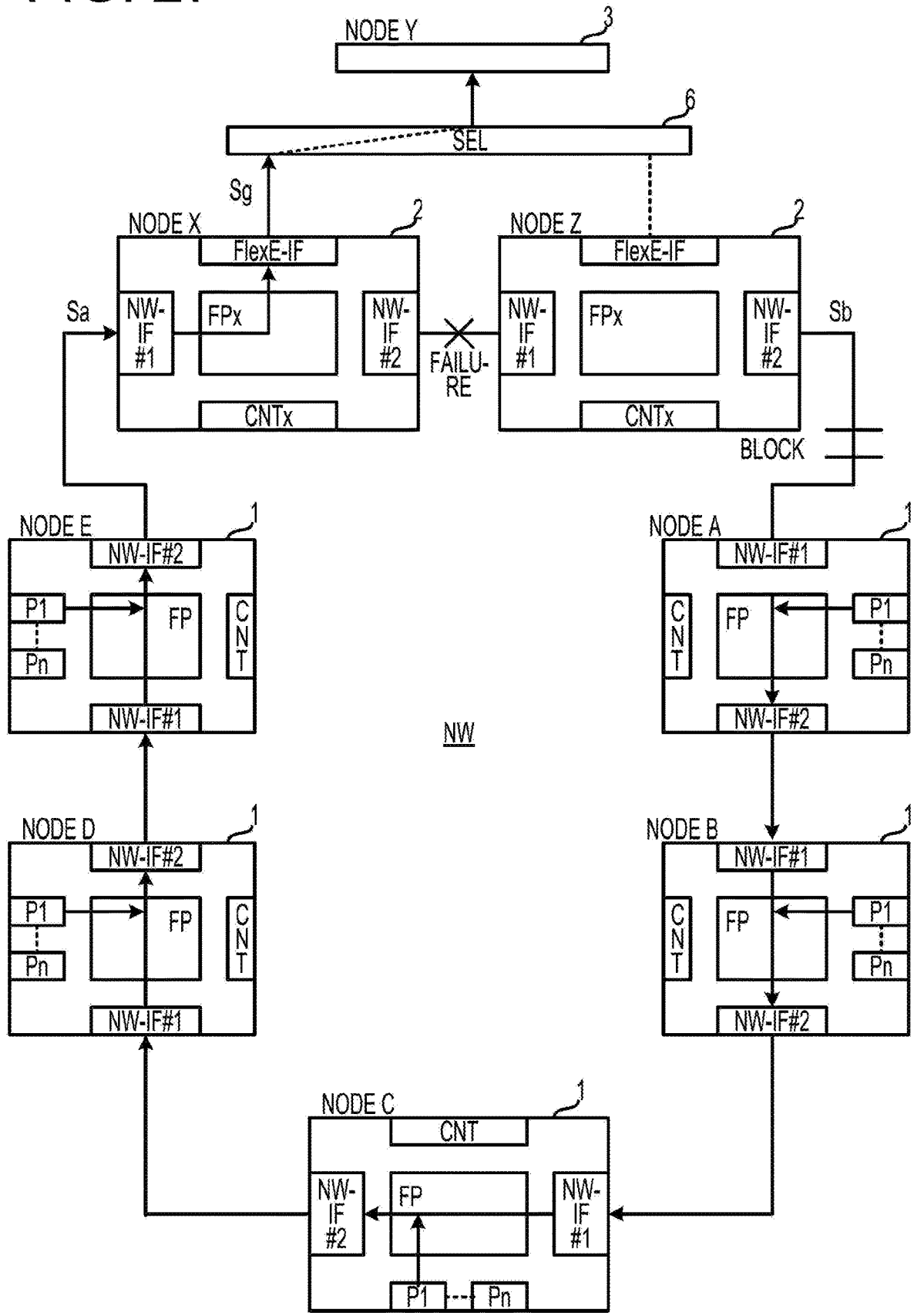
FIG. 27 is a view illustrating an example of a frame signal transmission processing in a case where a failure has occurred on a transmission path between a control node and a through node.

FIG. 27 is a view illustrating an example of a frame signal transmission processing in a case where a failure has occurred on a transmission path between a control node and a through node. In FIG. 27, the same components as those in FIG. 26 will be denoted by the same reference numerals as used in FIG. 26, and descriptions thereof will be omitted.

When a failure has occurred on a transmission path between the node X and the node Z, the transmission controllers CNTx of the nodes X and Z detect the failure on the basis of an NR message, and transmit an SF message to other nodes A to E. The transmission controller CNT of each of the nodes A to E detects a failure point from the SF message, and the route switching processor 208 of each of the nodes A and B switches a transmission route to the opposite route.

Accordingly, the frame processor FP of each of the nodes A and B accommodates Ethernet signals in a frame signal on the clockwise line #1 to # k to be transmitted from the network interface NW-IF #2. For this reason, respective Ethernet signals of the nodes A to E are accommodated in a common frame signal, and transmitted to the node X.

Figure 28:
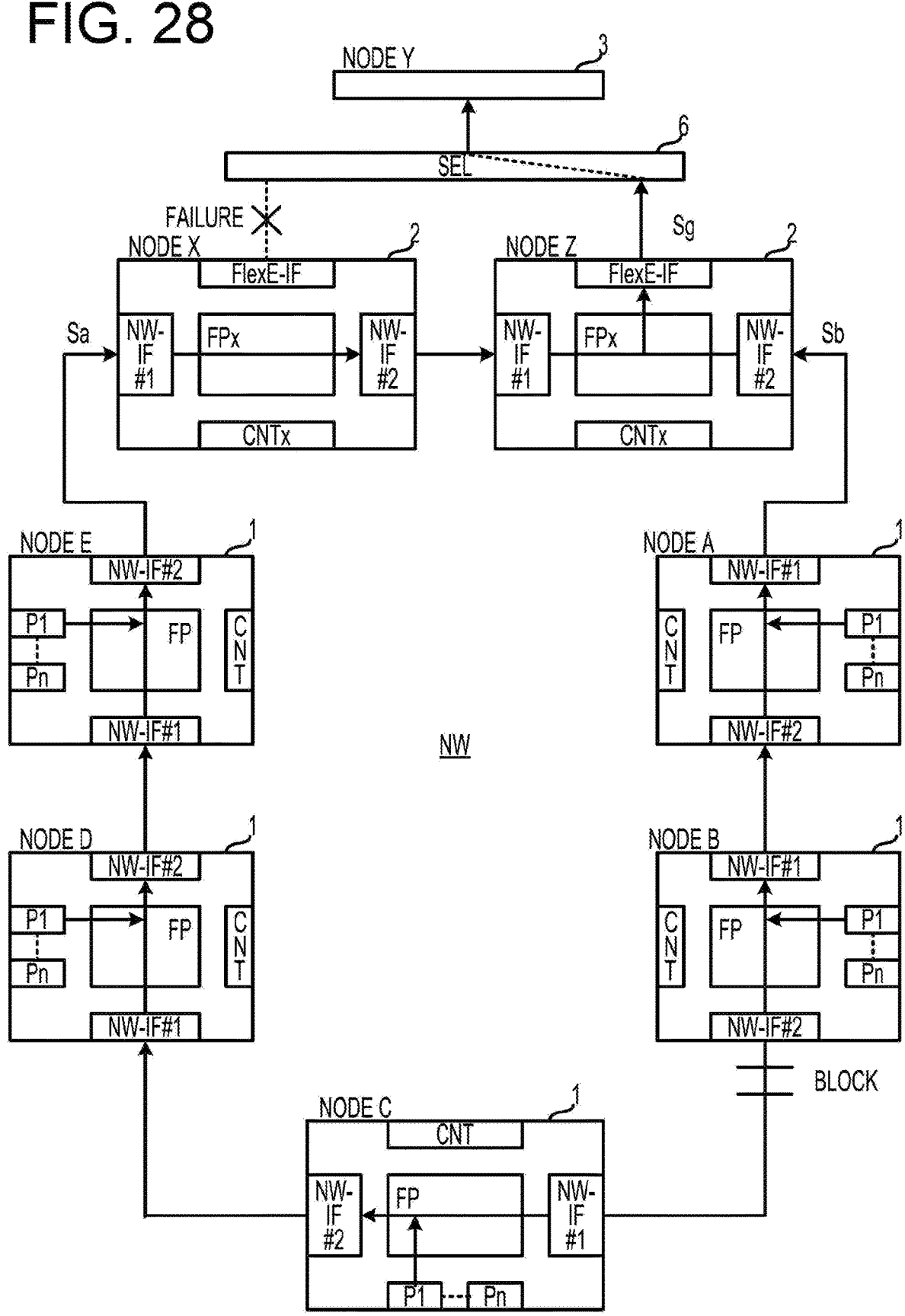
FIG. 28 is a view illustrating an example of a frame signal transmission processing in a case where a failure has occurred on a transmission path between a control node and a selector device.

FIG. 28 is a view illustrating an example of a frame signal transmission processing in a case where a failure has occurred on a transmission path between a control node and the selector device 6. In FIG. 28, the same components as those in FIG. 26 will be denoted by the same reference numerals as used in FIG. 26, and descriptions thereof will be omitted.

When a failure has occurred on a transmission path between the node X and the selector device 6, the transmission controllers CNTx of the nodes X and Z detect the failure on the basis of an NR message, and transmit an SF message to other nodes A to E. After the failure is detected, the node Z becomes a new control node, and the node X becomes a new through node.

For this reason, the frame processor FPx of the node X stops combining of frame signals Sa and Sb, and transmits the frame signal Sa received by the network interface NW-IF #1 to the network interface NW-IF #2. Accordingly, since the frame signal Sa is transmitted to the node Z, the frame signals Sa and Sb are input to the node Z.

The frame processor FPx of the node Z combines the frame signals Sa and Sb into a frame signal Sg. The Flex Ethernet interface FlexE-IF transmits the frame signal Sg to the selector device 6 via the transmission line #1 to # m. The selector device 6 outputs the frame signal Sg from the node Z, as the control node, to the node Y.

Figure 29:
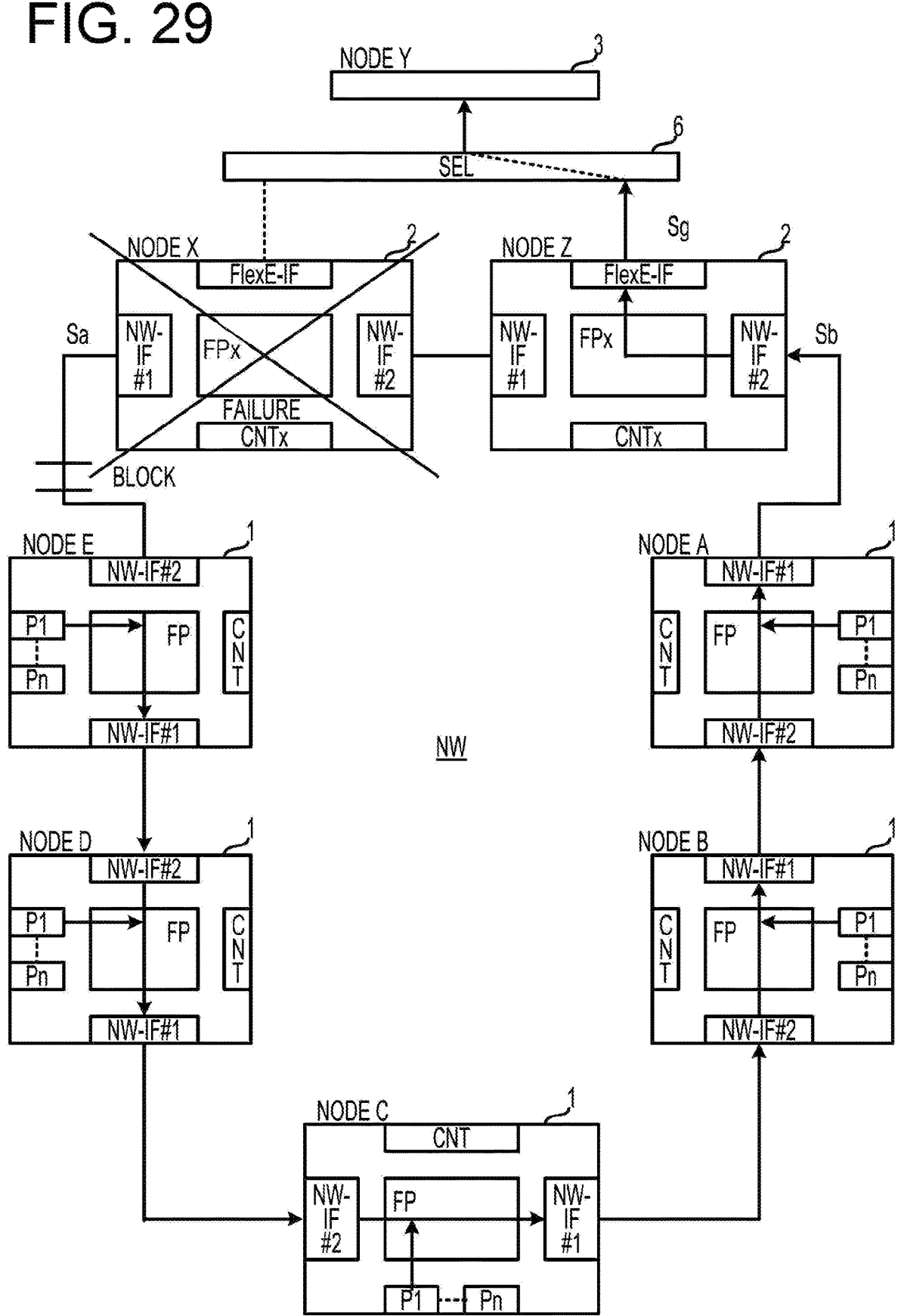
FIG. 29 is a view illustrating an example of a frame signal transmission processing in a case where a failure has occurred in a control node.

FIG. 29 is a view illustrating an example of a frame signal transmission processing in a case where a failure has occurred in a control node. In FIG. 29, the same components as those in FIG. 26 will be denoted by the same reference numerals as used in FIG. 26, and descriptions thereof will be omitted.

When a failure has occurred in the transmission device 2 of the node X, the transmission controllers CNT and CNTx of the adjacent nodes E and Z detect the failure on the basis of an NR message, and transmit an SF message to other nodes A to D. After the failure is detected, the node Z becomes a new control node. The transmission controller CNT of each of the nodes A to E detects a failure point from the SF message, and the route switching processor 208 of each of the nodes C to E switches a transmission route to the opposite route.

Accordingly, the frame processor FP of each of the nodes C to E accommodates Ethernet signals in a frame signal on the counterclockwise line #1 to # k to be transmitted from the network interface NW-IF #1. For this reason, respective Ethernet signals of the nodes A to E are accommodated in a common frame signal, and transmitted to the node Z.

The frame processor FPx of the node Z accommodates Ethernet signals accommodated in a frame signal Sb received by the network interface NW-IF #2, in a frame signal Sg to be transmitted from the Flex Ethernet interface FlexE-IF. The Flex Ethernet interface FlexE-IF transmits the frame signal Sg to the selector device 1 via the transmission line #1 to # m. The selector device 6 outputs the frame signal Sg from the node Z, as the control node, to the node Y.

Figure 30:
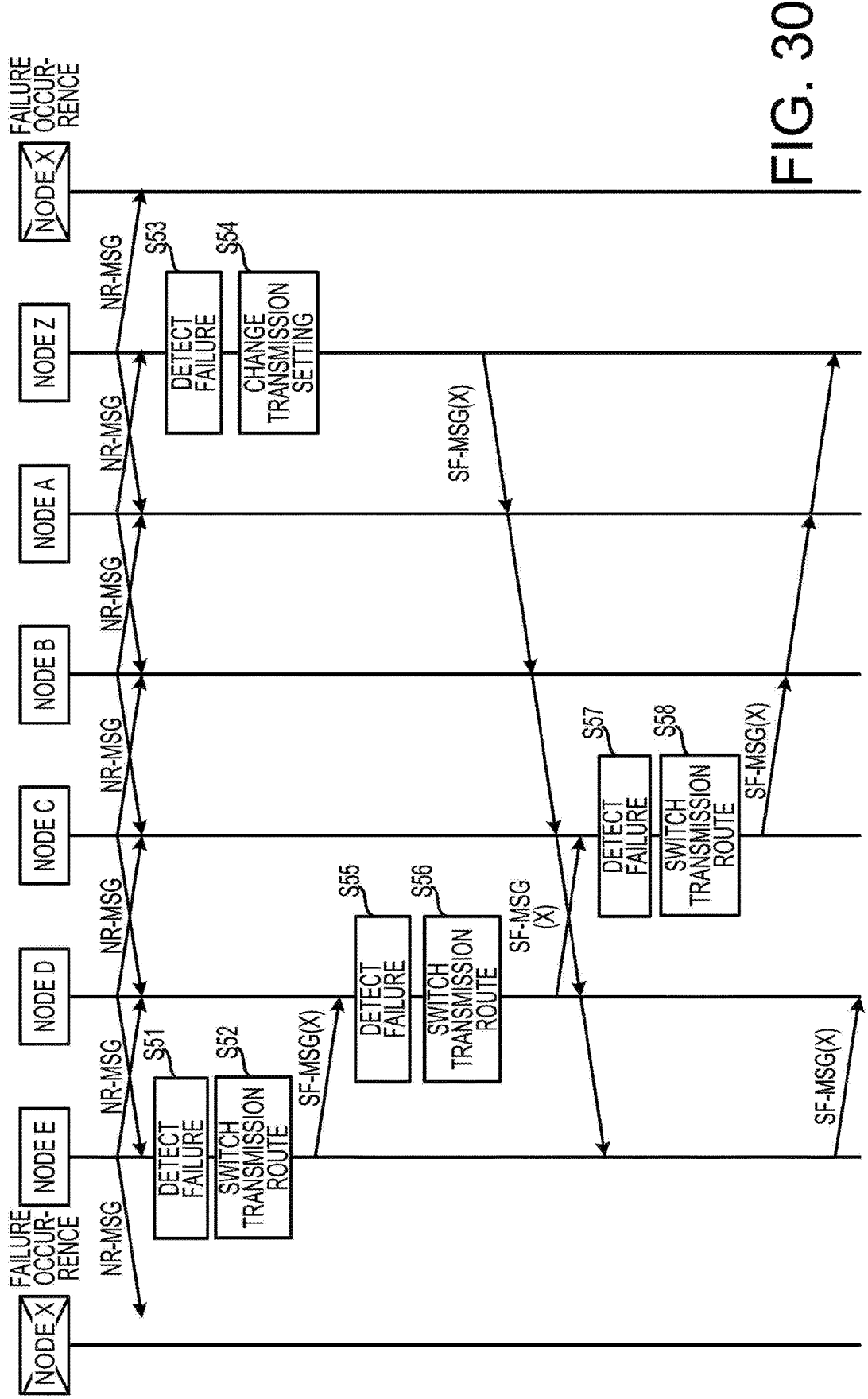
FIG. 30 is a sequence diagram illustrating a transmission route switching processing in a case where a failure has occurred in a control node.

FIG. 30 is a sequence diagram illustrating a transmission route switching processing in a case where a failure has occurred in a control node. The transmission devices 1 and 2 of the nodes A to E, and X monitor an occurrence of a failure by transmitting/receiving NR messages to/from the adjacent nodes A to E, X, and Z.

When a failure has occurred in the transmission device 2 of the node X as a control node, each of the transmission controllers CNT and CNTx of the adjacent nodes E and Z detects the failure in the node X with a non-reception of an NR message (S51). The transmission controller CNT of the node E switches a transmission route to the opposite route according to the detection of the failure (S52). Here, the route switching processor 106 controls the transmission route switching unit 415.

According to the detection of the failure (S53), the transmission controller CNTx of the node Z changes a transmission setting such that Ethernet signals separated from a frame signal received by the network interface NW-IF #2 are accommodated in a frame signal Sg to be transmitted from the Flex Ethernet interface FlexE-IF (S54). Here, the route switching processor 208 controls the data demultiplexer 504, the multiplexing processor 514, and the switching unit 513. The transmission controller CNTx of the node Z functions as a new control node according to the detection of the failure.

The transmission controller CNT of the node E generates an SF message that is given a detection flag of the node E, and notifies the failure of the node X. The SF message is given to an overhead H, and is transmitted from the node E to the node Z via the counterclockwise line #1 to # k.

The transmission controller CNT of the node D detects the failure of the node X according to the reception of the SF message (S55). The transmission controller CNT of the node D switches a transmission route such that Ethernet signals are accommodated in a frame signal to be transmitted from the network interface NW-IF #2 (S56). Here, the route switching processor 106 controls the transmission route switching unit 415.

The transmission controller CNT of the node C detects the failure of the node X according to the reception of the SF message (S57). The transmission controller CNT of the node C switches a transmission route such that Ethernet signals are accommodated in the frame signal to be transmitted from the network interface NW-IF #2 (S58). Here, the route switching processor 106 controls the transmission route switching unit 415.

The transmission controller CNTx of the node Z also generates and transmits an SF message in the same manner as in the node E. The SF message is transmitted from the node Z to the node E via the counterclockwise line #1 to # k. The SF message transmitted from the node E is given a flag in each of the nodes A to E that have received the SF message whereas after the SF message goes around each of the nodes A to E, the SF message transmitted from the node E is not given a flag.

Next, descriptions will be made on an example of an inter-port communication between the nodes A to E within the ring network NW.

Figure 31:
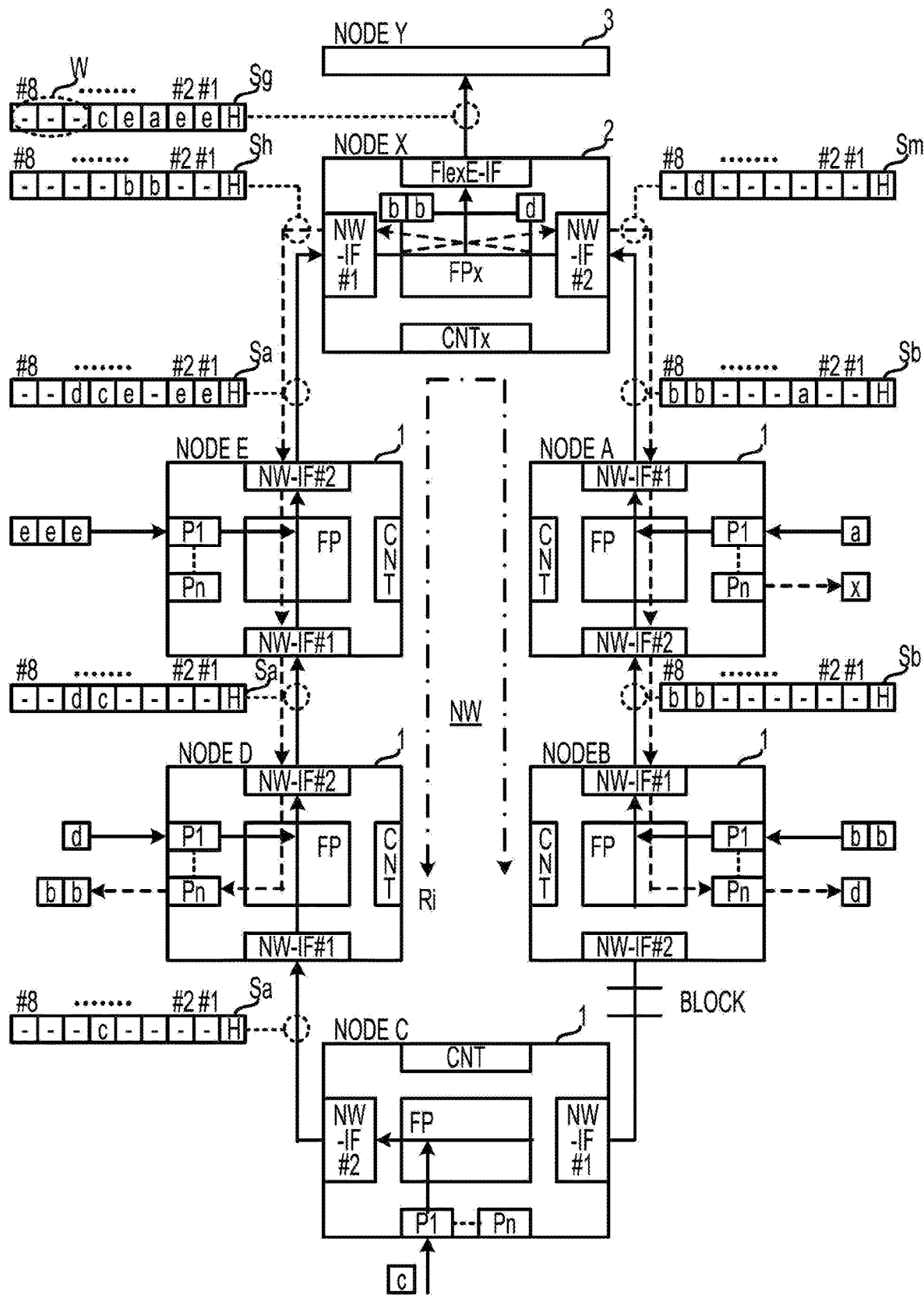
FIG. 31 is a view illustrating an example of an inter-port communication between nodes within a ring network.

FIG. 31 is a view illustrating an example of an inter-port communication between the nodes A to E within the ring network NW. In FIG. 31, the same components as those in FIG. 3 will be denoted by the same reference numerals as used in FIG. 3, and descriptions thereof will be omitted. As an example, the node D and the node B communicate along a route Ri passing through the nodes A, B, D, E, and X. In each of the nodes D and B, the port Pn is the transmission port 420, and the port P1 is the reception port 419. The ports P1 and Pn in the nodes D and B correspond to an example of a pair of ports transmitting and receiving Ethernet signals "d" and "b" to/from each other.

The Ethernet signal "d" received by the port P1 of the node D is accommodated in a frame signal Sa on the clockwise line #1 to # k and is transmitted to the node X. The Ethernet signal "b" received by the port P1 of the node B is accommodated in a frame signal Sb on the counterclockwise line #1 to # k and is transmitted to the node X.

The frame processor FPx of the node X separates the Ethernet signal "d" from the frame signal Sa, and accommodates the Ethernet signal "d" in a frame signal Sm to be transmitted from the network interface NW-IF #2. As indicated by dotted-line arrows, the frame signal Sm is transmitted to the node B through the clockwise line #1 to # k. The frame processor FP of the node B separates the Ethernet signal "d" from the frame signal Sm and outputs the Ethernet signal "d" to the port Pn. The port Pn transmits the Ethernet signal "d" to a data center DC.

The frame processor FPx of the node X separates the Ethernet signal "b" from the frame signal Sb, and accommodates the Ethernet signal "b" in a frame signal Sh to be transmitted from the network interface NW-IF #1. As indicated by dotted-line arrows, the frame signal Sh is transmitted to the node D through the counterclockwise line #1 to # k. The frame processor FP of the node D separates the Ethernet signal "b" from the frame signal Sh, and outputs the Ethernet signal "b" to the port Pn. The port Pn transmits the Ethernet signal "b" to a data center DC.

The frame processor FPx of the node X empties slots in which the Ethernet signals "d" and "b" are accommodated on the basis of transmission side slot information, among slots of a frame signal Sg to be transmitted to the node Y, as "unavailable" slots as indicated by a symbol W. For this reason, the Ethernet signals "d" and "b" are not transmitted to the node Y.

The frame processor FPx of the node X accommodates Ethernet signals separated from a frame signal received through the reception line #1 to # m from the node Y, in the frame signals Sm and Sh. The transmission controller CNTx of the node X accommodates the Ethernet signal "d" in a slot #7 based on reception side slot information among slots of the frame signal Sm, and accommodates the Ethernet signal "b" in slots #3 and #4 based on reception side slot information among slots of the frame signal Sh. In FIG. 31, for the sake of convenience, "-" is marked in the other slots of the frame signals Sm and Sh.

In this manner, the frame processor FPx of the node X changes frame signals as accommodating destinations of the Ethernet signals "d" and "b," into the frame signals Sm and Sh to be transmitted to the adjacent nodes A and E, instead of the frame signal Sg to be transmitted to the node Y. The change of frame signals as accommodating destinations of the Ethernet signals "d" and "b" is performed by the switching unit 513.

Figure 32:
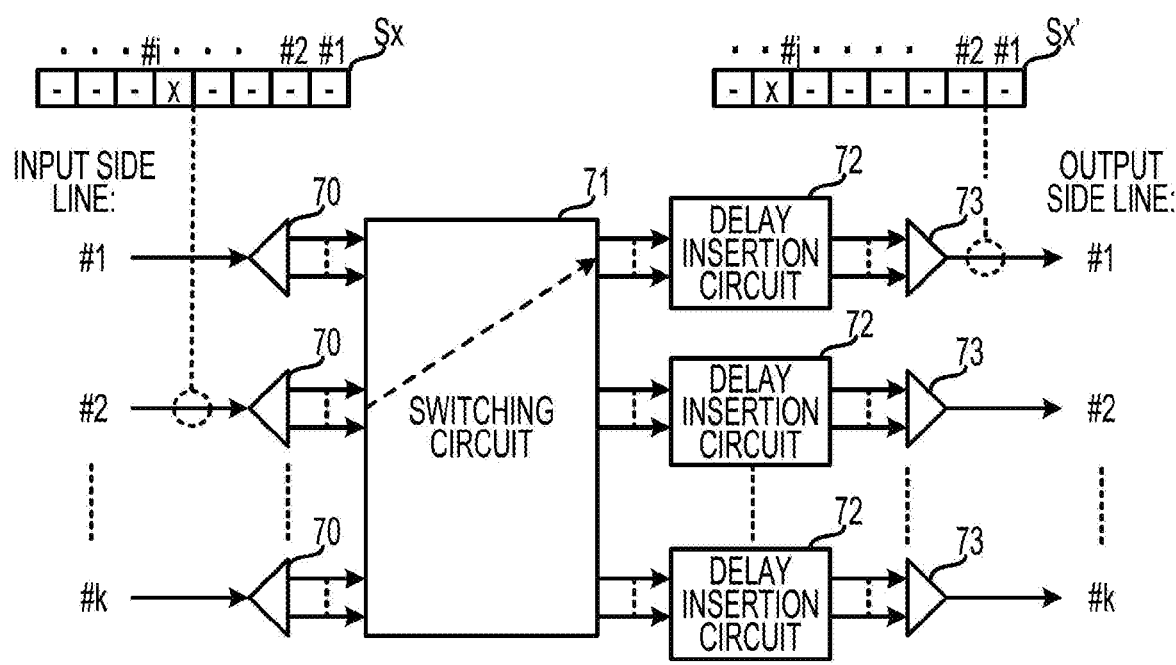
FIG. 32 is a configuration diagram illustrating an example of a switching unit.

FIG. 32 is a configuration diagram illustrating an example of the switching unit 513. The switching unit 513 includes a plurality of serial-parallel (S/P) conversion circuits 70, a switching circuit 71, a delay insertion circuit 72, and a plurality of parallel-serial (P/S) conversion circuits 73.

The S/P conversion circuits 70 and the P/S conversion circuits 73 are provided corresponding to the clockwise lines #1 to # k and the counterclockwise lines #1 to # k, respectively. To the S/P conversion circuits 70, Ethernet signals are input from the clockwise lines #1 to # k or the counterclockwise lines #1 to # k on the input side ("input side lines"). The P/S conversion circuits 73 output Ethernet signals to the clockwise lines #1 to # k or the counterclockwise lines #1 to # k on the output side ("output side lines").

The S/P conversion circuit 70 converts serial data of an Ethernet signal into parallel data, and performs a code conversion of 64B/66B. The S/P conversion circuit 70 outputs the parallel data to the switching circuit 71.

The switching circuit 71 switches the parallel data between the input side line and the output side line according to the switch setting table 236. The switching circuit 71 outputs the parallel data to the delay insertion circuit 72. The delay insertion circuit 72 delays the parallel data according to the switch setting table 236, and outputs the parallel data to the P/S conversion circuit 73.

As an example, when data Sx in a slot area of a frame signal is input from an input side line #2 to the switching circuit 71, the switching circuit 71 separates an Ethernet signal "x" from a slot # i (i=1 to 20) of the data Sx. Here, the slot # i is a slot in which an Ethernet signal received by the reception port 419 is accommodated, and is allocated to the Ethernet signal on the basis of transmission side slot information.

As indicated by dotted-line arrows, the switching circuit 71 switches the Ethernet signal "x" such that the Ethernet signal "x" is accommodated in data Sx' in a slot area of a frame signal to be output to an output side line #1. Accordingly, the Ethernet signal "x" is accommodated in a slot # j (j=1 to 20) of the data Sx'. Here, the slot # j is a slot in which an Ethernet signal output from the transmission port 420 is accommodated, and is allocated to the Ethernet signal on the basis of reception side slot information.

The slot #1 of the Ethernet signal "x" on the input side line #2 is set in the switch setting table 236 on the basis of the transmission side slot information. The slot # j of the Ethernet signal "x" on the output side line #1 is set in the switch setting table 236 on the basis of the reception side slot information. For this reason, the signaling processor 204 generates the switch setting table 236 from the slot information DB 232 and the inter-port communication DB 235.

FIG. 33 is a view illustrating an example of the inter-port communication DB 235 and the switch setting table 236. The inter-port communication DB 235 includes transmission port information related to the transmission port 420 and reception port information related to the reception port 419. The transmission port information and the reception port information include node IDs, port IDs, and bands.

The switch setting table 236 includes a switch ID that identifies the switching unit 513, line IDs and slot IDs on the input side and the output side, and a delay time set in the delay insertion circuit 72. In the case of the above example, "#2" and "# i" are set in the line ID and the slot ID on the input side, respectively, and "#1" and "# j" are set in the line ID and the slot ID on the output side, respectively.

The signaling processor 104 generates the inter-port communication DB 235 and the switch setting table 236 from route information for each of the ports P1 to Pn, which is collected from each of the nodes A to E.

Figure 34:
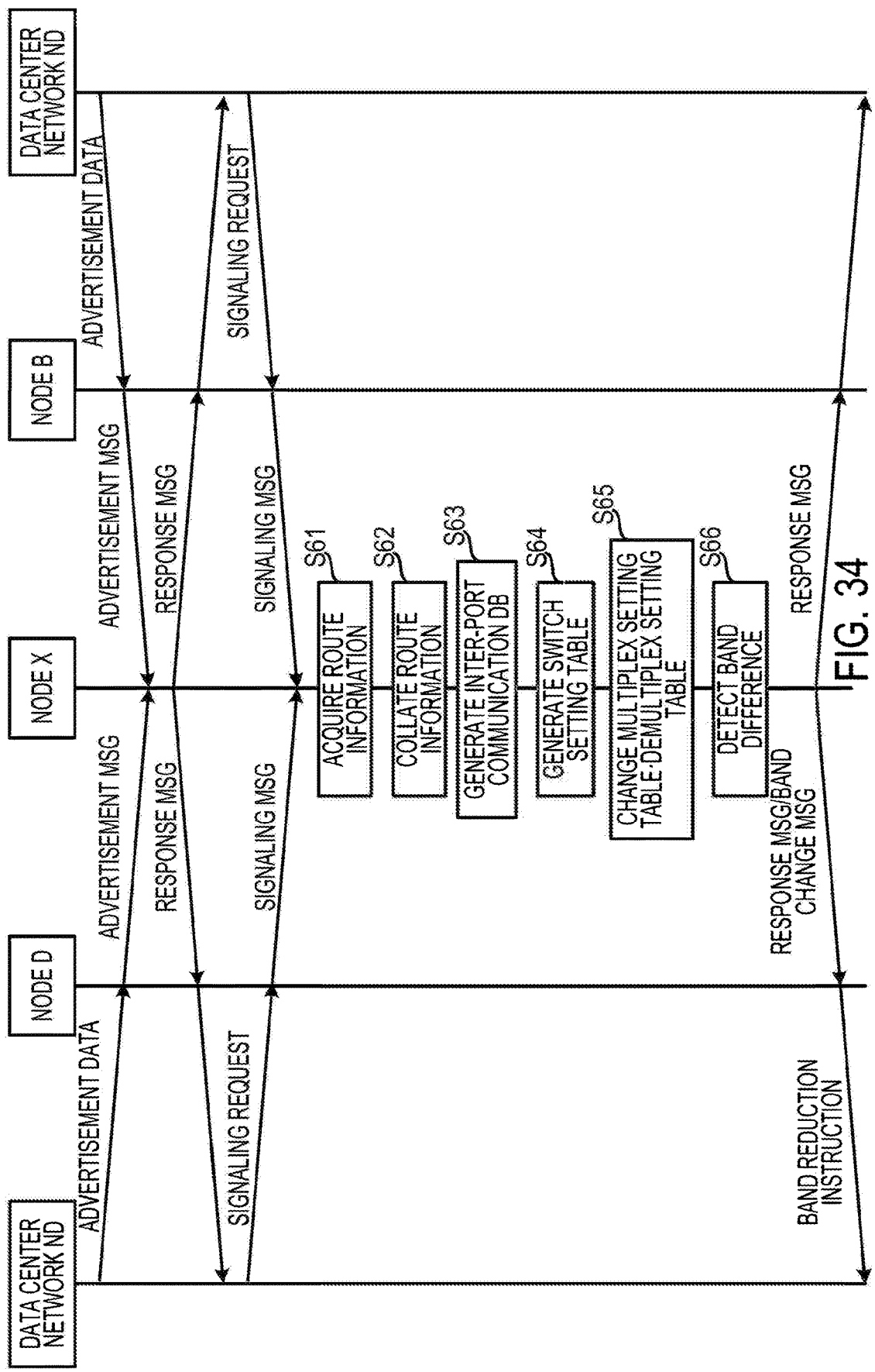
FIG. 34 is a sequence diagram illustrating an example of a setting processing of an inter-port communication.

FIG. 34 is a sequence diagram illustrating an example of a setting processing of an inter-port communication. Data center networks Nd and Nb are networks in which data centers DC are connected to each other, and are connected to the reception ports 419 of the transmission devices 1 of the nodes D and B, respectively. The illustration of the nodes A, C, and E is omitted.

The transmission devices 1 of the nodes D and B receive advertisement data from the data center networks Nd and Nb. The advertisement data is generated by, for example, a router in each of the data center networks Nd and Nb, and is given to an Ethernet signal to be transmitted to the reception port 419 from the router.

In each of the nodes D and B, the information extractor 417 extracts the advertisement data from the Ethernet signal, and the message generator 241 generates an advertisement message from the advertisement data. The advertisement message is given to an overhead of a frame signal to be transmitted to the node X. In the node X, the message detector 240 detects the advertisement message from the overhead, and outputs the advertisement message to the collection processor 201.

The transmission device 2 of the node X transmits a response message to the advertisement message, to each of the nodes D and B. The response message is given to an overhead of a frame signal. The transmission devices 1 of the nodes D and B return responses to the data center networks Nd and Nb according to the response messages.

The data center networks Nd and Nb transmit signaling requests to the nodes D and B, respectively, in response to the responses. The advertisement data is generated by, for example, a router in each of the data center networks Nd and Nb, and is given to an Ethernet signal to be transmitted to the reception port 419 from the router.

In each of the nodes D and B, the information extractor 417 extracts the signaling request from each of the Ethernet signals "d" and "b," and the message generator 241 generates a signaling message from the signaling request. The signaling message is given to an overhead of a frame signal to be transmitted to the node X. In the node X, the message detector 240 detects the signaling message from the overhead, and outputs the signaling message to the collection processor 201.

In the node X, the collection processor 201 acquires route information related to a route of Ethernet signals to be transmitted/received between the ports P1 and Pn of the nodes D and B (S61). The route information includes advertisement data and a signaling request. The route information is output to the signaling processor 204 by the state management unit 200.

The signaling processor 204 collates pieces of route information of the ports P1 and Pn of the nodes D and B with each other (S62). Accordingly, the signaling processor 204 detects a pair of ports P1 and Pn transmitting/receiving the Ethernet signals "b" and "d" to/from each other, and generates the inter-port communication DB 235 on the basis of the detection result and the port information DB 231 (S63). The signaling processor 204 detects a pair of ports P1 and Pn in which, for example, AS information pieces or VRF information pieces of signaling requests match each other. The signaling processor 204 is an example of a port detector.

Next, the signaling processor 204 generates the switch setting table 236 according to the inter-port communication DB 235, transmission side slot information, and reception side slot information (S64). Then, the signaling processor 204 changes the multiplex setting table 233 such that the Ethernet signals "b" and "d" are not transmitted to the node Y, and changes the demultiplex setting table 234 such that other Ethernet signals from the node Y are not accommodated in slots of the Ethernet signals "b" and "d" (S65).

Next, the band controller 205 detects a difference between bands of the Ethernet signals "d" and "b" of the port P1 on the transmission side and the port Pn on the reception side on the basis of the inter-port communication DB 235 (S66). That is, the band controller 205 determines whether there is a difference between the band of the transmission port 420 and the band of the reception port 419. When it is determined that there is a difference between the bands, the band controller 205 causes the message generator 241 to generate a band change message for eliminating the difference.

Next, the transmission device 1 of the node X transmits a response message to each of the nodes D and B. The transmission device 1 of the node X transmits the band change message to the node D with the port P1 to Pn having a larger band, between the nodes D and B. The band change message includes a band deletion instruction, and the band deletion instruction is transmitted to the data center network Nd.

As an example, in a case where a band of the transmission port 420 of the node D is 40 Gbps, and a band of the reception port 419 of the node B is 25 Gbps, the band controller 205 generates a band change message for reducing the band of the transmission port 420 of the node D by 15 Gbps (=40-25). The transmission device 1 of the node D transmits a band deletion instruction obtained from the band change message to the data center network Nd. For this reason, the band of the Ethernet signal "d" transmitted from the data center network Nd to the transmission port 420 becomes 25 (Gbps), and matches the band of the reception port 419.

In this manner, when the bands of Ethernet signals of a pair of ports P1 and Pn are different from each other, the band controller 205 reduces a band for the port P1 having a larger band. For this reason, since the bands of the ports P1 and Pn become the same, useless empty slots are reduced, and a transmission efficiency of a frame signal may be improved.

The switching unit 513 separates the Ethernet signal transmitted by the port P1 from a frame signal received by the receiver 510, and accommodates the Ethernet signal, in slots allocated to the Ethernet signal of the port Pn among slots of a frame signal to be transmitted from the transmitter 516 on the basis of the transmission side slot information and the reception side slot information. For this reason, a communication becomes possible between ports of the nodes A to E within the ring network NW, and thus, it is possible to implement a large-capacity long distance transmission that connects the data center networks Nd and Nb to each other. The switching unit 513 is an example of a slot processor.

For example, in a case where the switching unit 513 is not used, when the transmission device 2 of the node Y separates each Ethernet signal from a frame signal and re-accommodates the Ethernet signal in a frame signal addressed to the node X, an inter-port communication is possible. However, in this case, since frame signals reciprocate along a transmission path between the nodes X and Y, there is a problem in that a delay time increases. Therefore, by providing the switching unit 513 in the node X, it is possible to implement a low-delay inter-port communication not passing through the node Y.

Next, descriptions will be made on another example of the inter-port communication between the nodes A to E within the ring network NW.

Figure 35:
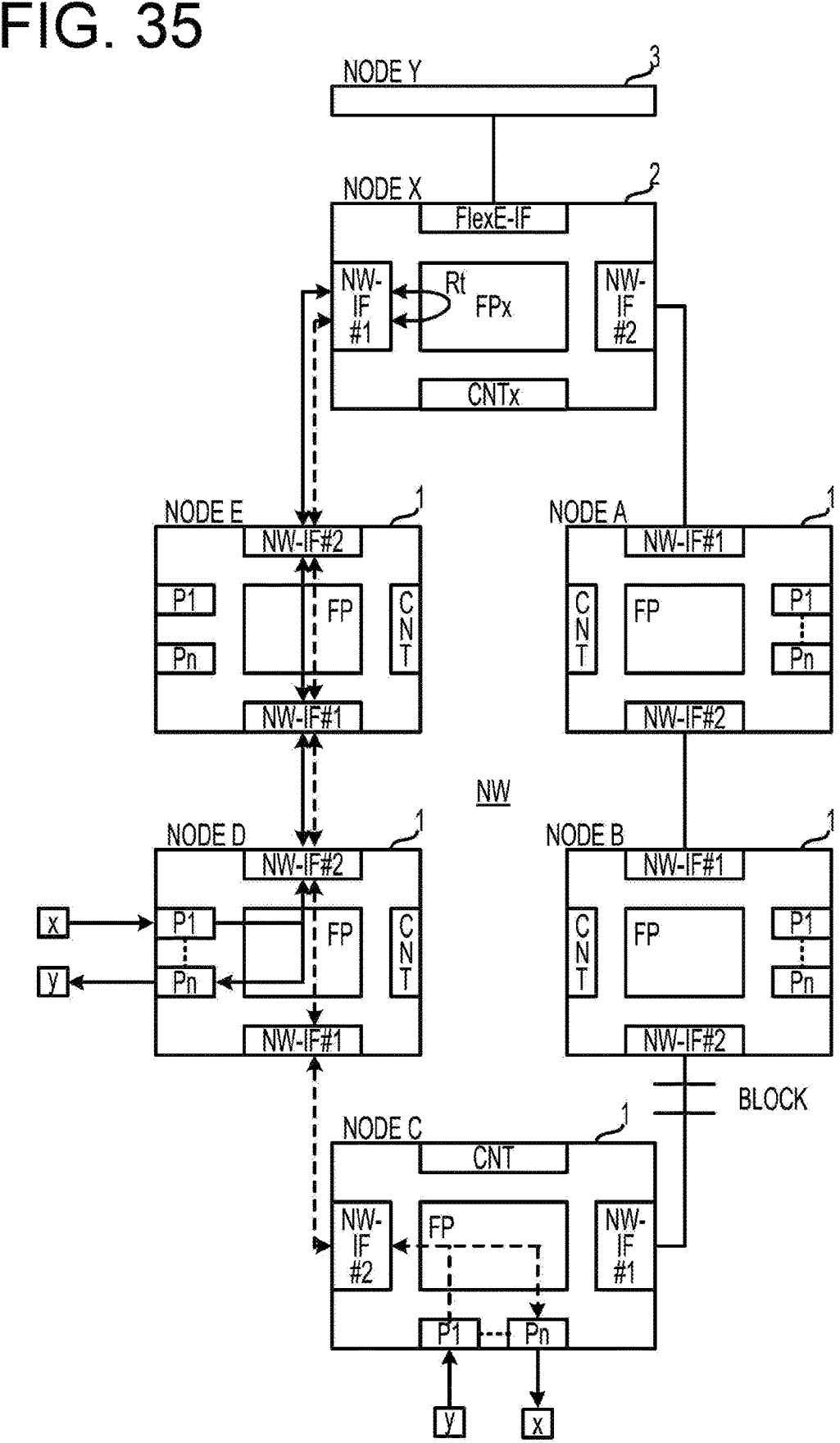
FIG. 35 is a view illustrating another example of a communication between nodes within a ring network.

FIG. 35 is a view illustrating another example of a communication between the nodes A to E within the ring network NW. In FIG. 35, the same components as those in FIG. 3 will be denoted by the same reference numerals as used in FIG. 3, and descriptions thereof will be omitted.

As an example, it is assumed that a pair of ports P1 and Pn of each of the nodes D and C transmit/receive Ethernet signals "x" and "y." Here, the port P1 is the reception port 419, and the port Pn is the transmission port 420.

As indicated by solid-line arrows, the ports P1 and Pn of the node D transmit/receive frame signals accommodating the Ethernet signals "x" and "y" to/from the node X. The frame processor FP of the node D accommodates the Ethernet signal "x" received by the port P1, in a frame signal to be transmitted from the network interface NW-IF #2, and separates the Ethernet signal y from a frame signal received by the network interface NW-IF #2 and outputs the Ethernet signal "y" to the port Pn.

As indicated by dotted-line arrows, the ports P1 and Pn of the node C transmit/receive frame signals accommodating the Ethernet signals "x" and "y" to/from the node X. The frame processor FP of the node C accommodates the Ethernet signal "y" received by the port P1, in a frame signal to be transmitted from the network interface NW-IF #2, and separates the Ethernet signal x from a frame signal received by the network interface NW-IF #2 and outputs the Ethernet signal x to the port Pn.

The transmission controller CNTx of the node X, for example, as indicated by a symbol Rt, connects two switching units 513 to each other so that the Ethernet signals "x" and "y" separated from the frame signal from the network interface NW-IF #1 are returned to the network interface NW-IF #1. Accordingly, the ports P1 and Pn of the nodes D and C may communicate with each other via the node X.

However, when a route that is looped back at the node X is used for communication as described above, it is necessary to allocate respective bands for transmission and reception of the Ethernet signals "x" and "y," to a transmission path between the node X and the node E, and a transmission path between the node D and the node E.

Meanwhile, when the ports P1 and Pn of each of the nodes D and C transmit/receive the Ethernet signals "x" and "y" without passing through the node X, no band is required for the transmission path between the node X and the node E and the transmission path between the node D and the node E. Thus, a band is reduced as in the following example.

Figure 36:
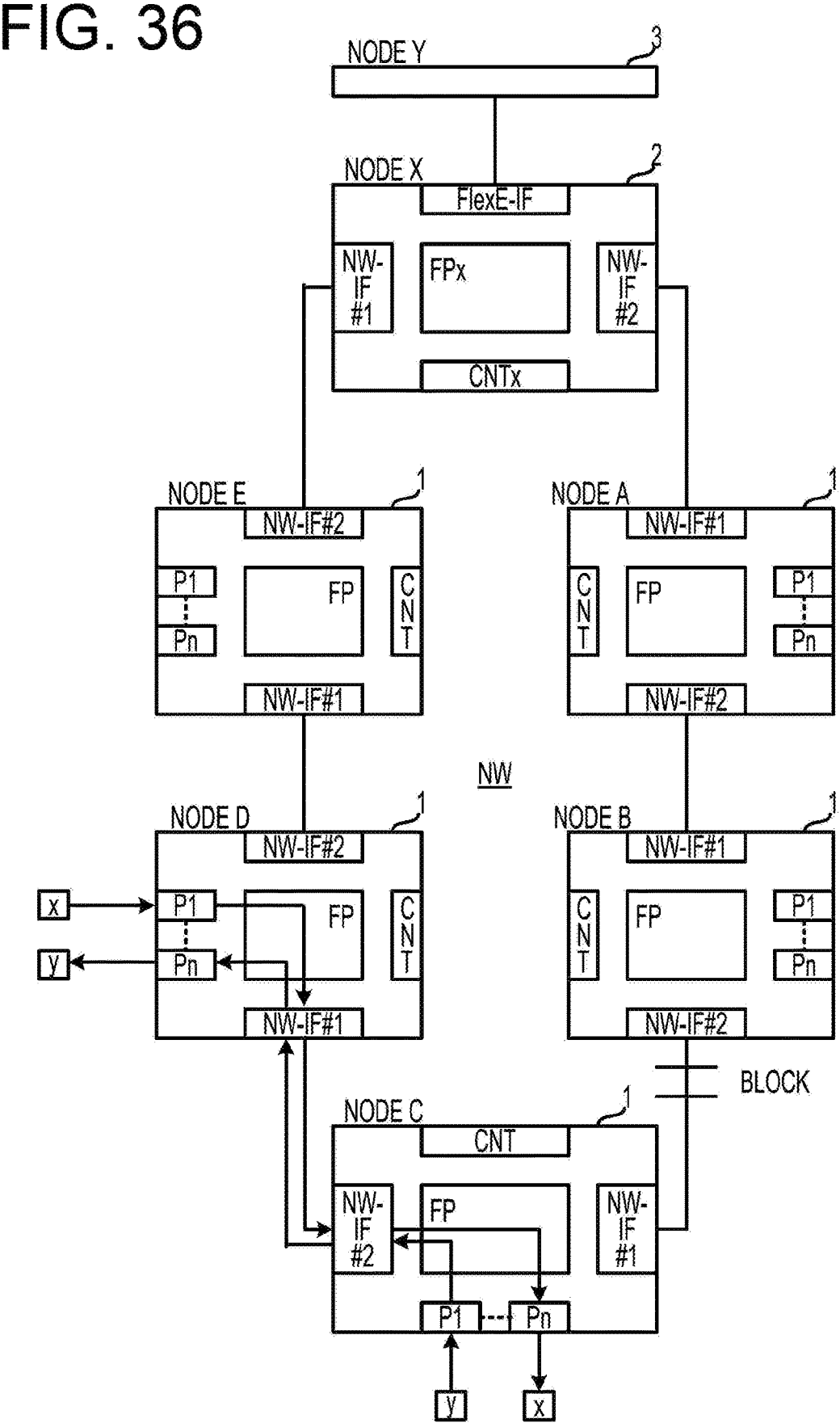
FIG. 36 is a view illustrating another example of the communication between nodes within a ring network.

FIG. 36 is a view illustrating another example of the communication between the nodes A to E within the ring network NW. In FIG. 36, the same components as those in FIG. 3 will be denoted by the same reference numerals as used in FIG. 3, and descriptions thereof will be omitted. The ports P1 and Pn of each of the nodes D and C transmit/receive Ethernet signals "x" and "y" without passing through the node X.

The frame processor FP of the node D accommodates the Ethernet signal "x" from the port P1, in a frame signal to be transmitted from the network interface NW-IF #1. Here, the signal setting processor 103 of the node D controls the multiplexer/demultiplexer 412 such that the Ethernet signal "x" is accommodated in the frame signal to be transmitted from the transmitter 414 on the node C side.

The frame processor FP of the node C separates the Ethernet signal "x" from the frame signal received by the network interface NW-IF #2, and outputs the Ethernet signal "x" to the port Pn. Here, the signal setting processor 103 of the node D controls the multiplexer/demultiplexer 412 such that the Ethernet signal "x" is separated from the frame signal received by the receiver 410 on the node D side.

For this reason, the Ethernet signal "x" is transmitted from the port P1 of the node D to the port Pn of the node C without passing through the node X. The Ethernet signal "y" is also processed in the same manner as in the Ethernet signal "x."

The transmission controller CNTx of the node X sets the nodes C and D such that the Ethernet signals "x" and "y" are transmitted/received as described above.

Figure 37:
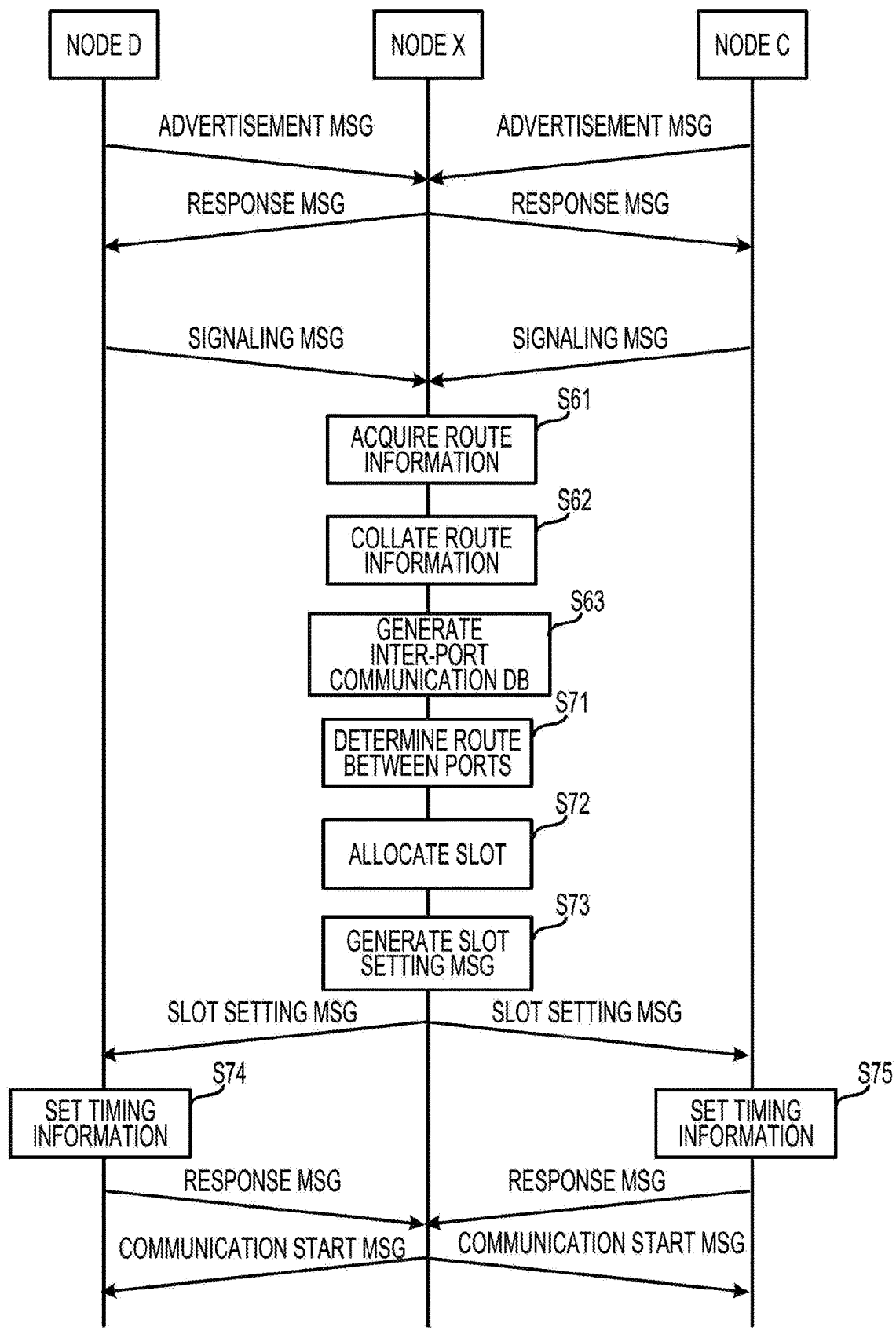
FIG. 37 is a sequence diagram illustrating an example of a setting processing of transmission/reception of Ethernet signals.

FIG. 37 is a sequence diagram illustrating an example of a setting processing of transmission/reception of Ethernet signals "x" and "y." In FIG. 37, the same components as those in FIG. 34 will be denoted by the same reference numerals as used in FIG. 34, and descriptions thereof will be omitted.

After the inter-port communication DB 235 is generated (S63), the node setting unit 206 determines a route by which a transmission path between the ports P1 and Pn is shortest, on the basis of the network configuration information 230 and the inter-port communication DB 235 (S71). As in the example of FIG. 36, when a route between the ports P1 and Pn of the nodes D and C is determined as a route not passing through the node X, the node setting unit 206 allocates slots to the Ethernet signals "x" and "y" transmitted/received between the ports P1 and Pn (S72). The slots of the Ethernet signals "x" and "y" are allocated to empty slots of frame signals on the clockwise line #1 to # k and the counter-clockwise line #1 to # k.

Next, the message generator 241 generates a slot setting message according to the allocation of the slots (S73). The OH insertion unit 413 gives the slot setting message to an overhead of a frame signal to be transmitted to each of the nodes D and C. Accordingly, the slot setting message is transmitted to each of the nodes D and C.

In each of the nodes D and C, the slot setting unit 102 acquires the slot setting message from the message detector 140. The slot setting unit 102 sets the timing information 132 according to the slot allocation indicated by the slot setting message (S74, S75).

Accordingly, the Ethernet signal "x" is accommodated in a frame signal in the node D and then is separated from the frame signal in the node C. The Ethernet signal "y" is accommodated in a frame signal in the node C and then is separated from the frame signal in the node D.

Next, the transmission device 1 of each of the nodes D and C transmits a response message to the node X. Then, the transmission device 2 of the node X transmits a communication start message for instructing the start of a communication to each of the nodes D and C.

In this manner, the node setting unit 206 sets each of the nodes D and C with the ports P1 and Pn such that the Ethernet signals "x" and "y" are transmitted/received between one pair of ports P1 and Pn without passing through the transmission device 2 of the node X. For this reason, it is possible to reduce a band of a transmission path required for the Ethernet signals "x" and "y".

As described above with reference to FIG. 32, the switching unit 513 changes slots as accommodating destinations of Ethernet signals transmitted/received between the ports P1 and Pn, but the present disclosure is not limited thereto. For example, it is possible to transmit Ethernet signals without changing slots.

Figure 38:
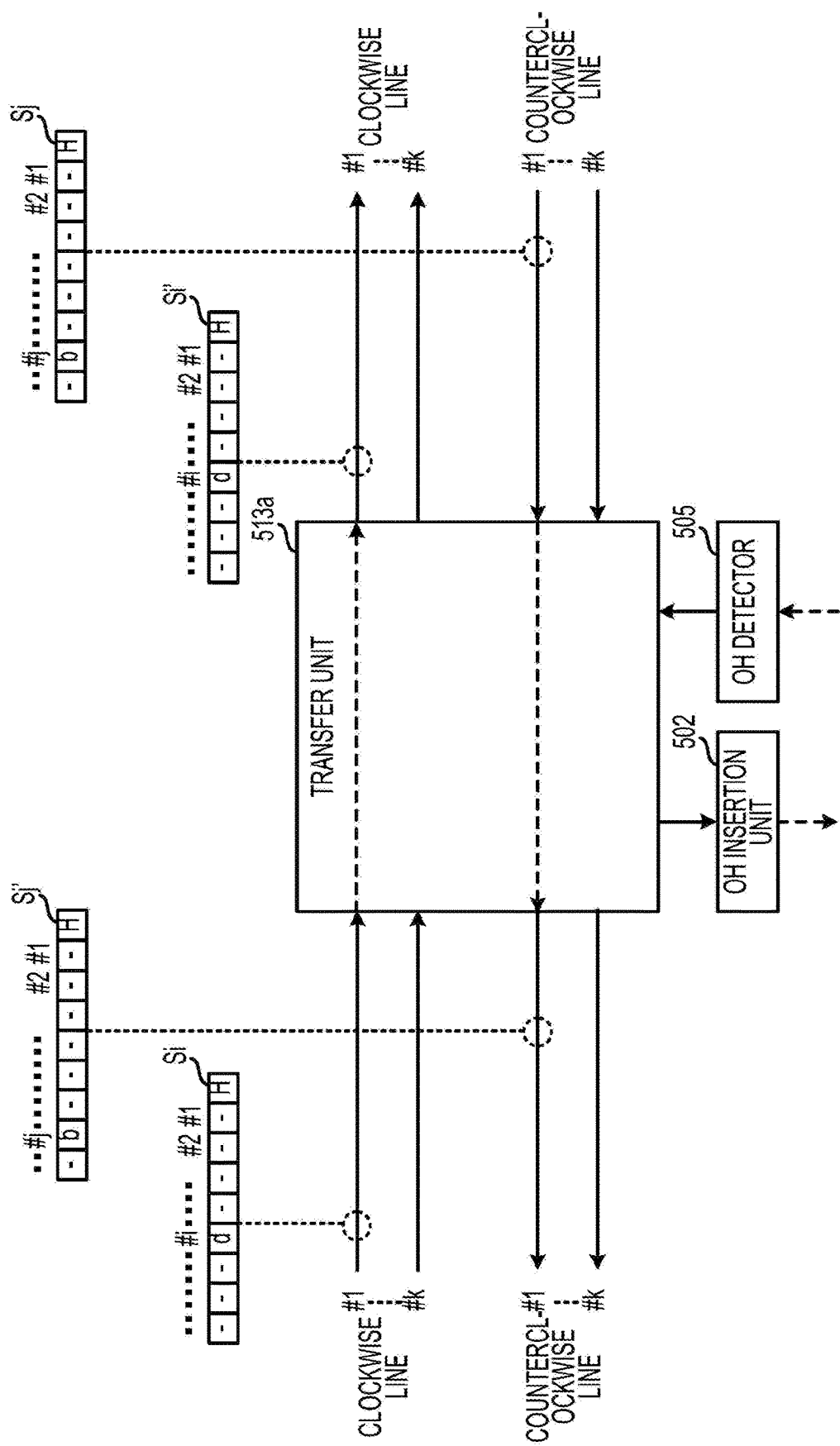
FIG. 38 is a view illustrating an example of a configuration in which Ethernet signals are transmitted without changing slots.

FIG. 38 is a view illustrating an example of a configuration in which Ethernet signals are transmitted without changing slots. A transfer unit 513a is, for example, a circuit such as an FPGA, and is provided instead of the switching unit 513. The OH insertion unit 502 and the OH detector 505 are connected to the transfer unit 513a.

The transfer unit 513a performs a transmission of Ethernet signals "d" and "b" according to a control of the data transmission controller 203. When frame signals Si and Sj accommodating the Ethernet signals "d" and "b" for an inter-port communication are input, the transfer unit 513a separates the Ethernet signals "d" and "b" from the frame signals Si and Sj, and accommodates the Ethernet signals "d" and "b" in other frame signals Si' and Sj' without changing slots # i and # j as the separation sources and outputs the Ethernet signals "d" and "b."

For example, the Ethernet signal "d" is accommodated in a slot # i of the frame signal Si input to the transfer unit 513a from the clockwise line #1. The transfer unit 513a separates the Ethernet signal "d" from the frame signal Si, and accommodates the Ethernet signal "d" in a slot # i of the frame signal Si' to be output from the clockwise line #1 which is the same as that in the frame signal Si.

The Ethernet signal "b" is accommodated in a slot # j of the frame signal Sj input to the transfer unit 513a from the counterclockwise line #1. The transfer unit 513a separates the Ethernet signal "b" from the frame signal Sj, and accommodates the Ethernet signal "b" in a slot # j of the frame signal Sj' to be output from the counterclockwise line #1 which is the same as that in the frame signal Sj.

For this reason, the Ethernet signals "d" and "b" are transmitted without changing slots as accommodating destinations.

Figure 39:
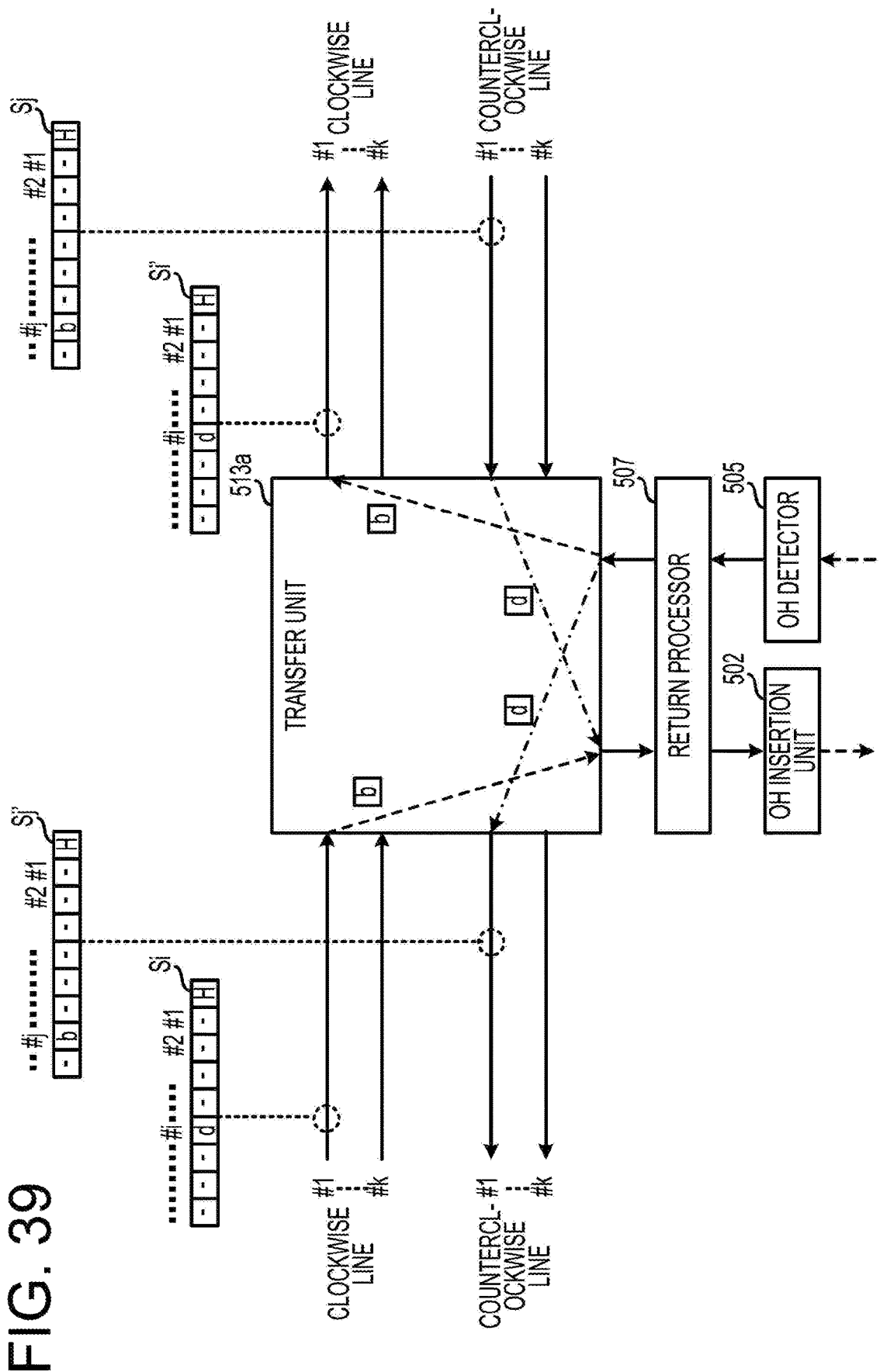
FIG. 39 is a view illustrating another example of the configuration in which Ethernet signals are transmitted without changing slots.

FIG. 39 is a view illustrating another example of the configuration in which Ethernet signals are transmitted without changing slots. In FIG. 39, the same components as those in FIG. 38 will be denoted by the same reference numerals as used in FIG. 38, and descriptions thereof will be omitted. Between the transfer unit 513a, and the OH insertion unit 502 and the OH detector 505, a return processor 507 is provided to return Ethernet signals "d" and "b" output from the transfer unit 513a, to the transfer unit 513a. The return processor 507 is, for example, a circuit such as an FPGA.

As indicated by dotted-line arrows, the transfer unit 513a outputs the Ethernet signals "d" and "b" separated from frame signals Si and Sj to the return processor 507. The return processor 507 returns the Ethernet signals "d" and "b" to the transfer unit 513a according to a control of the data transmission controller 203. The transfer unit 513a accommodates the returned Ethernet signals "d" and "b" in slots # i and # j of frame signals Si' and Sr.

For this reason, the Ethernet signals "d" and "b" are transmitted without changing slots as accommodating destinations.

Figure 40:
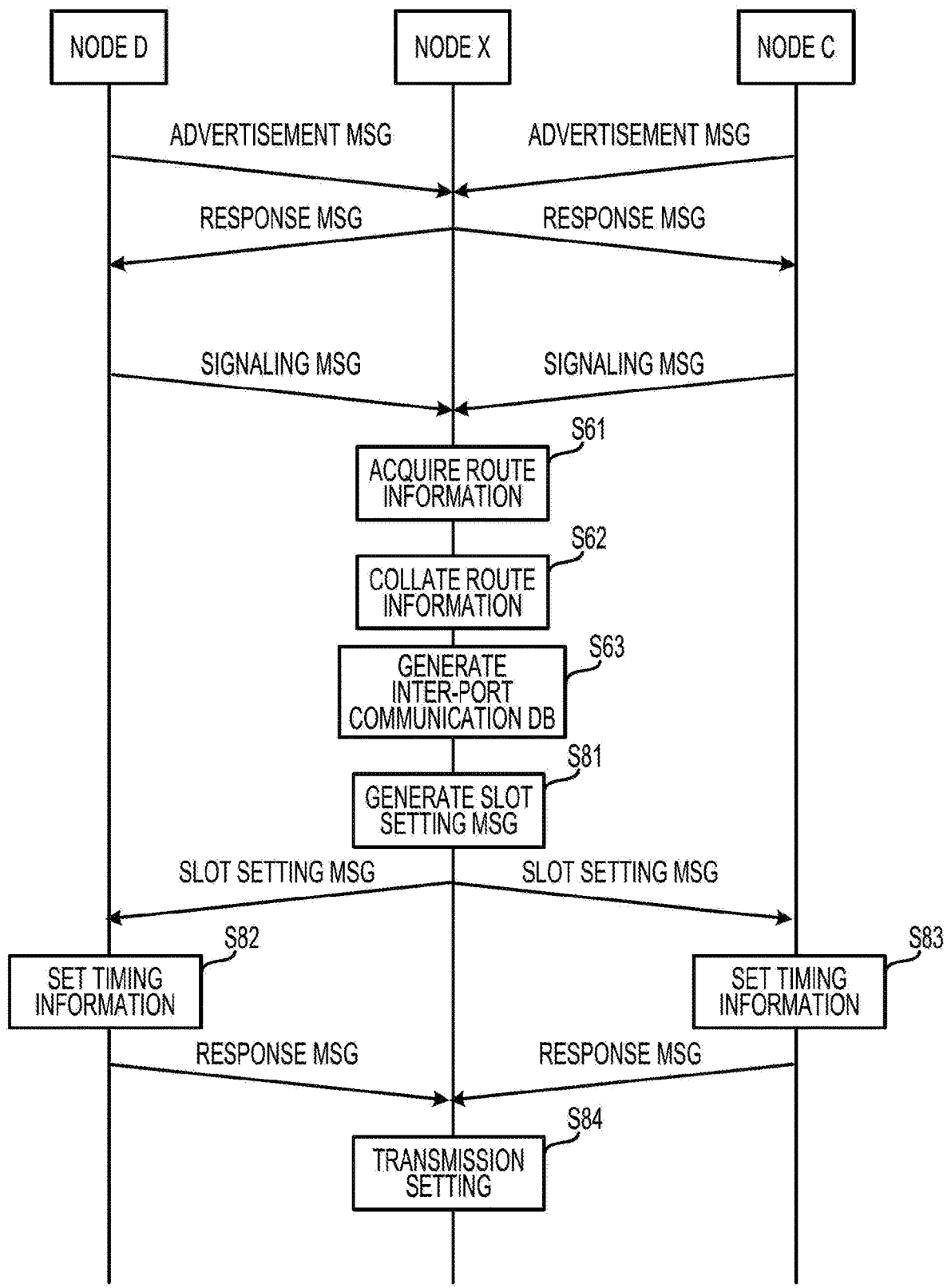
FIG. 40 is a sequence diagram illustrating an example of a setting processing for transmitting Ethernet signals without changing slots.

FIG. 40 is a sequence diagram illustrating an example of a setting processing for transmitting Ethernet signals "d" and "b" without changing slots. In FIG. 40, the same components as those in FIG. 34 will be denoted by the same reference numerals as used in FIG. 34, and descriptions thereof will be omitted.

After the inter-port communication DB 235 is generated (S63), the message generator 241 generates a slot setting message for setting slots as separation sources of the Ethernet signals "d" and "b," for each of the nodes D and C according to an instruction of the node setting unit 206 (S81). The node setting unit 206 sets the nodes D and C by the slot setting message such that the Ethernet signals "d" and "b" are separated from slots as accommodating destinations allocated to the Ethernet signals "d" and "b" on the basis of transmission side slot information. The slot setting message is given to an overhead of a frame signal and is transmitted to each of the nodes D and C.

In each of the nodes D and C, the signal setting processor 103 acquires the slot setting message from the message detector 140, and sets the timing information 132 (S82, S83). Accordingly, the multiplexer/demultiplexer 412 may separate the Ethernet signals "d" and "b" from the same slots as the slots as the accommodating destinations. Then, the transmission device 1 of each of the nodes D and C transmits a response message to the node X.

Next, in the node X, the data transmission controller 203 sets the transfer unit 513a such that the Ethernet signals "d" and "b" are transmitted without changing the slots (S84).

In this manner, the transfer unit 513a separates the Ethernet signals "d" and "b" transmitted by the ports P1, from slots # i and # j based on the transmission side slot information among the slots of frame signals Si and Sj received by the receiver 510. The transfer unit 513a accommodates the Ethernet signals "d" and "b" in the same slots # i and # j as the slots # i and # j as the separation sources of the Ethernet signals "d" and "b," among slots of frame signals Si' and Sj' to be transmitted from the transmitter 516. The transfer unit 513a is another example of a slot processor.

Therefore, the transmission device 2 of the node X may accommodate the Ethernet signals "d" and "b" in the slots # i and # j originally allocated to the Ethernet signals "d" and "b" on the basis of the transmission side slot information and transmit the Ethernet signals "d" and "b" to the nodes D and C. For this reason, it is possible to improve the band efficiency of the frame signals Si and Sj.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission device, comprising:
at least one port each configured to transmit or receive a data signal;
a first transceiver configured to transmit or receive a frame signal to or from one adjacent node within a ring network including a plurality of nodes, the transmission device being one of the plurality of nodes, the frame signal including an overhead, and a plurality of slots;
a second transceiver configured to transmit or receive a frame signal to or from another adjacent node within the ring network; and
a processor configured to:
set port information to the overhead of a frame signal to be transmitted from the first transceiver, the set port information indicating an allocation of a data signal to the at least one port;
acquire slot information from the overhead of a frame signal received by the first transceiver or the second transceiver, the slot information being generated based on the set port information and another port information that indicates an allocation of a data signal to at least one port included in another node within the ring network, the slot information indicating an allocation of a data signal to the plurality of slots; and
set a received data signal in a slot allocated based on the slot information, among the plurality of slots of a frame signal to be transmitted from the first transceiver or the second transceiver.

2. The transmission device according to claim 1, wherein the port information includes information on an allocation of a band of a data signal to the at least one port.

3. The transmission device according to claim 1, wherein the processor is further configured to:
set, to the overhead, the port information and a flag that indicates whether the port information is set; and
acquire the slot information when every flag of a plurality of transmission devices indicates that the port information is set.

4. The transmission device according to claim 1, wherein the processor is further configured to:
detect a failure within the ring network;
select one of the first transceiver and the second transceiver depending on a point where the failure occurs; and set the received data signal in a slot among the plurality of slots of the frame signal that is to be transmitted from the selected one of the first transceiver and the second transceiver.

5. The transmission device according to claim 1, wherein the processor is further configured to:
notify another node within the ring network about the slot information such that the slot allocated to the received data signal among the plurality of slots is shared with a data signal received by the another node.

6. A transmission device, comprising:
a first transceiver configured to transmit or receive a frame signal to or from one adjacent node within a ring network including a plurality of nodes, the transmission device being one of the plurality of nodes, the frame signal including an overhead and a plurality of slots;
a second transceiver configured to transmit or receive a frame signal to or from another adjacent node within the ring network; and
a processor configured to:
acquire port information from the overhead of a frame signal received by the first transceiver or the second transceiver, the port information indicating an allocation of a data signal to at least one port included in another node within the ring network;
generate slot information based on the port information, the slot information indicating an allocation of a data signal to the plurality of slots;
set the slot information to the overhead of a frame signal to be transmitted from the first transceiver or the second transceiver; and
generate an integrated frame signal that accommodates data signals in a plurality of slots of the integrated frame signal based on the slot information, the data signals being separated from frame signals received by the first transceiver and the second transceiver.

7. The transmission device according to claim 6, wherein the processor is further configured to:
acquire route information from the overhead of a frame signal received by the first transceiver or the second transceiver, the route information being related to a route of a data signal to be transmitted or received between ports of other nodes within the ring network;
detect a pair of ports, which transmit or receive a data signal to or from each other, by collating route information of the ports of the other nodes within the ring network with each other;
separate, based on the slot information, a data signal transmitted by one port of the pair of ports from a frame signal received by one of the first transceiver and the second transceiver; and
set, based on the slot information, the separated data signal in a slot allocated to a data signal of the other port of the pair of ports, among the plurality of slots of a frame signal to be transmitted from the other of the first transceiver and the second transceiver.

8. The transmission device according to claim 7, wherein the processor is further configured to:
reduce, when bands of data signals of the pair of ports are different from each other, a band for a port that has a larger band between the pair of ports.

9. The transmission device according to claim 7, wherein the processor is further configured to:
set each of two nodes within the ring network such that a data signal is transmitted or received between the pair of ports without passing through the transmission device, each of the two nodes having one of the pair of ports.

10. The transmission device according to claim 6, wherein the processor is further configured to:
acquire route information from the overhead of a frame signal received by the first transceiver or the second transceiver, the route information being related to a route of a data signal to be transmitted or received between the ports of the other nodes within the ring network;
detect a pair of ports, which transmit or receive a data signal to or from each other, by collating route information of the ports of the other nodes within the ring network with each other;
separate, based on the slot information, a data signal transmitted by one port of the pair of ports from a frame signal received by one of the first transceiver and the second transceiver; and
set, based on the slot information, the separated data signal in a same slot as the slot of the frame signal from which the separated data signal is separated, among the plurality of slots of a frame signal to be transmitted from the other of the first transceiver and the second transceiver.

11. A network system comprising:
a plurality of first transmission devices and a second transmission device each provided in one of a plurality of nodes within a ring network,
wherein each of the plurality of first transmission devices includes:
at least one port each configured to transmit or receive a data signal;
a first transceiver configured to transmit or receive a frame signal to or from one adjacent node within the ring network, the frame signal including an overhead and a plurality of slots;
a second transceiver configured to transmit or receive a frame signal to or from another adjacent node within the ring network; and
a first processor configured to:
set port information to the overhead of a frame signal to be transmitted from the first transceiver, the set port information indicating an allocation of a data signal to the at least one port;
acquire slot information from the overhead of a frame signal received by the first transceiver or the second transceiver, the slot information being generated based on the set port information and another port information that indicates an allocation of a data signal to at least one port included in another node within the ring network, the slot information indicating an allocation of a data signal to the plurality of slots; and
set a received data signal in a slot allocated based on the slot information, among the plurality of slots of a frame signal to be transmitted from the first transceiver or the second transceiver, and
the second transmission device includes:
a third transceiver configured to transmit or receive a frame signal to or from one adjacent node within the ring network;
a fourth transceiver configured to transmit or receive a frame signal to or from the other adjacent node within the ring network; and a second processor configured to:
acquire the port information from the overhead of a frame signal received by the third transceiver or the fourth transceiver;
generate the slot information based on the port information;
set the slot information to the overhead of a frame signal to be transmitted from the third transceiver or the fourth transceiver; and
generate an integrated frame signal that accommodates data signals in a plurality of slots of the integrated frame signal based on the slot information, the data signals being separated from frame signals received by the third transceiver and the fourth transceiver.

12. The network system according to claim 11, wherein the port information includes information on an allocation of a band of a data signal to the at least one port.

13. The network system according to claim 11, wherein the first processor is further configured to:
set, to the overhead, the port information and a flag that indicates whether the port information is set; and
acquire the slot information when every flag of the plurality of first transmission devices indicates that the port information is set.

14. The network system according to claim 11, wherein the first processor is further configured to:
detect a failure within the ring network;
select one of the first transceiver and the second transceiver depending on a point where the failure occurs; and
set the received data signal in a slot among the plurality of slots of a frame signal to be transmitted from the selected one of the first transceiver and the second transceiver.

15. The network system according to claim 11, wherein the first processor is further configured to:
notify another node within the ring network about the slot information such that the slot allocated to the received data signal among the plurality of slots is shared with a data signal received by the another node.

16. The network system according to claim 11, wherein the second processor is further configured to:
acquire route information from the overhead of a frame signal received by the third transceiver or the fourth transceiver, the route information being related to a route of a data signal to be transmitted or received between the ports of the plurality of first transmission devices;
detect a pair of ports, which transmit or receive a data signal to or from each other, by collating route information of the ports of the plurality of first transmission devices with each other;
separate, based on the slot information, a data signal transmitted by one port of the pair of ports from a frame signal received by one of the third transceiver and the fourth transceiver; and
set, based on the slot information, the separated data signal in a slot allocated to a data signal of the other port of the pair of ports, among the plurality of slots of a frame signal to be transmitted from the other of the third transceiver and the fourth transceiver.

17. The network system according to claim 16, wherein the second processor is further configured to:
reduce, when bands of data signals of the pair of ports are different from each other, a band for a port that has a larger band between the pair of ports.

18. The network system according to claim 16, wherein the second processor is further configured to:
set each of the plurality of first transmission devices having one of the pair of ports such that a data signal is transmitted or received between the pair of ports without passing through the second transmission device.

19. The network system according to claim 11, wherein the second processor is further configured to:
acquire route information from the overhead of a frame signal received by the third transceiver or the fourth transceiver, the route information being related to a route of a data signal to be transmitted or received between the ports of the plurality of first transmission devices;
detect a pair of ports, which transmit or receive a data signal to or from each other, by collating route information of the ports of the plurality of first transmission devices with each other;
separate, based on the slot information, a data signal transmitted by one port of the pair of ports from a frame signal received by one of the third transceiver and the fourth transceiver; and
set, based on the slot information, the separated data signal in a same slot as the slot of the frame signal from which the separated data signal is separated, among the plurality of slots of a frame signal to be transmitted from the other of the third transceiver and the fourth transceiver.

* * * * *